US008612321B2

(12) United States Patent
Tully et al.

(10) Patent No.: US 8,612,321 B2
(45) Date of Patent: Dec. 17, 2013

(54) SYSTEM AND METHOD FOR THE AUTOMATED BROKERAGE OF FINANCIAL INSTRUMENTS

(75) Inventors: Michael James Tully, Maryland Heights, MO (US); Virgil Michael Scott, Wildwood, MO (US); Dwayne Oliver Randle, Bridgeton, MO (US); Gregory Paul Lembree, O'Fallon, MO (US)

(73) Assignee: Scottrade, Inc., St. Louis, MO (US)

( * ) Notice: Subject to any disclaimer, the term of this patent is extended or adjusted under 35 U.S.C. 154(b) by 754 days.

(21) Appl. No.: 12/187,042

(22) Filed: Aug. 6, 2008

(65) Prior Publication Data

US 2009/0037320 A1 Feb. 5, 2009

Related U.S. Application Data

(62) Division of application No. 10/692,067, filed on Oct. 22, 2003.

(51) Int. Cl.
*G06Q 40/00* (2012.01)
(52) U.S. Cl.
USPC .............................. 705/35; 705/37; 705/36 R
(58) Field of Classification Search
None
See application file for complete search history.

(56) References Cited

U.S. PATENT DOCUMENTS

| | | | |
|---|---|---|---|
| 4,486,853 A | 12/1984 | Parsons | |
| 4,674,044 A | 6/1987 | Kalmus et al. | |
| 4,694,397 A | 9/1987 | Grant et al. | |
| 4,774,663 A | 9/1988 | Musmanno et al. | |
| 4,903,201 A | 2/1990 | Wagner | |
| 5,038,284 A | 8/1991 | Kramer | |
| 5,262,942 A | 11/1993 | Earle | |
| 5,270,922 A | 12/1993 | Higgins | |
| 5,297,032 A | 3/1994 | Trojan et al. | |
| 5,375,055 A | 12/1994 | Togher et al. | |
| 5,557,798 A | 9/1996 | Skeen et al. | |
| 5,809,483 A | 9/1998 | Broka et al. | |
| 5,890,140 A | 3/1999 | Clark et al. | |
| 5,915,209 A | 6/1999 | Lawrence | |
| 5,950,176 A | 9/1999 | Keiser et al. | |
| 5,963,923 A | 10/1999 | Garber | |
| 6,014,627 A | 1/2000 | Togher et al. | |

(Continued)

OTHER PUBLICATIONS

Office Action for U.S. Appl. No. 10/692,067 dated Oct. 28, 2009.

(Continued)

*Primary Examiner* — Gregory Johnson
(74) *Attorney, Agent, or Firm* — Armstrong Teasdale LLP

(57) ABSTRACT

Disclosed herein in a preferred embodiment is an automated financial instrument brokerage system wherein a front end layer interacts with customers to generate activity requests for an intermediate layer. The intermediate layer preferably processes the activity requests and places financial instrument orders on a financial market if appropriate. A backend layer preferably provides data to the intermediate layer for processing activity requests. Multiple heterogeneous front end customer applications may be supported by the same intermediate layer. Further, multiple backend layer applications may interact with the intermediate layer in a manner transparent to the front end layer. Further, scalability can be achieved be partitioning various tasks of the intermediate layer onto separate servers, and more preferably on separate redundant servers. Load balancers may then be used in the intermediate layer to provide distributed access to these servers. Also disclosed herein is a caching technique whereby turnaround time for processing activity requests can be reduced by reducing the number of times that the intermediate layer needs to interact with the backend layer.

10 Claims, 62 Drawing Sheets

(56) References Cited

U.S. PATENT DOCUMENTS

| | | |
|---|---|---|
| 6,014,643 A | 1/2000 | Minton |
| 6,029,146 A | 2/2000 | Hawkins et al. |
| 6,105,005 A | 8/2000 | Fuhrer |
| 6,125,363 A * | 9/2000 | Buzzeo et al. .................. 1/1 |
| 6,134,535 A | 10/2000 | Belzberg |
| 6,182,139 B1 | 1/2001 | Brendel |
| 6,195,647 B1 | 2/2001 | Martyn et al. |
| 6,233,565 B1 | 5/2001 | Lewis et al. |
| 6,233,566 B1 | 5/2001 | Levine et al. |
| 6,247,000 B1 | 6/2001 | Hawkins et al. |
| 6,249,801 B1 | 6/2001 | Zisapel et al. |
| 6,278,982 B1 | 8/2001 | Korhammer et al. |
| 6,285,989 B1 | 9/2001 | Shoham |
| 6,317,728 B1 | 11/2001 | Kane |
| 6,332,131 B1 | 12/2001 | Grandcolas et al. |
| 6,347,307 B1 | 2/2002 | Sandhu et al. |
| 6,363,497 B1 | 3/2002 | Chrabaszcz |
| 6,408,282 B1 | 6/2002 | Buist |
| 6,418,419 B1 | 7/2002 | Nieboer et al. |
| 6,421,653 B1 | 7/2002 | May |
| 6,442,533 B1 | 8/2002 | Hinkle |
| 6,513,019 B2 | 1/2003 | Lewis |
| 6,578,068 B1 | 6/2003 | Bowman-Amuah |
| 6,597,956 B1 | 7/2003 | Aziz et al. |
| 6,598,028 B1 | 7/2003 | Sullivan et al. |
| 6,601,034 B1 | 7/2003 | Honarvar et al. |
| 6,601,044 B1 | 7/2003 | Wallman |
| 6,615,188 B1 | 9/2003 | Breen et al. |
| 6,665,702 B1 | 12/2003 | Zisapel et al. |
| 6,691,165 B1 | 2/2004 | Bruck et al. |
| 6,725,446 B1 | 4/2004 | Hahn et al. |
| 6,735,631 B1 * | 5/2004 | Oehrke et al. ................. 709/226 |
| 6,757,708 B1 | 6/2004 | Craig et al. |
| 6,772,132 B1 | 8/2004 | Kemp, II et al. |
| 6,801,949 B1 | 10/2004 | Bruck et al. |
| 6,850,982 B1 * | 2/2005 | Siegel ............................ 709/227 |
| 6,944,678 B2 * | 9/2005 | Lu et al. ........................ 709/245 |
| 6,950,848 B1 | 9/2005 | Yousefi'zadeh |
| 7,007,299 B2 | 2/2006 | Ioele et al. |
| 7,024,387 B1 | 4/2006 | Nieboer et al. |
| 7,032,037 B2 | 4/2006 | Garnett et al. |
| 7,047,300 B1 | 5/2006 | Oehrke et al. |
| 7,068,597 B1 | 6/2006 | Fijolek et al. |
| 7,093,005 B2 | 8/2006 | Patterson |
| 7,099,926 B1 | 8/2006 | Ims et al. |
| 7,102,996 B1 | 9/2006 | Amdahl et al. |
| 7,146,233 B2 | 12/2006 | Aziz et al. |
| 7,212,994 B2 | 5/2007 | Howell et al. |
| 7,213,065 B2 | 5/2007 | Watt |
| 7,219,077 B1 | 5/2007 | Black et al. |
| 7,340,430 B2 | 3/2008 | Mulinder et al. |
| 7,398,237 B2 | 7/2008 | Agostini et al. |
| 7,409,379 B1 | 8/2008 | Katzer |
| 7,509,369 B1 | 3/2009 | Tormasov |
| 7,529,704 B1 * | 5/2009 | Breslow et al. ................ 705/37 |
| 7,565,313 B2 * | 7/2009 | Waelbroeck et al. ........... 705/37 |
| 7,698,398 B1 | 4/2010 | Lai |
| 7,752,117 B2 * | 7/2010 | Burns et al. ..................... 705/37 |
| 7,827,087 B2 * | 11/2010 | Adatia ............................ 705/37 |
| 7,873,734 B1 | 1/2011 | Eidelman et al. |
| 2002/0013753 A1 | 1/2002 | Marks de Chabris et al. |
| 2002/0019799 A1 | 2/2002 | Ginsberg et al. |
| 2002/0029180 A1 | 3/2002 | Kirwin et al. |
| 2002/0032635 A1 | 3/2002 | Harris et al. |
| 2002/0035534 A1 | 3/2002 | Buist et al. |
| 2002/0035673 A1 | 3/2002 | Roseborough et al. |
| 2002/0038273 A1 | 3/2002 | Wherry et al. |
| 2002/0046137 A1 | 4/2002 | Odom et al. |
| 2002/0046154 A1 | 4/2002 | Pritchard |
| 2002/0052816 A1 | 5/2002 | Clenaghan et al. |
| 2002/0052821 A1 | 5/2002 | Terashima |
| 2002/0052827 A1 | 5/2002 | Waelbroeck et al. |
| 2002/0059129 A1 | 5/2002 | Kemp et al. |
| 2002/0073018 A1 | 6/2002 | Mulinder et al. |
| 2002/0087454 A1 | 7/2002 | Calo et al. |
| 2002/0087500 A1 | 7/2002 | Berkowitz et al. |
| 2002/0099644 A1 | 7/2002 | Kemp et al. |
| 2002/0107835 A1 | 8/2002 | Coram et al. |
| 2002/0120523 A1 | 8/2002 | Yang |
| 2002/0120550 A1 | 8/2002 | Yang |
| 2002/0128945 A1 | 9/2002 | Moss et al. |
| 2002/0133453 A1 * | 9/2002 | Rose ............................... 705/37 |
| 2002/0138400 A1 | 9/2002 | Kitchen et al. |
| 2002/0138401 A1 | 9/2002 | Allen et al. |
| 2002/0156716 A1 * | 10/2002 | Adatia ............................ 705/37 |
| 2002/0156930 A1 | 10/2002 | Velasquez |
| 2002/0169704 A1 | 11/2002 | Gilbert et al. |
| 2002/0169774 A1 * | 11/2002 | Greenbaum et al. .............. 707/9 |
| 2002/0174039 A1 | 11/2002 | Chien |
| 2002/0174043 A1 | 11/2002 | Gilbert et al. |
| 2002/0188555 A1 | 12/2002 | Lawrence |
| 2002/0194099 A1 | 12/2002 | Weiss |
| 2002/0198816 A1 | 12/2002 | Gilbert et al. |
| 2003/0004852 A1 | 1/2003 | Burns |
| 2003/0004859 A1 | 1/2003 | Shaw et al. |
| 2003/0004862 A1 | 1/2003 | Lutnick et al. |
| 2003/0004882 A1 | 1/2003 | Holler et al. |
| 2003/0018561 A1 | 1/2003 | Kitchen et al. |
| 2003/0023542 A1 | 1/2003 | Kemp et al. |
| 2003/0028642 A1 * | 2/2003 | Agarwal et al. ................ 709/226 |
| 2003/0033239 A1 | 2/2003 | Gilbert et al. |
| 2003/0033240 A1 | 2/2003 | Balson et al. |
| 2003/0040961 A1 | 2/2003 | Lutnick et al. |
| 2003/0050879 A1 | 3/2003 | Rosen et al. |
| 2003/0055774 A1 | 3/2003 | Ginsberg |
| 2003/0055913 A1 * | 3/2003 | Harkin et al. .................. 709/218 |
| 2003/0061138 A1 | 3/2003 | Chen et al. |
| 2003/0069836 A1 | 4/2003 | Penney et al. |
| 2003/0083974 A1 | 5/2003 | Bunda |
| 2003/0083976 A1 | 5/2003 | McLister |
| 2003/0088499 A1 | 5/2003 | Gilbert et al. |
| 2003/0088501 A1 | 5/2003 | Gilbert et al. |
| 2003/0093343 A1 | 5/2003 | Huttenlocher et al. |
| 2003/0097323 A1 * | 5/2003 | Khalfan et al. ................. 705/36 |
| 2003/0097325 A1 | 5/2003 | Friesen et al. |
| 2003/0101128 A1 | 5/2003 | Abernethy |
| 2003/0109310 A1 | 6/2003 | Heaton et al. |
| 2003/0115131 A1 | 6/2003 | Heaton et al. |
| 2003/0120502 A1 | 6/2003 | Robb et al. |
| 2003/0120585 A1 | 6/2003 | Rosenblatt |
| 2003/0125982 A1 | 7/2003 | Ginsberg et al. |
| 2003/0139997 A1 | 7/2003 | Ginsberg |
| 2003/0139998 A1 | 7/2003 | Gilbert et al. |
| 2003/0145106 A1 | 7/2003 | Brown |
| 2003/0149653 A1 | 8/2003 | Penney et al. |
| 2003/0154152 A1 | 8/2003 | Gilbert et al. |
| 2003/0154279 A1 | 8/2003 | Aziz |
| 2003/0163405 A1 | 8/2003 | Wiener et al. |
| 2003/0167223 A1 | 9/2003 | Pledereder et al. |
| 2003/0172145 A1 | 9/2003 | Nguyen |
| 2003/0200167 A1 | 10/2003 | Kemp et al. |
| 2003/0208407 A1 * | 11/2003 | Dawson ......................... 705/26 |
| 2003/0220865 A1 | 11/2003 | Lutnick |
| 2003/0225675 A1 | 12/2003 | Failla et al. |
| 2003/0233522 A1 | 12/2003 | White et al. |
| 2003/0236737 A1 | 12/2003 | Kemp et al. |
| 2004/0002913 A1 | 1/2004 | Breen et al. |
| 2004/0019494 A1 | 1/2004 | Ridgeway et al. |
| 2004/0030607 A1 | 2/2004 | Gibson |
| 2004/0034591 A1 * | 2/2004 | Waelbroeck et al. ........... 705/37 |
| 2004/0039685 A1 | 2/2004 | Hambrecht et al. |
| 2004/0039689 A1 | 2/2004 | Penney et al. |
| 2004/0054780 A1 | 3/2004 | Romero |
| 2004/0068461 A1 | 4/2004 | Schluetter |
| 2004/0093300 A1 | 5/2004 | Burns |
| 2004/0100467 A1 | 5/2004 | Heaton |
| 2004/0103054 A1 | 5/2004 | Singer |
| 2004/0107156 A1 | 6/2004 | Levine |
| 2004/0117292 A1 | 6/2004 | Brumfield et al. |
| 2004/0117331 A1 | 6/2004 | Lutnick et al. |
| 2004/0138979 A1 | 7/2004 | Juhre et al. |
| 2004/0139031 A1 | 7/2004 | Amaitis et al. |
| 2004/0139032 A1 | 7/2004 | Rowan |
| 2004/0143504 A1 | 7/2004 | Tsai |

(56) References Cited

U.S. PATENT DOCUMENTS

| | | |
|---|---|---|
| 2004/0143539 A1 | 7/2004 | Penney et al. |
| 2004/0153391 A1 | 8/2004 | Burns et al. |
| 2004/0153392 A1 | 8/2004 | West et al. |
| 2004/0153393 A1 | 8/2004 | West et al. |
| 2004/0153394 A1 | 8/2004 | West et al. |
| 2004/0153418 A1* | 8/2004 | Hanweck .................. 705/67 |
| 2004/0158519 A1 | 8/2004 | Lutnick et al. |
| 2004/0167840 A1 | 8/2004 | Tully et al. |
| 2004/0193519 A1 | 9/2004 | Sweeting et al. |
| 2004/0193526 A1 | 9/2004 | Singer et al. |
| 2004/0193529 A1 | 9/2004 | Asher et al. |
| 2004/0210514 A1 | 10/2004 | Kemp et al. |
| 2004/0210663 A1 | 10/2004 | Phillips et al. |
| 2004/0215538 A1 | 10/2004 | Smith et al. |
| 2004/0216127 A1 | 10/2004 | Datta et al. |
| 2004/0230566 A1 | 11/2004 | Balijepalli et al. |
| 2004/0236636 A1 | 11/2004 | Lutnick et al. |
| 2004/0236668 A1 | 11/2004 | Toffey |
| 2004/0243505 A1 | 12/2004 | Sweeting et al. |
| 2004/0249732 A1 | 12/2004 | Drummond |
| 2005/0010481 A1 | 1/2005 | Lutnick et al. |
| 2005/0015323 A1 | 1/2005 | Myr |
| 2005/0021530 A1* | 1/2005 | Garg et al. .................. 707/100 |
| 2005/0027635 A1 | 2/2005 | Monroe et al. |
| 2005/0038731 A1 | 2/2005 | Sweeting et al. |
| 2005/0038732 A1 | 2/2005 | Sweeting et al. |
| 2005/0044197 A1 | 2/2005 | Lai |
| 2005/0050455 A1 | 3/2005 | Yee et al. |
| 2005/0055304 A1 | 3/2005 | Lutnick et al. |
| 2005/0055305 A1 | 3/2005 | Lutnick et al. |
| 2005/0060255 A1 | 3/2005 | Heaton |
| 2005/0187857 A1 | 8/2005 | Tull, Jr. |
| 2005/0222936 A1 | 10/2005 | Panariti et al. |
| 2006/0059107 A1 | 3/2006 | Elmore et al. |
| 2006/0149659 A1 | 7/2006 | Carone et al. |
| 2007/0011079 A1 | 1/2007 | May |
| 2007/0192208 A1 | 8/2007 | Takeo et al. |
| 2007/0294159 A1 | 12/2007 | Cottle |
| 2009/0037313 A1 | 2/2009 | Tully et al. |
| 2009/0182656 A1 | 7/2009 | Tully et al. |
| 2009/0187502 A1 | 7/2009 | Tully et al. |
| 2009/0240613 A1 | 9/2009 | Tully et al. |

OTHER PUBLICATIONS

Office Action for U.S. Appl. No. 10/692,067 dated Dec. 11, 2008.
Office Action for U.S. Appl. No. 10/692,067 dated May 6, 2008.
Office Action for U.S. Appl. No. 10/692,067 dated Jan. 28, 2008.
Bichler, Martin et al., A Brokerage Framework for Internet Commerce, Fisher Center for Management & Information Technology, Walter A. Haas School of Business, University of California, Berkeley, 1998, 23 pages.
Blinov, Mikhail et al., An application of the Reference Model for Open Distributed Processing to electronic brokerage, Computer Standards & Interfaces 25 (2003) 411-425, 15 pages.
Gallego, Isabel et al, Distributed Models for Brokerage on Electronic Commerce; Trends in Distributed Systems for Electronic Commerce; Lecture Notes in Computer Science, 1998, vol. 1402, 12 pages.
Hands, Jenny et al., An Inclusive and Extensible Architecture for Electronic Brokerage, Proceedings of the 32nd Hawaii International Conference on System Sciences, 1999, 10 pages.

\* cited by examiner

Figure 8a

Scottrade

Account # 123xyz

- First Step
- Deposit Funds
  echeck
- Wireless

NEW! FEATURES

- New Corporate
  Offerings
- Tutorial - Features of
  Scottrader
- Introducing ScottradeElite
- NEW! ScottradeElite

CURRENT MARKETS

- Scottrader
  Streaming Quotes
- Market Indices
- Top Ten
- Briefing.com
- Change Accounts
- Logout of Trading
- Site Map

| Home | Trading | Account Information | Quotes | Dow Jones News | Research | Customer Service | Help | Log Out |

Welcome to Scottrade Financial Services

☒ New Messages Today

Real-Time Market Indices – October 13, 2003 4:17 PM EST
U.S. Markets Closed

| S&P 500 | DJIA | NASDAQ |
|---|---|---|
| 1045.35 +7.29 | 9764.38 +89.70 | 1933.50 +18.20 |

Today's Real-Time Executions

None

Current Open Orders

None

Real-Time Account Information

| | | |
|---|---|---|
| Portfolio Value as of Previous Close | $163.08 | Help |
| Current Net Balance (Cash + Unsettled Funds) | $304.82 | Help |
| Total Account Value | $467.90 | Help |

Trading Cash

| | | |
|---|---|---|
| Cash / Settled Funds | $304.82 | Help |
| Unsettled Funds | $0.00 | Help |
| Current Net Balance | $304.82 | Help |
| Trading Cash | $304.82 | Help |

*This account is not Restricted

Real-Time Positions

| Symbol | Qty | Acct Type | Quote | Value |
|---|---|---|---|---|
| CSCO | 5 | CASH | 21.00 | 105.00 |
| MSFT | 2 | CASH | 28.78 | 57.56 |
| SWS | 1 | CASH | 1.27 | 1.27 |
| Total Market Value | | | | $163.83 |

Symbol: [  ]   Detailed Quote      Quick Links

Figure 8d

Scottrade

Account # 123xyz

- First Step
- Deposit Funds
  echeck
- Wireless

NEW! FEATURES

- New Corporate
  Offerings
- Tutorial - Features of
  Scottrader
- Introducing ScottradeElite
- NEW! ScottradeElite

CURRENT MARKETS

- Scottrader
  Streaming Quotes
- Market Indices
- Top Ten
- Briefing.com
- Change Accounts
- Logout of Trading

- Site Map

Home | Trading | Account Information | Quotes | Dow Jones News | Research | Customer Service | Help | Log Out Real-Time Positions October 13, 2003

| Symbol | Name | Qty | Acct Type | Quote | Value | Today's Change In Value |
|---|---|---|---|---|---|---|
| CSCO | CISCO SYSTEMS | 5 | CASH | 21.00 | 105.00 | 1.05 |
| MSFT | MICROSOFT CORP | 2 | CASH | 28.78 | 57.56 | -0.26 |
| SVVS | SAVVIS COMMUNICATIONS CORP | 1 | CASH | 1.27 | 1.27 | -0.04 |
| Total Market Value | | | | | $163.83 | $0.75 |

(Help)

©Copyright 2000 Scottrade. All Rights Reserved.

Symbol: [     ]  Detailed Quote

Quick Links

Figure 8e

Equity Order Entry

Market Side: Buy
Quantity: 1
Symbol: GE
Order Type: Market
Limit Price:
Stop Price:
Time in Force: Day Order
Qualifiers: ☐ All or None
Trading Period: Regular Hours Get Quote  Confirm  Abandon ©Copyright 2000 Scottrade. All Rights Reserved.

Symbol: [ ]  Detailed Quote

Quick Links

Home | Trading | Account Information | Quotes | Dow Jones News | Research | Customer Service | Help | Log Out Scottrade Account # 123xyz

- First Step
- Deposit Funds echeck
- Wireless

NEW! FEATURES

- New Corporate Offerings
- Tutorial - Features of Scottrader
- Introducing Scottrade Elite
- NEW! ScottradeElite

CURRENT MARKETS

- Scottrader Streaming Quotes
- Market Indices
- Top Ten
- Briefing.com
- Change Accounts
- Logout of Trading
- Site Map

Figure 8f

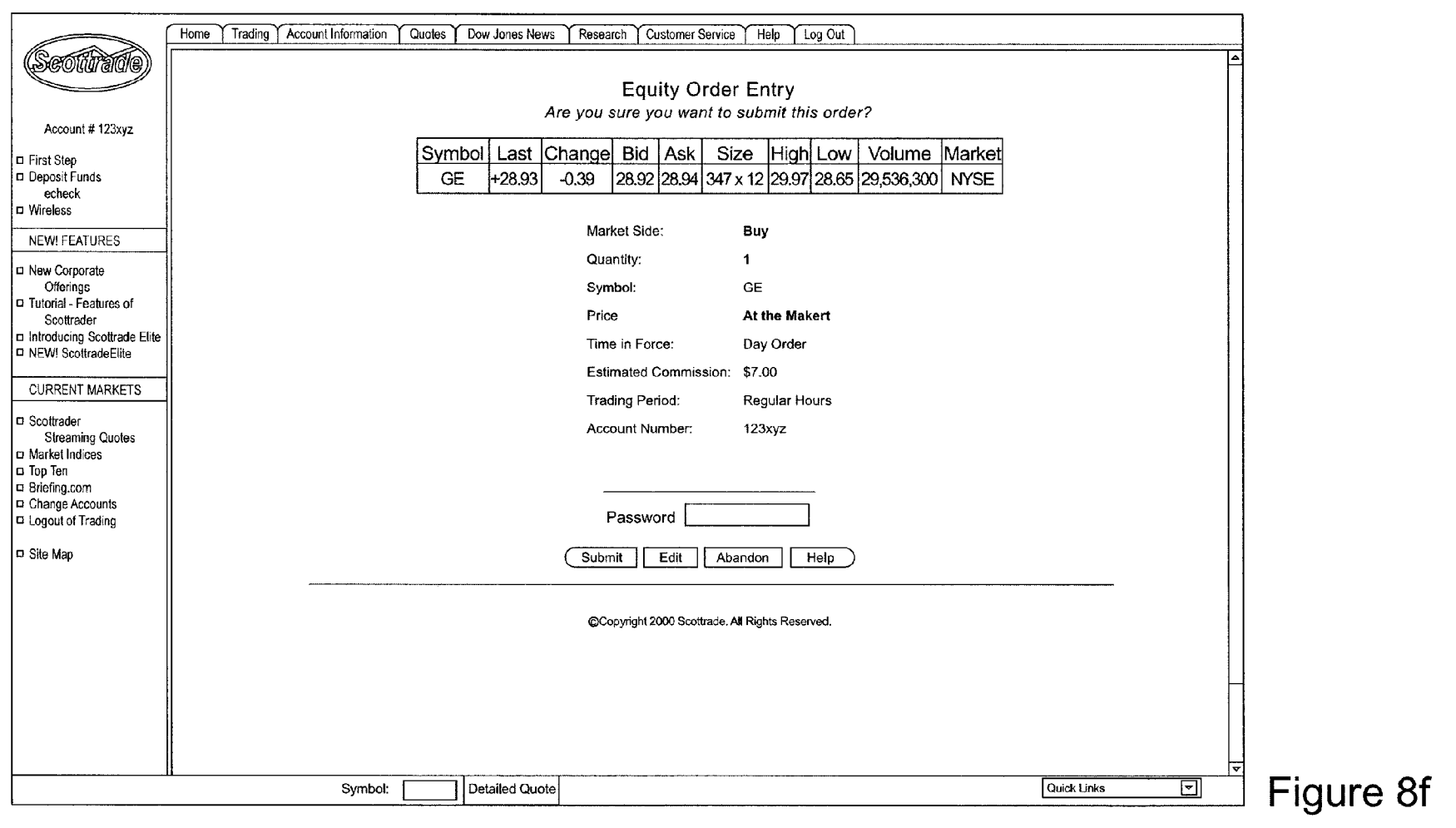

Scottrade

Account # 123xyz

- First Step
- Deposit Funds echeck
- Wireless

NEW! FEATURES
- New Corporate Offerings
- Tutorial - Features of Scottrader
- Introducing ScottradeElite
- NEW! ScottradeElite CURRENT MARKETS
- Scottrader Streaming Quotes
- Market Indices
- Top Ten
- Briefing.com
- Change Accounts
- Logout of Trading
- Site Map

| Home | Trading | Account Information | Quotes | Dow Jones News | Research | Customer Service | Help | Log Out |

Equity Order Entry
*Are you sure you want to submit this order?*

| Symbol | Last | Change | Bid | Ask | Size | High | Low | Volume | Market |
|--------|------|--------|-----|-----|------|------|-----|--------|--------|
| GE | +28.93 | -0.39 | 28.92 | 28.94 | 347 x 12 | 29.97 | 28.65 | 29,536,300 | NYSE |

Market Side:            Buy
Quantity:               1
Symbol:                 GE
Price                   At the Makert
Time in Force:          Day Order
Estimated Commission:   $7.00
Trading Period:         Regular Hours
Account Number:         123xyz Password [        ]

[ Submit ]  [ Edit ]  [ Abandon ]  [ Help ]

©Copyright 2000 Scottrade. All Rights Reserved.

Symbol: [   ]  [ Detailed Quote ]

Quick Links

Figure 8g

Your order has been entered subject to broker approval.

| | |
|---|---|
| Market Side: | Buy |
| Quantity: | 1 |
| Symbol: | GE |
| Price | At the Makert |
| Time in Force: | Day Order |
| Estimated Commission: | $7.00 |
| Account Number: | 123xyz |
| Account Type: | CASH |

Your reference number is: XXB328920031013

Any order entered after market close is good for the next business day.

Help    OK

©Copyright 2000 Scottrade. All Rights Reserved.

Figure 11

Trading (jdoe) Admin

| ○ Indiv ○ Group | Approval Queue | Symbol Admin | Option Admin | Trading control | History |

Symbol Admin

| Equity Symbol (Not Option): | IBM | Lookup | Save |
| --- | --- | --- | --- |
| Route | Normal ▾ | | |
| Buy: | ⦿ Yes ○ No | | |
| Sell: | ⦿ Yes ○ No | | |
| Sell Short: | ⦿ Yes ○ No | Inventory Check Required ▾ | |
| Buy to Cover: | ⦿ Yes ○ No | | |
| Buy to Open: | ⦿ Yes ○ No | | |
| Buy to Close: | ⦿ Yes ○ No | | |
| Sell to Open: | ⦿ Yes ○ No | | |
| Sell to Close: | ⦿ Yes ○ No | | |
| Extended Hours Trading: | ○ Yes ⦿ No | | |
| Option Chain Allowed: | ⦿ Yes ○ No | | |
| Min Lot Size: | 1 | | |
| Margin Requirement: | 50 % | | |
| Add Disallowed Option Root or Symbol: | | Type ▾ | |

Trading (jdoe) Admin

○ Indiv  ○ Group  Approval Queue | Symbol Admin | Option Admin | Trading control | History Search: A B C D E F G H I J K L M N O P Q R S T U V W X Y Z Disallowed Options

| # | Option Symbol | Option Symbol Type | Underlying Security | |
|---|---|---|---|---|
| 1 | .AAM | Root | | Delete |
| 2 | .AAY | Root | | Delete |
| 3 | .AFU | Root | | Delete |
| 4 | .AGK | Root | | Delete |
| 5 | .AHY | Root | | Delete |
| 6 | .AIE | Root | | Delete |
| 7 | .AIX | Root | | Delete |
| 8 | .AKA | Root | | Delete |
| 9 | .ANO | Root | | Delete |
| 10 | .AOP | Root | | Delete |
| 11 | .AOV | Root | | Delete |
| 12 | .AUB | Root | | Delete |
| 13 | .AUE | Root | | Delete |
| 14 | .AYP | Root | | Delete |

Figure 12c

Trading (jdoe) Admin

| ○ Indiv | ○ Group | Approval Queue | Symbol Admin | Option Admin | Trading control | History |

Trading Control

| Trading Type | Entry | Modify | Cancel | NYSE | Nasdaq | Amex |
|---|---|---|---|---|---|---|
| *Master: | ☑ | ☑ | ☑ | ☑ | ☑ | ☑ |
| Equity: | ☑ | ☑ | ☑ | | | |
| Option: | ☑ | ☑ | ☑ | | | |
| Bulletin Board: | ☑ | | | | | |
| Extended Hours: | ☐ | ☐ | ☐ | | | |
| Scottrader: | ☑ | ☑ | ☑ | | | |

Submit

*Turning off Master will turn off all underlying trading entry methods even if checked.

Customers DB

| tbl_day_trader_report | |
|---|---|
| account | varchar(12) |
| office_id | varchar(4) |
| Trades | int |
| Trade_begin_date | smalldatetime |
| Trade_end_date | smalldatetime |
| Report_date | smalldatetime |
| account_value | money |
| value_date | smalldatetime |
| Posted_date | smalldatetime |

| tbl_day_trader_log | |
|---|---|
| account | varchar(10) |
| updated | smalldatetime |

| fix | |
|---|---|
| account | char(8) |
| office_code | char(3) |
| password | varchar(10) |
| email | varchar(100) |
| ssn | char(9) |
| notification_method | tinyint |
| web_access | bit |
| web_trading | bit |
| sell_only | bit |
| invalid_email | bit |
| statements_online | bit |
| session_timeout | int |
| login_fails | int |
| last_access | datetime |
| proxy_delivery_status | tinyint |
| proxy_access_pin | varchar(4) |
| activation_date | smalldatetime |
| activated_by | varchar(6) |
| ivr_pin | varchar(4) |
| day_trader | bit |
| ivr_lockout | bit |
| last_updated | datetime |
| voice_callback | char(12) |
| agreement_status | char(4) |

| customers_without_password_20021111 | |
|---|---|
| account | char(8) |
| office_code | char(3) |
| password | varchar(10) |
| email | varchar(100) |
| ssn | char(9) |
| notification_method | tinyint |
| web_access | bit |
| web_trading | bit |
| sell_only | bit |
| invalid_email | bit |
| statements_online | bit |
| session_timeout | int |
| login_fails | int |
| last_acccess | datetime |
| proxy_delivery_status | tinyint |
| proxy_access_pin | varchar(4) |
| activation_date | smalldatetime |
| activated_by | varchar(6) |
| ivr_pin | varchar(4) |
| day_trader | bit |
| ivr_lockout | bit |
| last_updated | datetime |
| voice_callback | varchar(12) |
| agreement_status | char(4) |
| deactivation_datetime | datetime |
| deactivation_reason_id | smallint |

Figure 13a

| tbl_day_trader | |
|---|---|
| Account | varchar(12) |
| office_id | varchar(4) |
| Trades | int |
| Trade_begin_date | smalldatetime |
| Trade_end_date | smalldatetime |
| Report_date | smalldatetime |
| account_value | money |
| value_date | smalldatetime |
| Posted_date | smalldatetime |

| customer_branches | |
|---|---|
| customer | archar(10) |
| office_code | varchar(3) |

| tmp_adp_table | |
|---|---|
| field 1 | varchar(999) |

| tbl_day_trader_buying_power | | |
|---|---|---|
| account | char(8) | <pk> |
| balance date | smalldatetime | <pk> |
| free_cash | money | |
| trade_date_1 | money | |
| trade_date_2 | money | |
| trade_date_3 | money | |
| market_value_1 | money | |
| market_value_2 | money | |
| market_value_3 | money | |
| maintenance_requirement | money | |

| tbl_pro_quote_status | |
|---|---|
| customer | varchar(10) |
| pro_status | varchar(1) |
| pro_status_old | varchar(1) |
| signed_up_date | datetime |
| exchange | varchar(6) |
| cancelled_date | datetime |
| effect_cancellation_date | datetime |

| tbl_pro_quote_status_history | |
|---|---|
| customer | varchar(10) |
| pro_status | varchar(1) |
| pro_status_old | varchar(1) |
| signed_up_date | datetime |
| exchange | varchar(6) |
| cancelled_date | datetime |
| effect_cancellation_date | datetime |
| change_date | datetime |
| data_action | varchar(15) |

Figure 13b

| tbl_customer636 | |
|---|---|
| account | char(8) |
| office_code | char(3) |
| password | varchar(10) |
| email | varchar(100) |
| ssn | char(9) |
| notification_method | tinyint |
| web_access | bit |
| web_trading | bit |
| sell_only | bit |
| invalid_email | bit |
| statements_online | bit |
| session_timeout | int |
| login_fails | int |
| last_access | datetime |
| proxy_delivery_status | tinyint |
| proxy_access_pin | varchar(4) |
| activation_date | smalldatetime |
| activated_by | varchar(6) |
| ivr_pin | varchar(4) |
| day_trader | bit |
| ivr_lockout | bit |
| last_updated | datetime |
| voice_callback | char(12) |
| agreement_status | char(4) |

| tbl_proxy_status_change | |
|---|---|
| account | char(8) |
| change_datetime | datetime |
| old_proxy_access_pin | char(4) |
| old_proxy_delivery_status | tinyint |
| new_proxy_access_pin | char(4) |
| new_proxy_delivery_status | tinyint |
| old_email | varchar(100) |
| new_email | varchar(100) |

| tbl_user | | |
|---|---|---|
| account_parent | char(8) | <pk> |
| account_child | char(8) | <pk> |
| display_name | varchar(25) | |
| last_modified_datetime | datetime | |

| already_off | |
|---|---|
| account | char(8) |

| bounced | |
|---|---|
| small | varchar(150) |

| tbl_customer_note | | |
|---|---|---|
| customer_note_id | int | <pk> |
| account | char(8) | |
| note | varchar(8000) | |
| note_created | datetime | |
| note_last_updated | datetime | |

Figure 13c

| profiles_original | |
|---|---|
| customer | varchar(10) |
| broker | varchar(20) |
| first_name | varchar(50) |
| last_name | varchar(50) |
| address_1 | varchar(40) |
| address_2 | varchar(40) |
| city | varchar(30) |
| state | varchar(20) |
| zip | varchar(10) |
| pin | varchar(4) |
| voice_callback | varchar(20) |
| fax_callback | varchar(20) |
| notification_method | varchar(20) |
| quote_balance | decimal(10,2) |
| group_number | int |
| ivr_trading | bit |
| pc_trading | bit |
| web_trading | bit |
| margin_agreement | bit |
| option_agreement | bit |
| touched | datetime |
| office_code | varchar(10) |
| password | varchar(10) |
| customer_type | varchar(40) |
| email | varchar(100) |
| reg_rep | varchar(10) |
| option_purchase | int |
| option_covered | int |
| administrator | int |
| cancel_flag | int |
| short_name | varchar(40) |
| admin_level | int |
| allow_place_trades | int |
| ivr_time | int |
| ssn | varchar(9) |
| scheme_name | varchar(20) |
| web_group | int |
| expiration_minutes | int |
| invalid_email | bit |
| AMEX_agreement | bit |
| AMEX_agreement_version | varchar(10) |
| AMEX_agreement_date | smalldatetime |
| OPRA_agreement | bit |
| OPRA_agreement_version | varchar(10) |
| OPRA_agreement_date | smalldatetime |
| NYSE_agreement | bit |
| NYSE_agreement_version | varbinary(10) |
| NYSE_agreement_date | smalldatetime |
| cookies_time | smalldatetime |
| statements_online | bit |
| proxy_delivery_status | tinyint |
| proxy_access_pin | varchar(4) |
| day_trader | bit |

Figure 13d

| profiles | |
|---|---|
| customer | varchar(10) |
| broker | varchar(20) |
| first_name | varchar(50) |
| last_name | varchar(50) |
| address_1 | varchar(40) |
| address_2 | varchar(40) |
| city | varchar(30) |
| state | varchar(20) |
| zip | varchar(10) |
| pin | varchar(4) |
| voice_callback | varchar(20) |
| fax_callback | varchar(20) |
| notification_method | varchar(20) |
| quote_balance | decimal(10,2) |
| group_number | int |
| ivr_trading | bit |
| pc_trading | bit |
| web_trading | bit |
| margin_agreement | bit |
| option_agreement | bit |
| touched | datetime |
| office_code | varchar(10) |
| password | varchar(10) |
| customer_type | varchar(40) |
| email | varchar(100) |
| reg_rep | varchar(10) |
| option_purchase | int |
| option_covered | int |
| administrator | int |
| cancel_flag | int |
| short_name | varchar(40) |
| admin_level | int |
| allow_place_trades | int |
| ivr_time | int |
| ssn | varchar(9) |
| scheme_name | varchar(20) |
| web_group | int |
| expiration_minutes | int |
| invalid_email | bit |
| AMEX_agreement | bit |
| AMEX_agreement_version | varchar(10) |
| AMEX_agreement_date | smalldatetime |
| OPRA_agreement | bit |
| OPRA_agreement_version | varchar(10) |
| OPRA_agreement_date | smalldatetime |
| NYSE_agreement | bit |
| NYSE_agreement_version | varchar(50) |
| NYSE_agreement_date | smalldatetime |
| cookies_time | smalldatetime |
| statements_online | bit |
| proxy_delivery_status | tinyint |
| proxy_access_pin | varchar(4) |
| day_trader | bit |

Figure 13e

| agreement_status_opra_audit | |
|---|---|
| customer | char(8) |
| agreement_id | int |
| pro_status | tinyint |
| signed | tinyint |
| first_name | varchar(50) |
| last_name | varchar(50) |
| address1 | varchar(50) |
| address2 | varchar(50) |
| city | varchar(50) |
| state | char(2) |
| zip | varchar(10) |
| country | varchar(50) |
| birthdate | datetime |
| change_datetime | datetime |
| action_performed | char(1) |
| username | varchar(40) |

| agreement_status_nyse_audit | |
|---|---|
| customer | char(8) |
| agreement_id | int |
| pro_status | tinyint |
| signed | tinyint |
| first_name | varchar(50) |
| last_name | varchar(50) |
| address1 | varchar(50) |
| address2 | varchar(50) |
| city | varchar(50) |
| state | char(2) |
| zip | varchar(10) |
| country | varchar(50) |
| change_datetime | datetime |
| action_performed | char(1) |
| username | varchar(40) |
| amax_pro_status | tinyint |

| agreement_status_nasdaq_audit | |
|---|---|
| customer | char(8) |
| agreement_id | int |
| pro_status | tinyint |
| signed | tinyint |
| subscriber | varchar(100) |
| signature | varchar(101) |
| signature_date | datetime |
| agent_name | varchar(101) |
| title | varchar(101) |
| title_other | varchar(101) |
| change_datetime | datetime |
| action_performed | char(1) |
| username | varchar(40) |

Figure 13f

| tbl_notification_type | |
|---|---|
| notification_method_id | tinyint |
| notification_method_description | varchar(15) |

| tbl_new_added_account | |
|---|---|
| account | varchar(10) |
| added_time | smalldatetime |
| actions | varchar(1) |
| time_posted | smalldatetime |

| HighActivityAccounts | |
|---|---|
| account | varchar(12) |
| ActivityCount | int |

| dtproperties | | |
|---|---|---|
| id | int | <pk> |
| objectid | int | |
| property | varchar(64) | <pk> |
| value | varchar(255) | |
| uvalue | nvarchar(255) | |
| lvalue | image | |
| version | int | |

| tbl_customer_counts | | |
|---|---|---|
| tbl_customer_counts_id | int | <pk> |
| record_date | datetime | |
| customer_count | int | |
| agreement_count | int | |

| tbl_account_3 | |
|---|---|
| account | char(8) |
| TYPE3 | money |

| tbl_email_check_log | |
|---|---|
| start_datetime | datetime |
| total_invalid_email | int |
| total_updated_email | int |
| end_datetime | datetime |
| duration | int |

| invalid_emails_preprocessing | |
|---|---|
| email | varchar(100) |
| Checked | bit |
| Imported_date | datetime |

Figure 13g

| profiles_backup_20021021_2000 | |
|---|---|
| customer | varchar(10) |
| broker | varchar(20) |
| first_name | varchar(50) |
| last_name | varchar(50) |
| address_1 | varchar(40) |
| address_2 | varchar(40) |
| city | varchar(30) |
| state | varchar(20) |
| zip | varchar(10) |
| pin | varchar(4) |
| voice_callback | varchar(20) |
| fax_callback | varchar(20) |
| notification_method | varchar(20) |
| quote_balance | decimal(10,2) |
| group_number | int |
| ivr_trading | bit |
| pc_trading | bit |
| web_trading | bit |
| margin_agreement | bit |
| option_agreement | bit |
| touched | datetime |
| office_code | varchar(10) |
| password | varchar(10) |
| customer_type | varchar(40) |
| email | varchar(100) |
| reg_rep | varchar(10) |
| option_purchase | int |
| option_covered | int |
| administrator | int |
| cancel_flag | int |
| short_name | varchar(40) |
| admin_level | int |
| allow_place_trades | int |
| ivr_time | int |
| ssn | varchar(9) |
| scheme_name | varchar(20) |
| web_group | int |
| expiration_minutes | int |
| invalid_email | bit |
| AMEX_agreement | bit |
| AMEX_agreement_version | varchar(10) |
| AMEX_agreement_date | smalldatetime |
| OPRA_agreement | bit |
| OPRA_agreement_version | varchar(10) |
| OPRA_agreement_date | smalldatetime |
| NYSE_agreement | bit |
| NYSE_agreement_version | varbinary(10) |
| NYSE_agreement_date | smalldatetime |
| cookies_time | smalldatetime |
| statements_online | bit |
| proxy_delivery_status | tinyint |
| proxy_access_pin | varchar(4) |
| day_trader | bit |

Figure 13h

Orders DB

| tbl_orders_audit | |
|---|---|
| web_tracking_number | varchar(15) |
| reviewing_broker_id | int |
| bid | money |
| ask | money |
| net_equity | money |
| amount | money |
| open_amount | money |
| open_shares | int |
| executions | money |
| free_cash | money |
| buying_power | money |
| fed_call | money |
| trade_balance | money |
| market_value | money |
| entry_time | datetime |
| ip_address | varchar(16) |
| localhost | varchar(16) |
| query_string | varchar(255) |
| available_buying_power | money |
| positions_shares | int |
| daytrader_execution_amount | money |

| tbl_orders | |
|---|---|
| web_tracking_number | char(15) <pk> |
| fix_tracking_number | char(15) |
| orig_web_tracking_number | char(15) |
| account | char(8) |
| branch_code | char(3) |
| order_status | tinyint |
| route_type | tinyint |
| account_type | tinyint |
| order_type | tinyint |
| action_type | tinyint <fk> |
| symbol | varchar(12) |
| quantity | int |
| quantity_filled | int |
| price_type | tinyint |
| limit_price | money |
| stop_price | money |
| tif_type | tinyint |
| trading_session_type | tinyint |
| exec_destination | varchar(12) |
| commission | varchar(10) |
| dnr | bit |
| dni | bit |
| aon | bit |
| ob | bit |
| wi | bit |
| fok | bit |
| referral_program | bit |
| possible_duplicate | bit |
| solicited | bit |
| minimum_quantity | int |
| source_type | tinyint |
| entry_time | datetime |

To Figure 14(d) — FK_5bl_orders_tbl_action_type

Figure 14b

| tbl_trade_history | |
|---|---|
| account | char(8) |
| account_type_id | int |
| action_id | int |
| symbol | varchar(30) |
| quantity | numeric(15,3) |
| price | numeric(15,3) |
| trade_date | smalldatetime |
| settled_date | smalldatetime |
| trade_number | int |
| commission | money |
| principal | money |
| tax | money |
| interest | money |
| fees | money |
| description | varchar(50) |
| last_modified | smalldatetime |

| tbl_order_results | |
|---|---|
| web_tracking_number | varchar(15) |
| result_type | tinyint |
| result_from_type | tinyint |
| message | varchar(500) |
| time_stamp | datetime |

Figure 14c tbl_trading_session_type

| | |
|---|---|
| trading_session_type_id | tinyint |
| trading_session_type_description | varchar(30) | tbl_orders_pending_dr

| | |
|---|---|
| web_tracking_number | varchar(15) |
| account | varchar(8) |
| route_type | tinyint |
| time_lock | datetime |
| locked | bit |
| assigned_emp_id | smallint |
| working_emp_id | smallint |
| entry_time | datetime | ordex_counts

| | | |
|---|---|---|
| orders | int | |
| executions | int | |
| ivr_orders | int | |
| ivr_executions | int | |
| ivr_equities | int | |
| ivr_options | int | |
| rpt_date | datetime | <pk> |
| executions_filled | int | | account_type

| | | |
|---|---|---|
| account_type_id | int | <pk> |
| account_type_name | varchar(20) | |

Figure 14e

| tbl_restrictions | |
|---|---|
| name | varchar(30) |
| value | varchar(256) |
| data_type | tinyint |
| date_changed | datetime |
| changed_by | varchar(30) |

| tbl_restrictions_audit | | |
|---|---|---|
| restrictions_audit_id | int | <pk> |
| name | varchar(30) | |
| audit_datetime | datetime | |
| previous_value | varchar(256) | |
| previous_date_changed | datetime | |
| previous_change_by | varchar(30) | |
| new_value | varchar(256) | |
| new_date_changed | datetime | |
| new_change_by | varchar(30) | |

| tbl_daily_security_load_staging | |
|---|---|
| DataColumn | varchar(30) |

| tbl_daily_security_list | |
|---|---|
| cusip | char(9) |
| symbol | varchar(7) |
| margin_flag | bit |
| last_known_price | money |

| tbl_fix_branches | |
|---|---|
| branch | char(3) |
| remote_ip | varchar(15) |
| remote_port | int |
| local_hostname | varchar(20) |
| heartbeat_int | int |
| target_comp_id | varchar(6) |
| sender_comp_id | varchar(6) |
| fix_version | varchar(4) |
| fix_port_type | int |
| port_status | int |

Figure 15a

| tbl_notification_method_type | |
|---|---|
| notification_method_type_id | tinyint |
| notification_method_type_description | varchar(25) |

| tbl_negative_quantities | | |
|---|---|---|
| negative_quantities_id | int | <pk> |
| account | char(8) | |
| office_code | char(3) | |
| message | varchar(50) | |
| acknowledge | tinyint | |
| date_time | smalldatetime | |

| security_update_from_SQL1 | |
|---|---|
| symbol | varchar(9) |
| route | tinyint |
| trade_during_extended_hours | bit |
| option_chain_disallowed | bit |
| margin_requirement_percent | tinyint |
| trading_action_bitmask | tinyint |

| tbl_short_archive | | |
|---|---|---|
| shorts_archive_id | int | <pk> |
| cusip | char(10) | |
| description | varchar(60) | |
| symbol | varchar(10) | |
| total_shares_available_for_short | int | |
| processed_date | smalldatetime | |

Figure 15b

Trading (jdoe) Admin

◯ Indiv  ◉ Group  Approval Queue  (Hide) | Symbol Admin | Option Admin | Trading control | History

Do Not Use Browser Back/Forward Buttons

Approval (Group) [Refresh]

Disable Auto Refresh (2-2)
(disable Auto Refresh to enable Flush Queue option)

[Emergency Flush]   Show [15 ▾] Orders

Orders: 2          N = New ORder : M = Modify Order : X = Cancel Order          10/14/2003 3:36:48 PM [Flush ▾]

| Manual | Account | Market Side | Quantity | Symbol | Price | TIF | Action | Assigned | Working | Display | Done |
|--------|---------|-------------|----------|--------|-------|-----|--------|----------|---------|---------|------|
|        | 55822397 | Sell to Open | 1 | .AMRBM | M | Day | N | bbreer |  | Brief | Done |
|        | 76631739 | Sell to Open | 3 | .BKKG | M | Day | N | rdenning |  | Brief | Done |

Do Not Use Browser Back/Forward Buttons
Order Approval

Reason Selection:
Reason Text:

Approve    Reject    Done    Cancel Edit

| | Account | Status | Route | Order | Action | Quantity | Symbol | Price | TIF | AON | Account Type | Trading Session | Possible Duplicate | Entry Time | Web Tracking Number | Branch |
|---|---|---|---|---|---|---|---|---|---|---|---|---|---|---|---|---|
| Orig | 123xyz | Pending Modify | Fix | New | Sell to Open | 120 | .QQQJJ | L015 | Day | Yes | Margin | Regular | No | 10/14/2003 3:40:27 PM | XQA24032003I014-Orig | 10D |
| Mod | 123xyz | Sent | Approval | Modify | Sell to Open | 120 | .QQQJJ | L 0.1 | Day | Yes | Margin | 9 | No | 10/14/2003 3:41:54 PM | PS8815920031014 | 10D |

| | Margin Buying Power | Trading Cash |
|---|---|---|
| | 1,200.00 | 38,652.00 | -346,064.21 |

Results

| Web Tracking Number | Result Type | Result From Type | Message | Time Stamp |
|---|---|---|---|---|
| PS8815920031014 | Re-route | Rules | Option Sell Call to Open | 10/14/2003 3:41:54 PM |

.QQQJJ Quote

| Market | Last | Change | Size | Bid | Ask | B/A Size | High | Low | Volume | UPC11830 | Halted | Fast Market |
|---|---|---|---|---|---|---|---|---|---|---|---|---|
| CBOE | +0.10 | -0.05 | 10 | -0.05 | 0.15 | 24134 x 31964 | 0.10 | 0.05 | 7,323 | No | No | No |

Figure 16c

| Configure | | | | | ☒ |
|---|---|---|---|---|---|
| Quote Source: | ATFI ▽ | Restart | ☑ Cache | ☑ Cache Movers | |
| Level2 Source: | None ▽ | Restart | | | |
| Fundamentals Source: | ATFI ▽ | Restart | | | |
| | ATFI | | | | |
| News Source: | Bridge | Restart | | | |
| | None | | | | |
| History Source: | ATFI ▽ | Restart | ☑ Cache | | |

General

| | | | |
|---|---|---|---|
| Request Handler Threads: | 30 | + | - |
| Update Handler Threads: | 20 | + | - |
| Stream Update Threads: | 20 | + | - |
| History Update Threads: | 10 | + | - |

Security Cache Expiration: 3600  Option Chain Expiration: 3600
Movers Cache Expiration: 30  Company Data Expiration: 1800

ATFI

Ip: ATF15  Apply  MDS Connections: 1
Request Handler Threads: 12  + −  DBM Connections: 11  +

General

Socket Source: Async ▽  Stop  Restart
Max connections: 100  Drop All

General

Ip: [          ]  OK  Cancel

Figure 19f

SYSTEM AND METHOD FOR THE AUTOMATED BROKERAGE OF FINANCIAL INSTRUMENTS

CROSS-REFERENCE AND PRIORITY CLAIM TO RELATED APPLICATION

This application is a divisional of pending U.S. application Ser. No. 10/692,067, filed Oct. 22, 2003, published as U.S. Patent Application Publication 2004/0167840, the entire disclosure of which is incorporated herein by reference.

FIELD OF THE INVENTION

The present invention relates to an automated electronic system for processing orders from investors for transactions of financial instruments and supplying financial account information to investors.

BACKGROUND AND SUMMARY OF THE INVENTION

In the present day, investors are discovering that computers and, in particular, computer networks such as the Internet, are a particularly useful tool for managing and tracking their financial investment portfolio. Whether it is an individual investor seeking to occasionally buy or sell stocks, bonds, or other financial instruments; a day trader conducting numerous such transactions each day; or a professional investor such as a licensed broker who manages the financial portfolios of numerous clients; access via a computer network to financial markets to conduct these transactions is now and increasingly more so in the future an important channel for execution of this business.

Thus, a need in the art has developed for an infrastructure that both supports access to the financial markets and provides fast and efficient management of those transactions. In previous systems known to the inventors herein, such infrastructure as adopted and used in the prior art took on a client-server model such as that shown in FIG. 1.

As shown in FIG. 1, a trading company maintains a system 100 that includes a back office mainframe computer 102 on which customer account data is stored. This customer account data generally includes personal information about each customer (e.g., name, address, etc.), the investment positions of each customer (e.g., what stocks that customer owns), the value of those positions, and any other pertinent account information. To provide access to this account information, one or more web servers 104 are provided to allow a customer 108 to access the account information in the mainframe 102 via a computer network 106. Business logic that is resident on either or both of the web servers 104 and the mainframe 102 operates to process activity requests from a customer such as (1) buying/selling financial instruments on a trading market 114 through a gateway 116 that formats the order requests in accordance with the market specifications and (2) getting current quote data for financial instruments from a quote vendor 112. For a system 100 that experiences high customer traffic, redundant web servers are placed behind a load balancer 110 in order to alleviate any potential delays due to bottlenecks. Incoming activity requests from the customer 108 are distributed by the load balancer 110 to an available web server 104.

However, as electronic trading of financial instruments has grown more popular, the demands placed on the system of FIG. 1 have also increased. In handling this increased demand, the inventors herein have found that such a system is not easily scalable to accommodate high traffic volume. The approach of merely adding new web servers is only a partial solution to the problem for many reasons not the least of which is the cost required to provide each new "intelligent" web server and the problems inherent in the distributed logic working well between the increasing number of elements in the network. Recognizing the drawbacks of the prior art system structure and its inherent limitations, the inventors herein have developed a radical new approach for the design of the infrastructure for an automated financial instrument brokerage system.

According to one aspect of the preferred embodiment of the present invention, the inventors herein have abstracted the system's activity request processing business logic onto an intermediate layer that interfaces front end web servers with backend accounting databases, quote vendors, and trading market interfaces. This design effectively "gathers" the logic together into a single intermediate layer and removes it from the front end and back end layers. Such abstraction greatly improves the system's flexibility to accommodate modifications in the backend of the system (e.g., a new accounting database, a new quote vendor, or a new trading market interface) or modifications in the front end of the system (e.g., modifications to the customer interfaces or the addition of new types of customer interfaces such as an interface to wireless devices such as cell phones or personal digital assistants (PDAs)). Accordingly, the intermediate "layer" or tier of business logic can remain unchanged or largely unchanged when such modifications occur.

According to another aspect of the preferred embodiment of the invention, within the intermediate layer, various tasks of the business logic can be segmented to separate dedicated servers to provide further scalability and flexibility. For example, logic for processing order activity requests can be placed on one or more dedicated order servers. Logic for obtaining customer account data from a backend accounting database can be placed on one or more dedicated customer account servers. Logic for obtaining quote data can be placed on one or more dedicated quote servers. This separation of processing tasks onto separate dedicated servers on the basis of processing type, task or function improves the scalability of the system because if any particular server (e.g., the order server, the customer account server, and/or the quote server) becomes bogged down with traffic, an additional redundant server of that particular type can be added to the system for increased processing capabilities. Further, modifications to logic can be more easily implemented due to such segmentation as the logic is isolated on the corresponding dedicated server.

According to another aspect of the preferred embodiment of the present invention, the intermediate layer servers preferably communicate with each other and with the front end layer via TCP/IP communication protocol, which accommodates the front end layer and intermediate layer being physically remote from each other and the various intermediate layer servers being physically remote from each other.

According to another aspect of the preferred embodiment of the present invention, a plurality of redundant servers are preferably implemented in the intermediate layer and a load balancer is preferably used to interface the redundant servers with the front end. The load balancer can also be used to interface the redundant servers with the other server types in the intermediate layer. For example, a load balancer can interface a plurality of redundant order servers with the front end. Preferably, a load balancer is used with a bank of redundant servers for each intermediate layer server type to distribute incoming activity requests among the redundant servers in a balanced manner, thereby greatly decreasing the processing delay for activity requests by eliminating processing bottlenecks. With such a configuration, when additional processing capability is needed for a particular type of processing (e.g., if there is congestion in the bank of redundant order servers), one only needs to add a new redundant server of that type to the system and register that new redundant server with the load balancer for that server group.

According to yet another aspect of the preferred embodiment of the present invention, data caching is preferably utilized in the intermediate layer servers to reduce the need for data transfers between the intermediate layer and the backend layer. For example, resident memory, preferably application-in-memory cache, on a customer account server can be used to store customer account data that has been recently retrieved from the backend accounting database. When an activity request is received by that customer account server that would utilize customer account data that is stored in the cache, the customer account server, in accordance with predetermined usage rules, can process that activity request in accordance with the cached data, thereby alleviating the need for a data transfer from the backend database. Such data caching provides a substantial increase in the speed of processing an activity request. Further, such data caching can also preferably be used in connection with the quote data that the quote server receives from a quote vendor.

According to yet another aspect of the preferred embodiment of the present invention, the intermediate layer can process activity requests generated by the front end layer independently of the customer interface from which the activity request originated (e.g., for activity requests originating from a web site, from a wireless device, or from a touchtone telephone) through the use of a common interface that formats activity requests from any of the customer interfaces in the same manner.

According to yet another aspect of the preferred embodiment of the present invention, quote data can preferably be obtained from multiple quote vendors in a manner transparent to various services in the system, despite potential formatting differences in the quote data from the multiple vendors, because the quote server is preferably configured to convert all quote data into a common data format for internal system wide use, regardless of its source.

According to yet another aspect of the preferred embodiment of the present invention, migration from an old backoffice accounting database system to a new backoffice accounting database system is facilitated by a "three day system" wherein interaction with the old and new backoffice databases proceeds according to a specialized protocol for the first three days of the migration.

These and other features and advantages of the present invention will be in part apparent and in part pointed out in the following description and referenced figures.

BRIEF DESCRIPTION OF THE DRAWINGS

FIGS. 8(a)-(g) illustrate various screenshots for a preferred front end web site customer interface;

FIG. 11 illustrates a screenshot for a preferred front end Java trading application customer interface;

FIGS. 12(a)-(c) illustrate screenshots for various preferred administrator interfaces for controlling the content of the trading admin database;

FIGS. 13 and 13(a)-(m) are preferred table diagrams for the customers database;

FIGS. 14 and 14(a)-(e) are preferred table diagrams for the orders database;

FIGS. 15 and 15(a)-(f) are preferred table diagrams for the trading admin database;

FIGS. 16(a)-(c) are preferred screenshots for various approval desk interfaces;

FIGS. 19(a)-(f) illustrate preferred interfaces for controlling the selection of quote vendors.

DETAILED DESCRIPTION OF THE PREFERRED EMBODIMENTS

Figure 1:
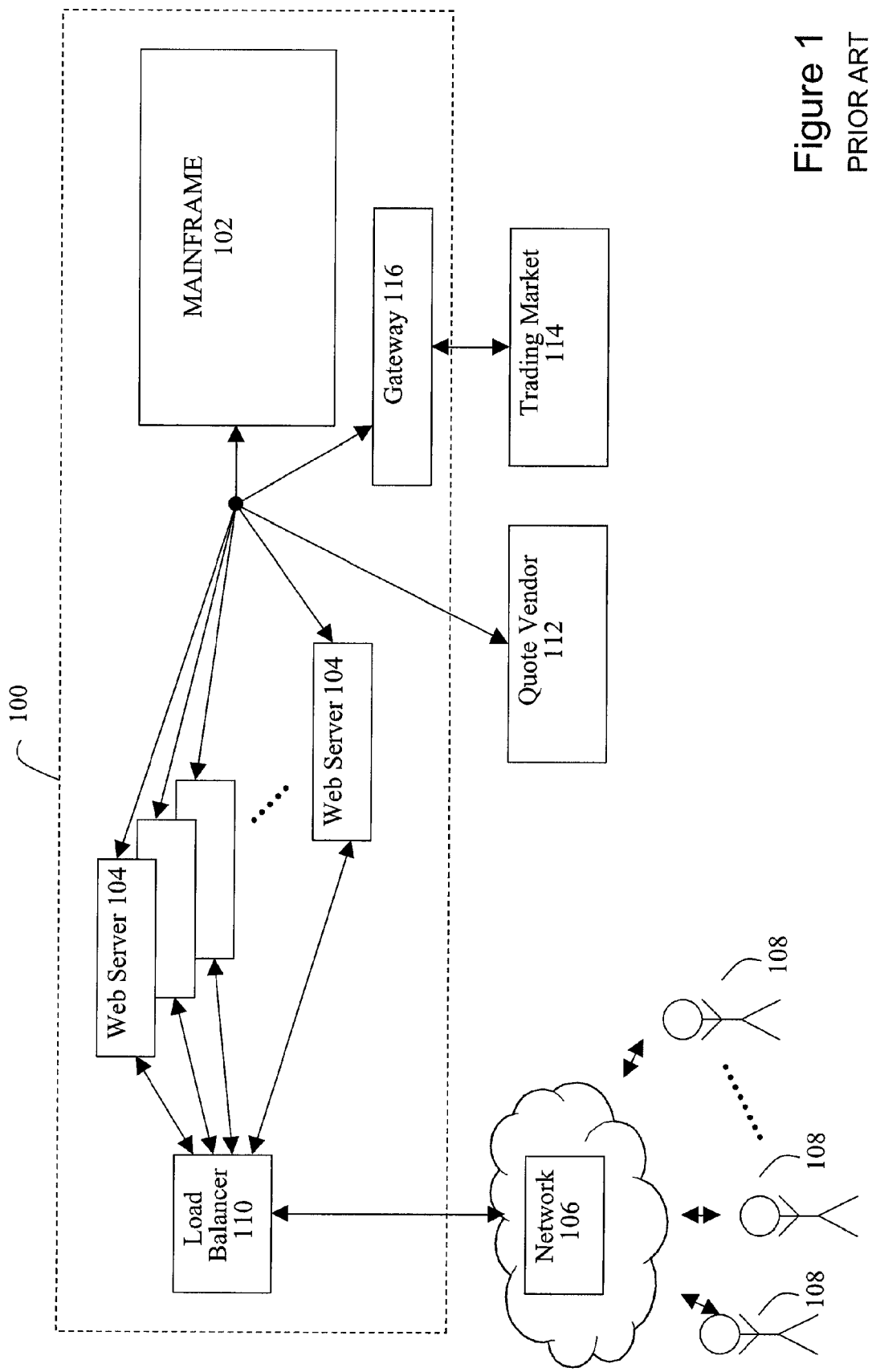
FIG. 1 illustrates a prior art system for processing financial instrument transactions.
Figure 2:
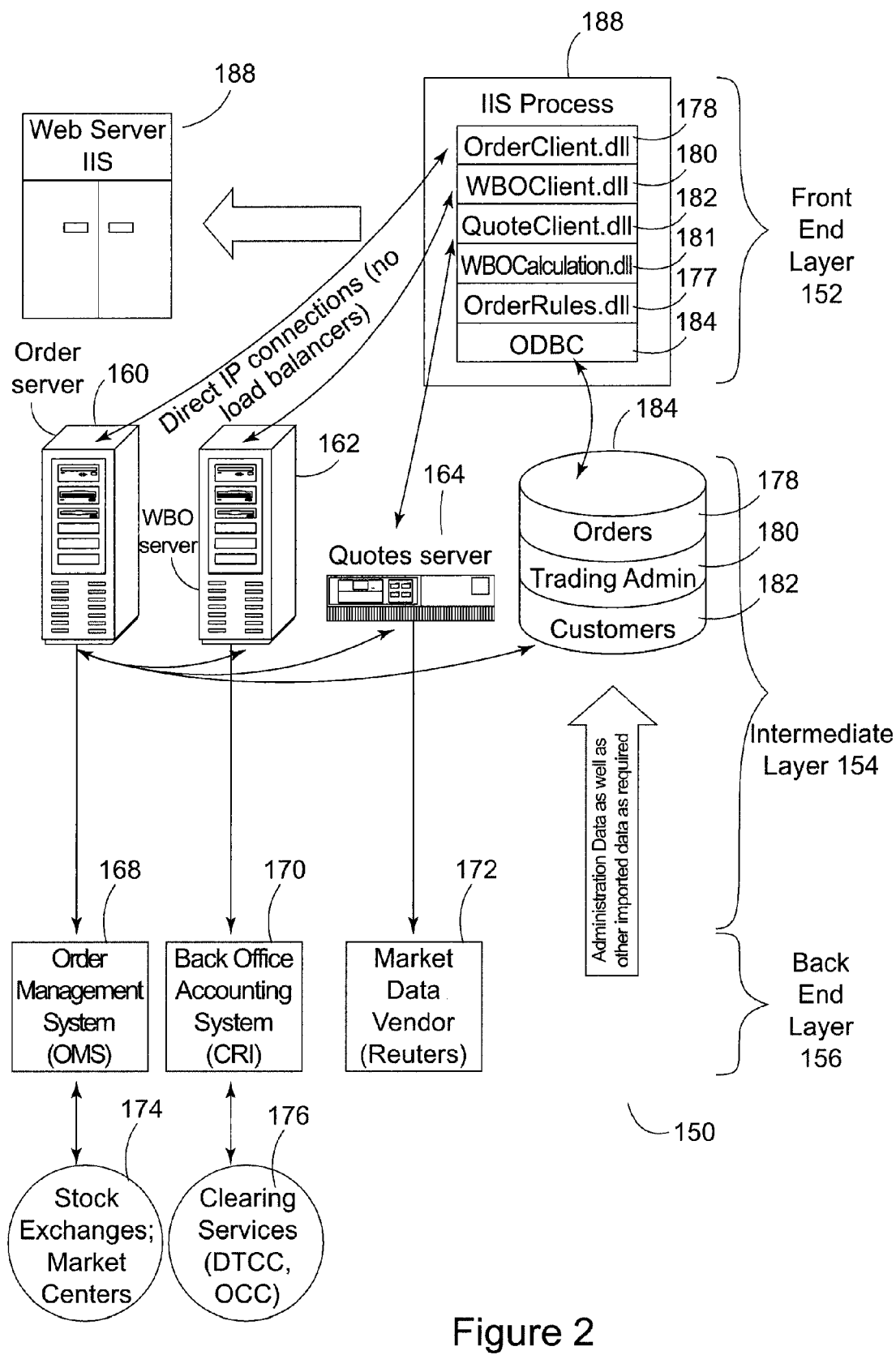
FIG. 2 illustrates a basic configuration for a preferred system of the present invention.

FIG. 2 illustrates a basic configuration for a preferred system 150 of the present invention. The system 150 includes a front end layer 152, an intermediate layer 154, and a back end layer 156.

The front end layer 152 acts an interface between users such as customers or brokers (preferably via a computer network such as the Internet) and the intermediate layer 154. A web server 158 can provide such an interface. Through the web server 158, a user can access a web site associated with the system 150 to initiate activity requests for the system 150. Activity requests can be any action requested by a user that pertains to a capability of the system. Examples of activity requests include, but are not limited to, an order request to buy or sell a financial instrument, a modification request to modify an order to buy/sell a financial instrument, a request to view the portfolio for a given customer account, and a request to view recent trade history for a given customer account. These and other activity requests supported by the preferred embodiment will be discussed further below. Also, it is worth noting that the term "financial instrument" is used in accordance with its ordinary meaning in the art to mean instruments that can be traded on a financial market or through an electronic order matching facility such as ECN, and includes, but is not limited to, items such as stocks, options, mutual funds, futures, securities futures, and the like. The term "financial instrument" does not include checks or money orders.

The front end layer preferably communicates with the intermediate layer through a component object model (COM) interface 188 that is preferably resident on each of the front end servers. The COM interface 188 preferably comprises an OrderRules.dll 177, an OrderClient.dll 178, a WBOClient.dll 180, a WBOCalculations.dll 181, a QuoteClient.dll 182, and an ODBC 184. Additional details about these COM interfaces will be described below.

The OrderRules COM object 177 obtains trading restriction data from the trading administration database described below and validates order activity requests against these restrictions. The OrderClient COM object 178 provides information needed by an order server 160 to process order activity requests. The WBOClient object 180 provides information for obtaining appropriate customer account data from the customer account server 162. The WBOCalculations COM object 181 performs various calculations on the customer account data obtained through the WBOClient object 180. However, it should be noted that the functionality of the WBOCalculations object can be incorporated into the WBOClient object if desired. The QuoteClient object 182 provides information for obtaining appropriate quote data from the quote server 164. The ODBC object 184 provides information for interacting with the SQL database schema 166.

The intermediate layer 154 preferably comprises an order server 160, a customer account server 162, a quote server 164, and an SQL database schema 166.

The order server 160 receives data from the OrderClient object 178 and uses this data to process an order related to a financial instrument. In carrying out this processing, the order server preferably interacts with the other intermediate layer servers as set forth below. When an order is ready to be sent to the trading market, the order server prepares an order message for transmission to the order management system 168 from which it can be acted on by various stock exchanges/market centers 174.

The customer account server 162 receives data from the WBOClient object 180 and uses this data to obtain the appropriate customer account information either from its own cache memory or from a back office accounting database system 170. In the preferred embodiment wherein at least one web server 158 is present in the front end layer 152 to provide access for customers to the system 150 through a web site, the customer account server can be characterized as a web-to-back office (WBO) server because it acts as a gateway between the customer using the website and the back office account information. In further discussions herein, the customer account server 162 will be referred to as a WBO server. However, it should be noted that the customer account server is not limited to being connected at the front end to web applications. Front end access to the customer account server can occur through any known technique of remote data access, including but not limited to LANs, VPNs, dedicated T1 lines, and the like.

The quote server 164 receives data from the QuoteClient object 182 and uses this data to obtain appropriate quote information from quote vendors 172. This quote information is information relating to the pricing of financial instruments, examples of which are set forth below. For example, the quote server can act on a received QuoteClient activity request to obtain the current price for shares of IBM stock.

The SQL database schema 166 receives activity requests from ODBC 184. The schema 166 supports various databases used by other intermediate layer servers when processing activity requests, as will be explained further herein. Preferably, the databases supported by database schema 166 include separate databases for orders (orders database 178), trading administration (trading admin database 180), and customers (customers database 182).

The back end layer 156 preferably comprises an order management system 168 that takes orders from the order server and places those orders on the trading market 174, a back office accounting database system 170 that stores customer account information, and an interface 172 for receiving quote data from a quote vendor. Clearing services 176 provide post trade functionality such as providing the settlement of trades and the movement of money between parties in the market.

Figure 3:
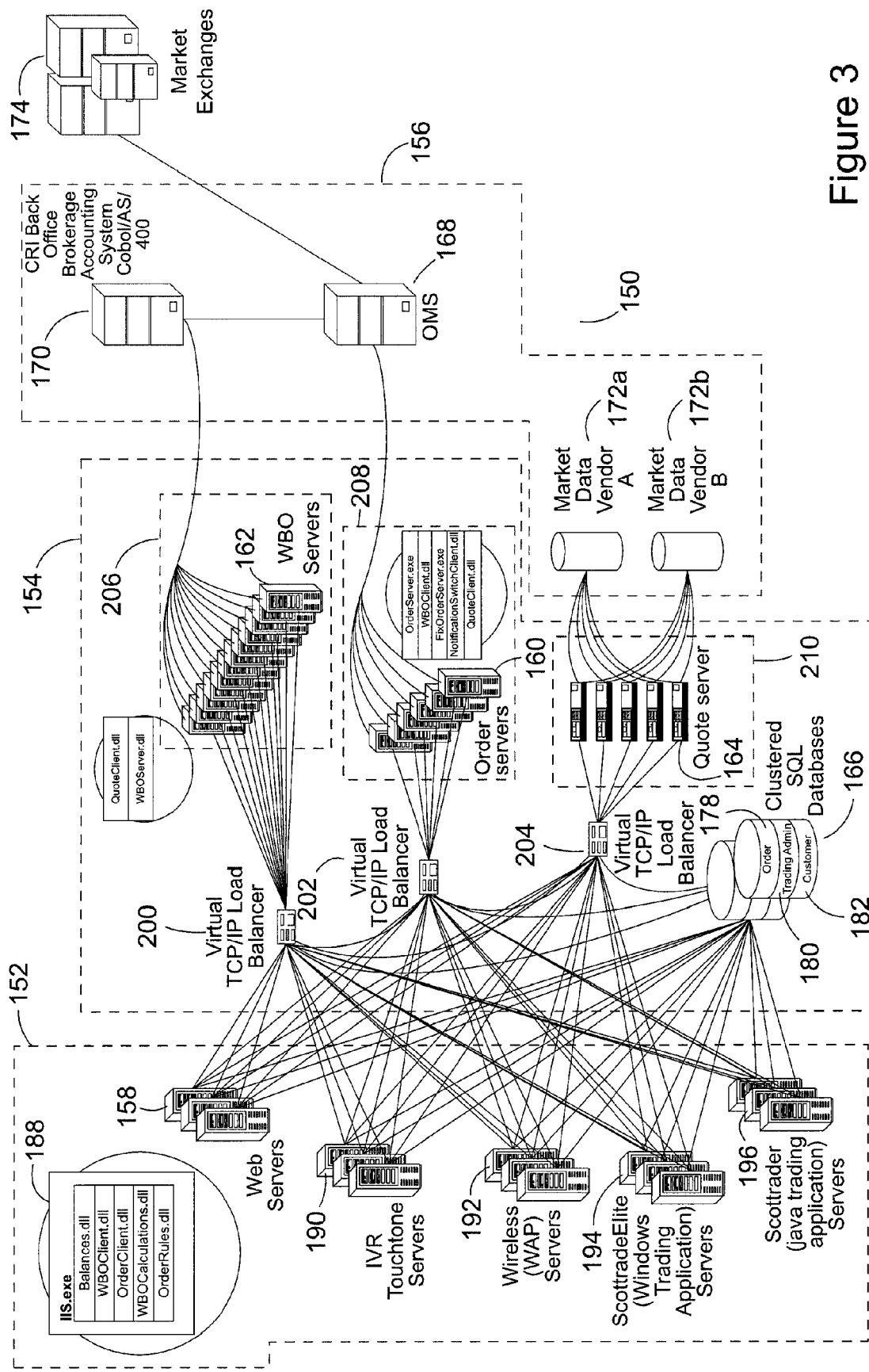
FIG. 3 illustrates another configuration for a preferred system of the present invention.

The scalability and flexibility of the preferred embodiment of the present invention is illustrated with FIG. 3. In connection with the front end layer 152, the use of a common COM interface 188 supports the use of multiple heterogeneous customer interfaces. For example, the preferred embodiment preferably supports a customer interface through a web site, wherein the web site is supported by a plurality of web servers 158. Also, a customer interface through touchtone telephones, including but not limited to voice recognition applications, can be supported through IVR touchtone servers 190. Further, customers can access the system 150 through a wireless device such as a cell phone, pager, personal digital assistant (PDA), and the like through wireless (WAP) servers 192. Lastly, through applications installed and running on a customer's computer, a customer can interact with the system through Windows trading application server 194 and Java trading application servers 196. The Windows trading application servers 194 support ScottradeElite software, which is commercially available from the assignee of the present invention. The Java trading application servers 196 support Scottrader software, which is also commercially available from the assignee of the present invention.

Figure 4:
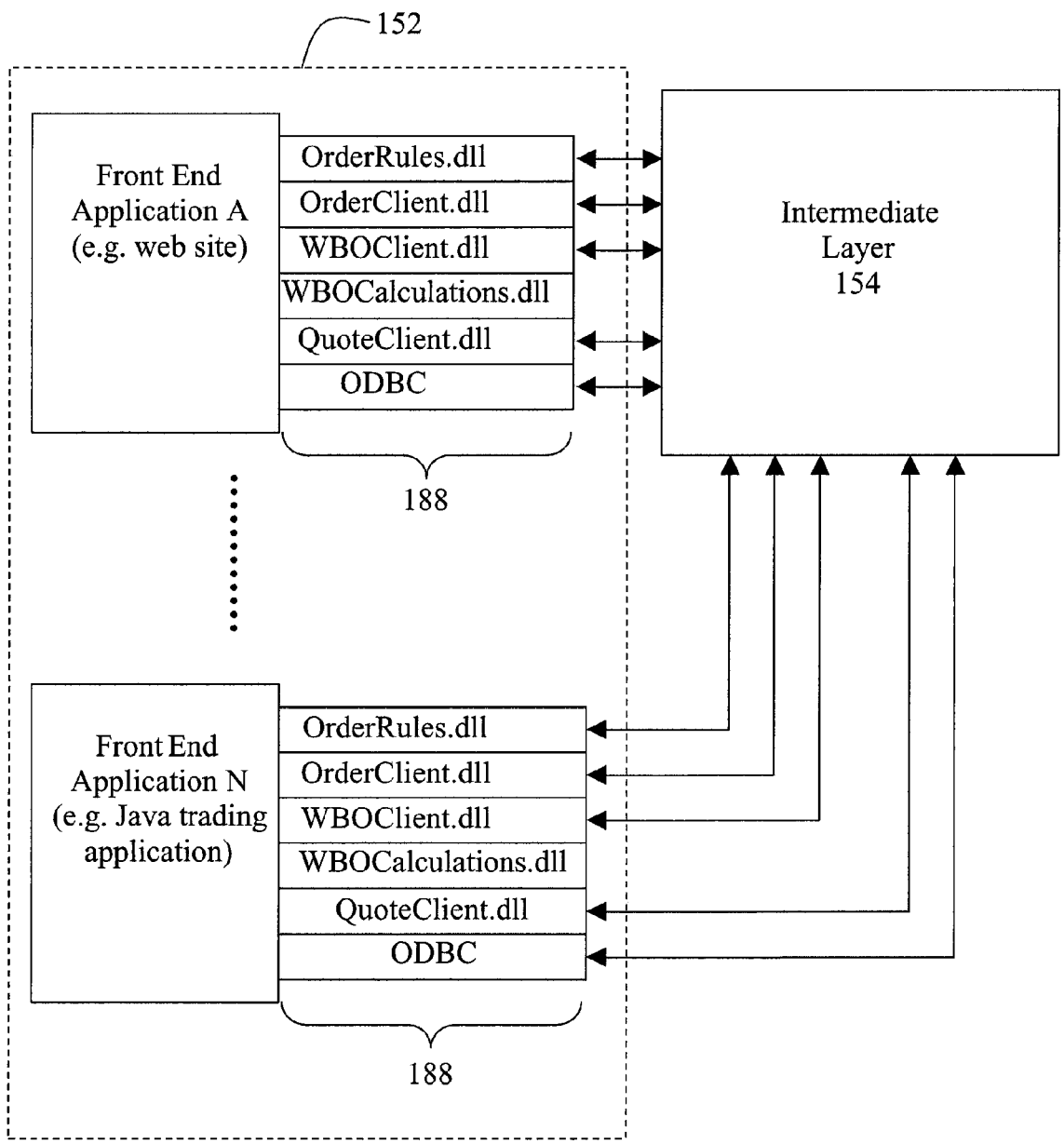
FIG. 4 illustrates the preferred system's use of a common COM interface for the front end layer.

Because each of these heterogeneous customer interfaces interacts with the intermediate layer 154 through a common COM interface 188, the intermediate layer is not affected by modifications to the customer interfaces. FIG. 4 illustrates the use of such a common COM interface 188 for a customer interface through a web site and a customer interface through a wireless device. From the perspective of the intermediate layer, there is no difference between activity requests emanating from the web site or the wireless device. Further, scalability to the front end can be easily provided without altering the intermediate layer through the use of parallel servers in the front end. Thus, if traffic through the web servers 158 is particularly heavy, a new redundant web server can be added to alleviate congestion.

Although not shown in FIG. 3, it should be understood that the front end layer servers preferably interact with the users through various networks (not shown), security firewalls (not shown), and load balancers (not shown) that arbitrate balanced access to the redundant servers. Such implementations at the front end are standard and known in the art, and do not form part of the present invention.

In the intermediate layer 154 of FIG. 3, scalability is provided through the use of redundant order servers 160 in an order server bank 208, redundant WBO servers 162 in a WBO server bank 206, redundant quote servers 164 in a quote server bank 210, and clustered SQL databases for schema 166.

To distribute incoming activity requests in a balanced manner to the various servers, it is preferred that load balancer 200 connect the front end servers with the WBO server bank 162. The load balancer 200 is configured to distribute access to the WBO servers 162 according to a predetermined algorithm (e.g., round robin or any other known technique) in order to prevent server overload and maintain low activity request processing latency. In a preferred embodiment, the load balancers distribute activity requests to awaiting servers according to a "best response time" criteria. Load balancers 202 and 204 preferably provide the same functionality in connection with order server bank 208 and quote server bank 210, respectively. Although in the preferred embodiment, separate load balancers are used for each server type in the intermediate layer, it should be understood that the same load balancer can be used to arbitrate access to both the WBO servers and the quote servers, or any other combination of the different intermediate layer server types. However, because the use of a single load balancer for servers of multiple processing types would introduce a single point of failure to the system 150, the use of multiple load balancers, wherein each load balancer is assigned to a different server type is strongly preferred over the use of a single load balancer. Further, to more greatly ensure high availability of the intermediate layer server, redundant load balancers can be used with each server bank to take over for a load balancer in the event of a load balancer failure. A preferred load balancer for use with the system 150 is a CISCO CSS 11154. However, as should be understood, other load balancers can be used in the practice of the invention.

It is preferred that the load balancers maintain persistent load balanced connections with their redundant servers at the TCP/IP level. Through port monitoring wherein the load balancer checks the "heartbeat" of its connection to each redundant server, the load balancer will be able to detect whenever a server is unavailable. When the load balancer tests its TCP/IP port connection with each server to which it is connected, if no response is heard from the server to a "ping" after a predetermined amount of time has passed (preferably around 3 seconds), the load balancer will remove that server's address from its list of available servers. Thus, the load balancer can prevent incoming activity requests from being distributed to an unavailable server.

The processing flow for handling various activity requests will now be described.

Figure 5:
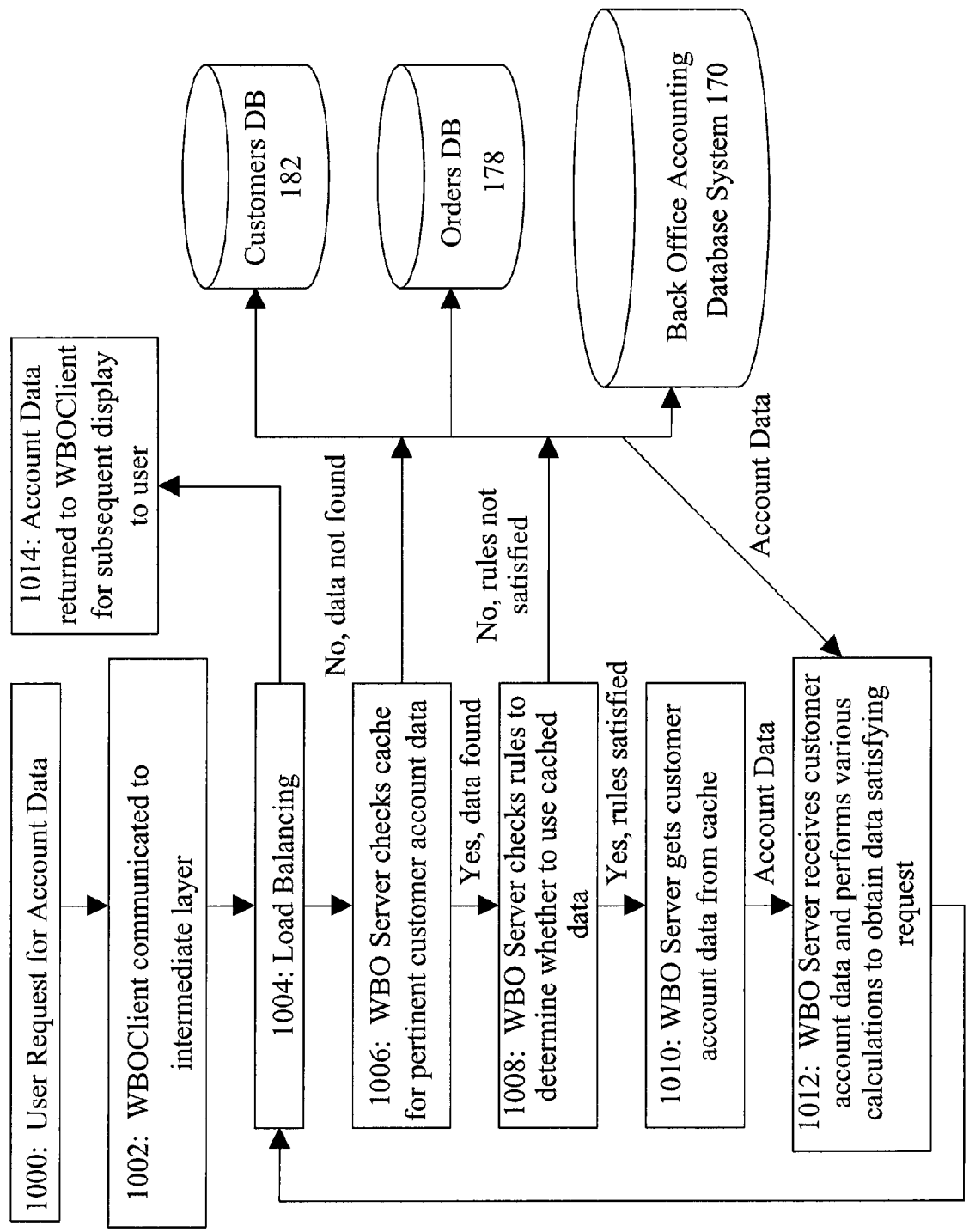
FIG. 5 illustrates a preferred processing flow for handling order activity requests.

FIG. 5 illustrates the processing flow for handling customer account activity requests. A customer account activity request occurs when a requester seeks to obtain information about a particular customer account. In the example of FIG. 5, the requester is a user at the front end layer, but it should be understood that other requesters are possible in the system such as an order server seeking to process an order activity request.

In FIG. 5, at step 1000, the user initiates a request for some type of customer account data (e.g., one or more of the customer's positions, balance, recent trades, etc.). At step 1002, a WBOClient object 178 is communicated to the intermediate layer 154 where it is load balanced (step 1004) and passed to an available WBO server 162.

The WBO server 162 then checks its cache for "fresh" customer account data pertinent to the activity request (step 1006), which will be explained in greater detail below. If pertinent cached data is found at step 1006, then at step 1008, the WBO server determines whether that cached data is to be used. This determination is made according to one or more usage rules, as will be explained in greater detail below. If either step 1006 or step 1008 results in a negative determination, the WBO server will query the backoffice accounting database system 170 for the pertinent customer account data. It is preferred that the WBO server also query the orders database 178 and customers database 182 for any pertinent customer account information that would not be found in the backoffice accounting database system 170. At step 1010, the WBO server gets the pertinent customer account data from either its cache or the backoffice and customers/orders databases as may be appropriate.

Thereafter, at step 1012, WBO server calls performs any calculations that need to be performed on the customer account data to satisfy the customer account activity request, such as a calculation of unsettled balances or the number of day trades for that day. These calculations preferably provide the functionality of the WBOCalculations object.

Upon the completion of step 1012, customer account data that is responsive to the customer account activity request is passed back to the WBOClient 178 through the load balancing step for subsequent display to the user at step 1014. The load balancer preferably keeps an internal flow table to keep track of data that needs to be routed to a specific server rather than an available server.

Figure 6:
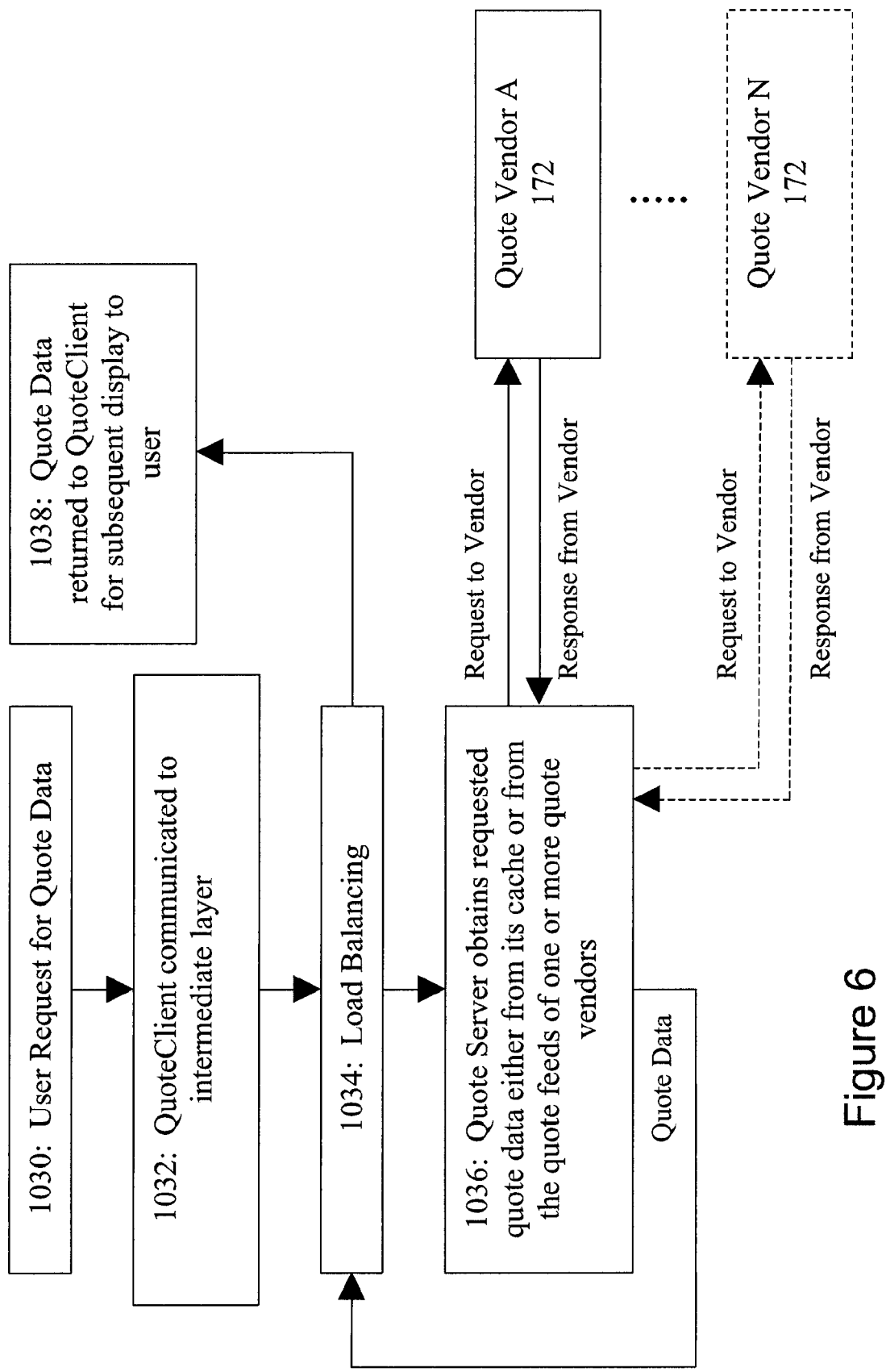
FIG. 6 illustrates a preferred processing flow for handling quote activity requests.

FIG. 6 illustrates the preferred processing flow for handling quote activity requests. A quote activity request occurs when a requester seeks to obtain data related to pricing information about a particular financial instrument. In the example of FIG. 6, the requester is a user, but it should be understood that other requesters are possible, such as an order server seeking to process an order activity request.

In FIG. 6, at step 1030, the user initiates a request for a quote (e.g., a request to see the price at which IBM stock is trading). At step 1032, a QuoteClient object 180 is communicated to the intermediate layer 154 where it is load balanced (step 1034) and passed to an available quote server 164.

The quote server 164 then operates, at step 1036, to obtain the requested quote data either from its cache or from a quote vendor 172, as will be explained in greater detail below. Once the quote server 164 obtains the requested quote data, this quote data is passed back to the QuoteClient object 180 through the load balancing step for subsequent display to the customer (step 1038).

Figure 7:
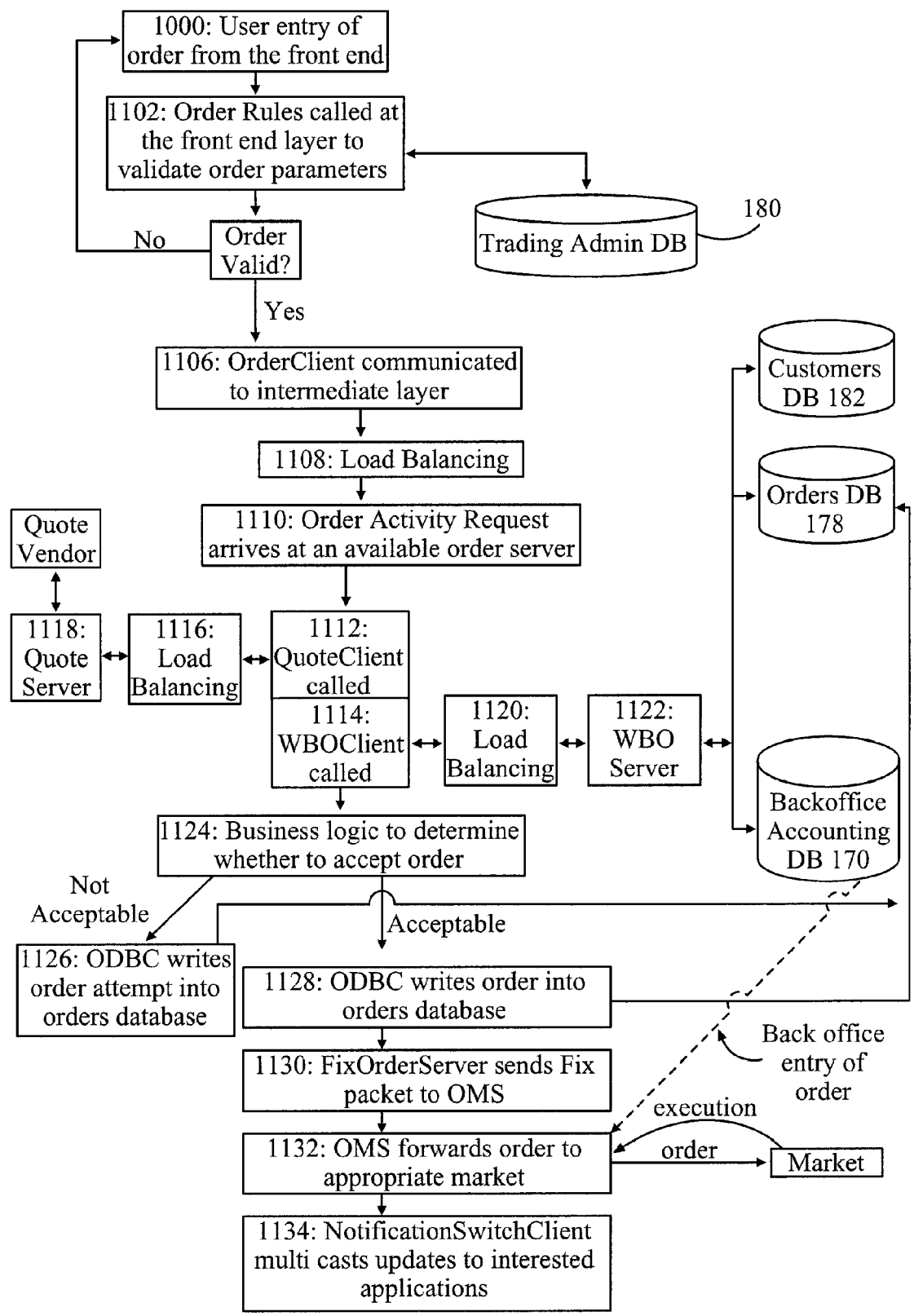
FIG. 7 illustrates a preferred processing flow for handling customer account activity requests.

FIG. 7 illustrates the processing flow for handling order activity requests. An order activity request occurs when a requester seeks to conduct a transaction associated with a financial instrument order. Requestors may be customers or brokers. Typical orders originate from user input through the front end (step 1100).

Thereafter, at the front end, the OrderRules object is called to validate the order activity request against restrictions stored in the trading administration database 180, as will be explained below (step 1102). Then, if the order is valid (step 1104), an OrderClient object is communicated to the intermediate layer (step 1106). If the order is not valid, the remote front end user is notified and the process will await a new order activity request.

The OrderClient object arriving at the intermediate layer is load balanced at step 1108. After load balancing, it arrives at an available order server, which in turn calls QuoteClient (step 1112) and calls WBOClient (step 1114). QuoteClient is called to obtain appropriate pricing information from an available quote server about the financial instrument involved in the order activity request. The QuoteClient request issued by the order server will pass through load balancing at step 1116 to arrive at an available quote server at step 1118 where the pertinent quote data will be obtained and returned to the order server (once again through a load balancing step). WBOClient is called to obtain customer account data from an available WBO server that is pertinent to the order activity request. The WBOClient activity request issued by the order server will pass through load balancing at step 1120 to arrive at an available WBO server at step 1122 where the appropriate customer account data will be obtained from either, all, or some combination of the backoffice accounting database system, the customers database, the orders database, and the WBO server's own cached data. Thereafter, the customer account data is passed back to the order server (after a return trip through a load balancing step).

At step 1124, the order server implements business logic to determine whether the received order activity request should be accepted. Acceptance is generally conditional on the quote data and customer account data revealing whether sufficient buying power exists in the customer's account for the order. This standard business logic is known in the art and will not be elaborated on herein.

It is preferred that the order server at this step also include unique business logic wherein some order activity requests will be passed to an approval desk for human intervention by a broker through an approval desk interface that will be described below. If approved from the approval desk interface, the order activity request will proceed like other orders from step 1124. Preferred conditions for invoking the approval desk include forwarding an order activity request to the approval desk: (1) if the SecurityMaster for the symbol is not set up correctly or is missing routing codes, (2) if a market order is being cancelled, (3) if an options order includes over 200 contracts, (4) if an equity order includes over 50,000 shares, with the share price being at least $1, (5) if an equity order includes over 200,000 shares, with the share price being under $1, (6) if selling an option call to open, (7) if selling short while the market is closed, and (8) if it is near the market's closing time and the order might not reach the exchange floor in sufficient time prior to closing. As should be understood, these conditions may be altered by a practitioner of the invention to meet one's specific business needs.

If step 1124 finds the order to be unacceptable, then, at step 1126, the ODBC object is preferably called to write the order attempt into the orders database, thereby creating audit trail information.

If step 1124 finds the order to be acceptable, then at step 1128, the ODBC object is preferably called as at step 1126. Thereafter, at step 1130, FixOrderServer is called by the order server to format the order activity request as a FIX packet to be sent to the order management system. At step 1132, the order management system forwards the FIX packet created from the order activity request to the appropriate financial market, such as the Nasdaq or NYSE. After acknowledgement of the order transmission is received, the order server calls the NotificationSwitchClient object to create and send multicast packets to inform interested applications of the order transmission. Preferably, this multicast is sent to the WBO servers so that that its cache can be updated and to any front end applications that support real time updates on trades such as the Java trading application and the Windows trading application.

When the market informs the order management system of the order's execution, the NotificationSwitchClient object is preferably called once again by the order server to multicast notice of the execution to interested applications. Preferably, this multicast is sent to the WBO servers so that that its cache can be updated and to any front end applications that support real time updates on trades such as the Java trading application and the Windows trading application.

It is also worth noting that the automated brokerage system of the preferred embodiment supports entry of orders through the backoffice, wherein a broker directly enters an order in the backoffice accounting database system. Such orders are preferably communicated directly from the backoffice accounting database 170 to the order management system at step 1132, as shown in FIG. 7.

I. Front End Layer:

With reference to FIG. 3, the system's front end layer 152 preferably supports a plurality of heterogeneous applications that generate activity requests in response to user input. These heterogeneous front end applications can be thought of as delivery channels from which activity requests are delivered to the intermediate layer 154. From the perspective of the intermediate layer 154, the heterogeneous nature of the various customer interfaces is immaterial due to the commonality of the COM interface 188.

Examples of heterogeneous customer applications supported by the preferred system 150 include website applications provided by web servers 158, touchtone telephone applications provided through IVR touchtone servers 190, wireless device applications from cell phones, pagers, PDAs, and the like through wireless (WAP) servers 192, desktop computer application access through Windows trading application servers 194 and Java trading application servers 196. A Dell 1550, dual 1133 MHz server with 1 GB of RAM and mirrored 18 GB drives is the preferred hardware for the front end servers.

Figure 8B:
Figure 8C:
Figure 9A:
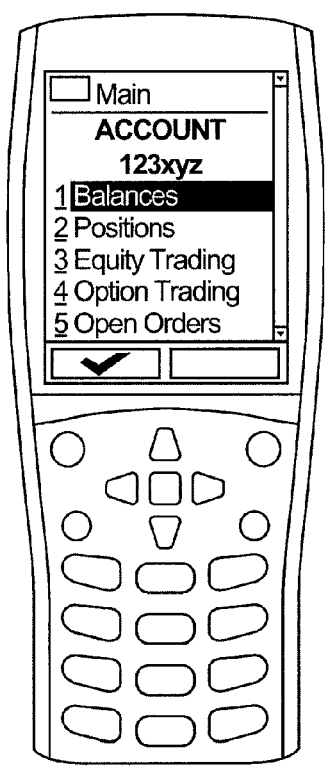
FIGS. 9(a)-(n) illustrate various screenshots for a preferred front end wireless device customer interface.
Figure 9B:
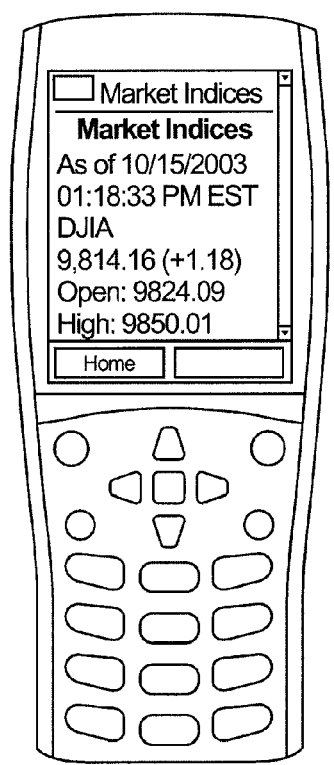
Figure 9C:
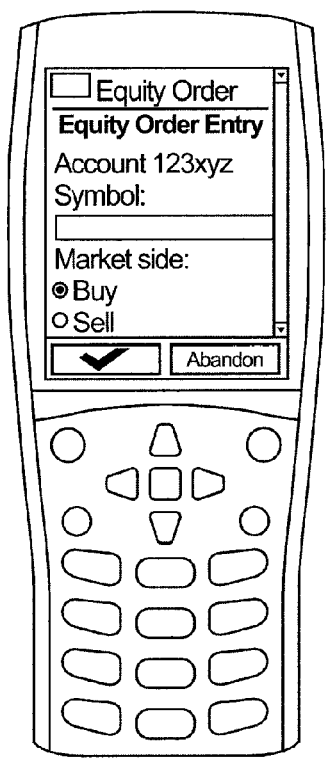
Figure 9D:
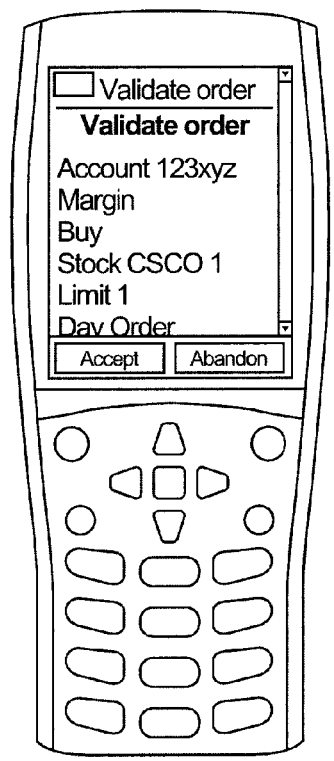
Figure 9E:
Figure 9F:
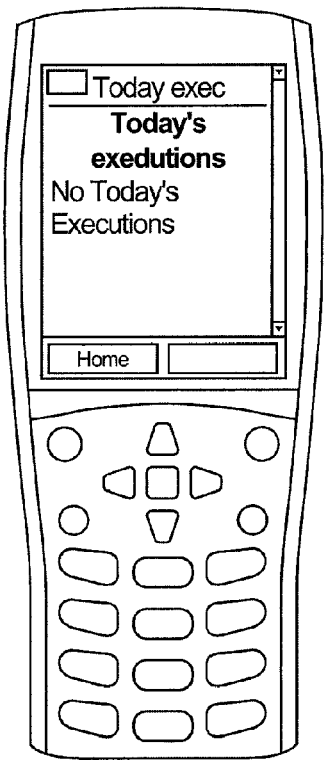
Figure 9G:
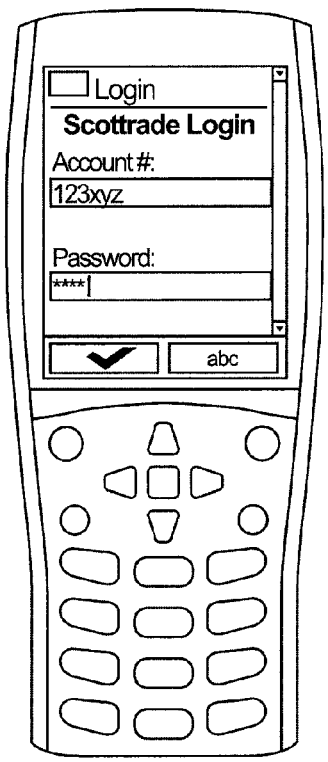
Figure 9H:
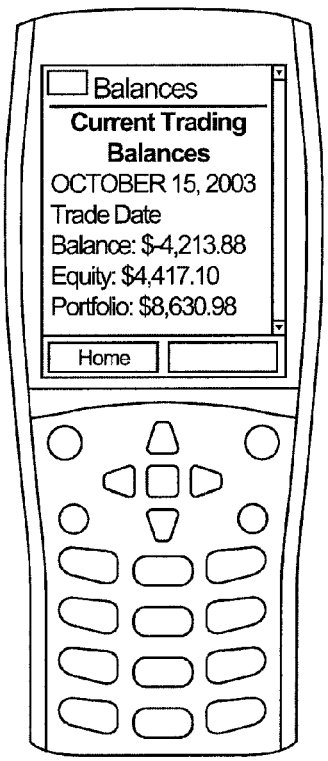
Figure 9I:
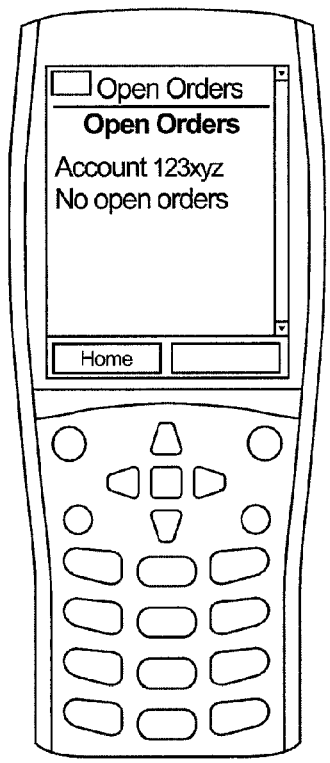
Figure 9J:
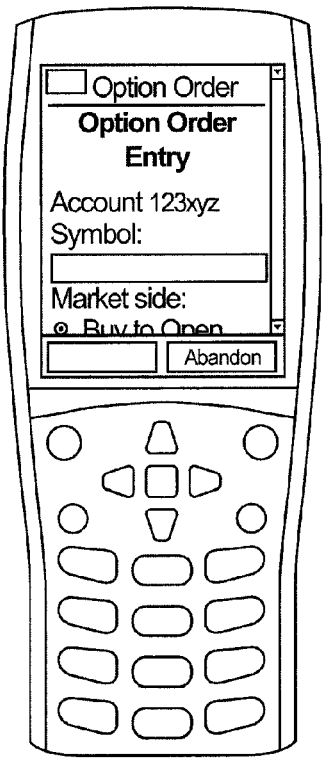
Figure 9K:
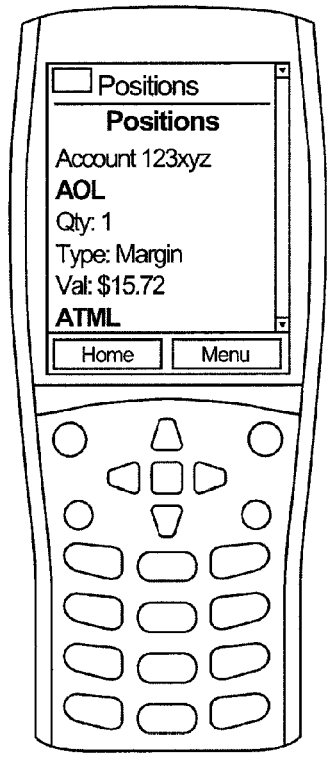
Figure 9L:
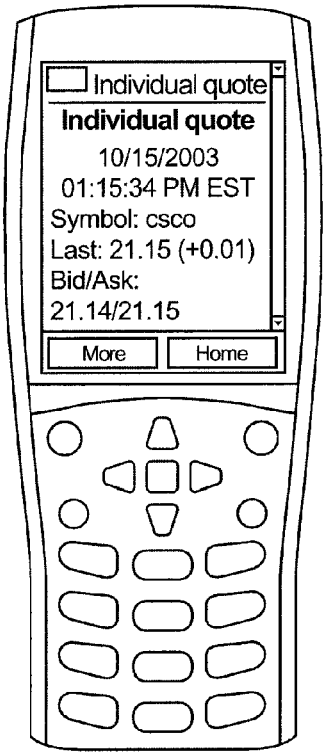
Figure 9M:
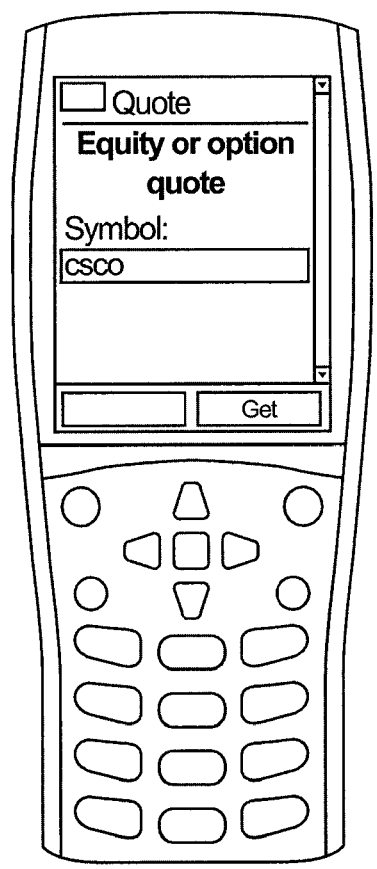
Figure 9N:
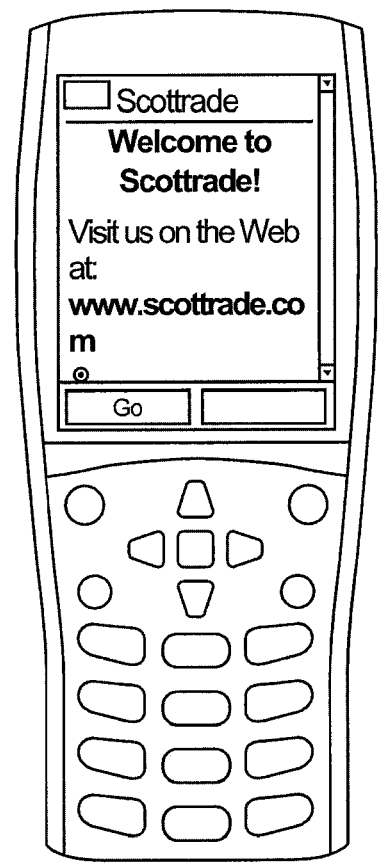

FIGS. 8(*a*) through 8(*g*) illustrate various screenshots for a preferred website customer interface supported by web servers 158. FIG. 8(*a*) illustrates a preferred home page for the trading web site. FIG. 8(*b*) illustrates a preferred page for displaying detailed customer account information. FIG. 8(*c*) illustrates a preferred page for displaying open orders and trade executions. FIG. 8(*d*) illustrates a preferred page for displaying a customer's positions. FIG. 8(*e*) illustrates a preferred page for an initial step of entering order activity requests. FIG. 8(*f*) illustrates a preferred page for a second step of entering order activity requests, including confirmation/verification. FIG. 8(*g*) illustrates a preferred page illustrating a third step in entering order activity requests, including an order identification.

A customer interface application for the IVR touchtone servers 190 would occur through a touchtone telephone from which a customer can initiate activity requests and interact with the server system via automated systems known in the art. Such automated systems would then interact with the intermediate layer via the COM interface 188.

FIGS. 9(*a*) through 9(*n*) illustrate various screenshots for a preferred wireless device customer interface supported by wireless servers 192, wherein the wireless device is a cell phone. FIG. 9(*a*) illustrates a preferred main menu displayed by the wireless device. FIG. 9(*b*) illustrates a screen listing market indices. FIG. 9(*c*) illustrates a preferred screen for an initial step of entering order activity requests. FIG. 9(*d*) illustrates a preferred screen for a second step of entering order activity requests, including confirmation/verification. FIG. 9(*e*) illustrates a preferred screen for a third step of entering order activity requests, including an order identification. FIG. 9(*f*) illustrates a preferred screen for listing trade executions. FIG. 9(*g*) illustrates a preferred screen for login. FIG. 9(*h*) illustrates a preferred screen for listing account balances. FIG. 9(*i*) illustrates a preferred screen for listing open orders. FIG. 9(*j*) illustrates another preferred screen for order entry. FIG. 9(*k*) illustrates a preferred screen for listing a customer's positions. FIG. 9(*l*) illustrates a preferred screen for displaying quotes. FIG. 9(*m*) illustrates a preferred screen for quote entry. FIG. 9(*n*) illustrates a preferred welcome screen.

Figure 10:
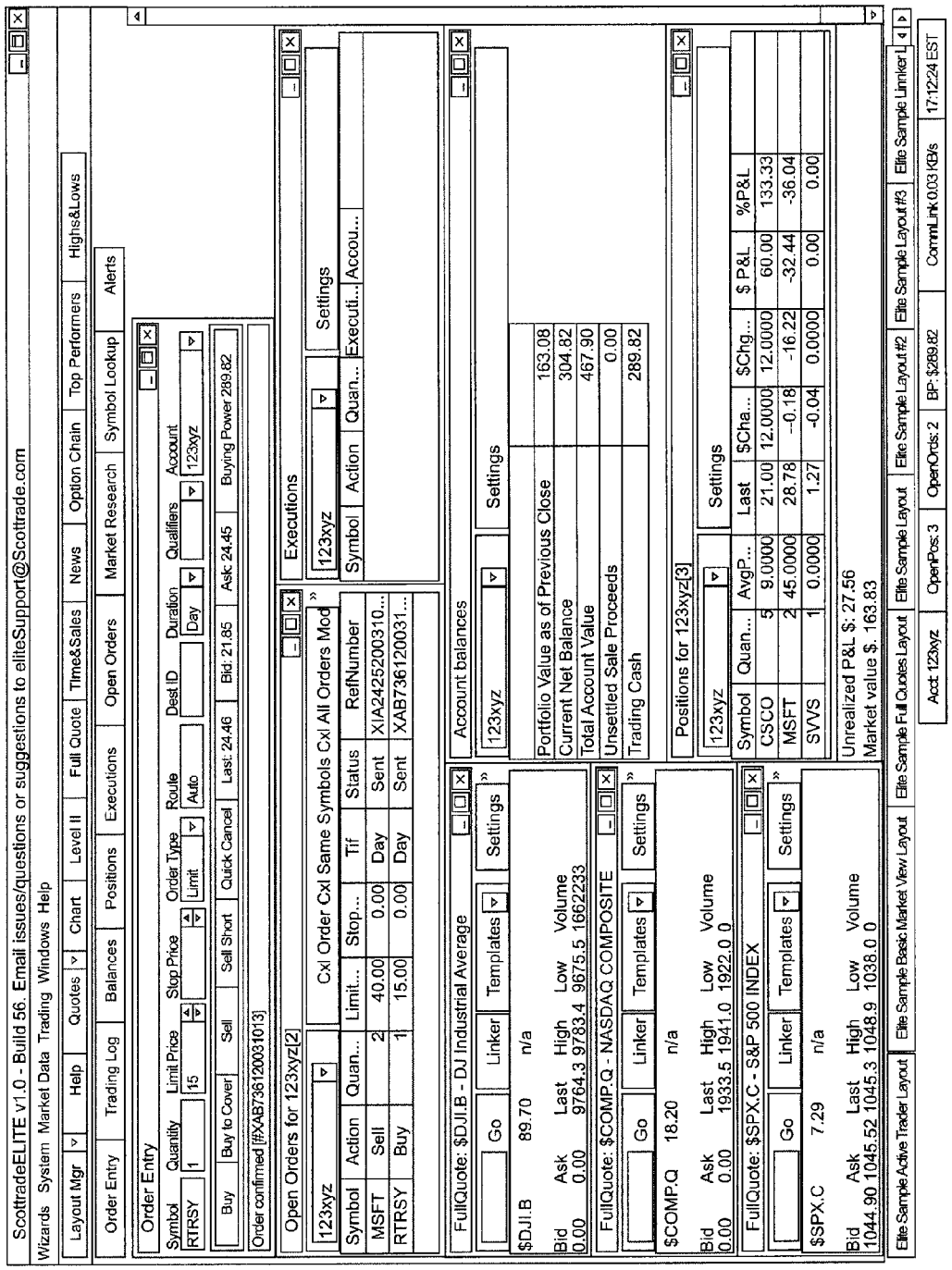
FIG. 10 illustrates a screenshot for a preferred front end Windows trading application customer interface.

FIG. 10 illustrates a screenshot for a preferred Windows desktop application customer interface supported by the Windows trading application servers 194. The screenshot of FIG. 10 is from ScottradeElite software that can be installed on a PC. The ScottradeElite software is commercially available from the assignee of the present invention.

Figure 11:
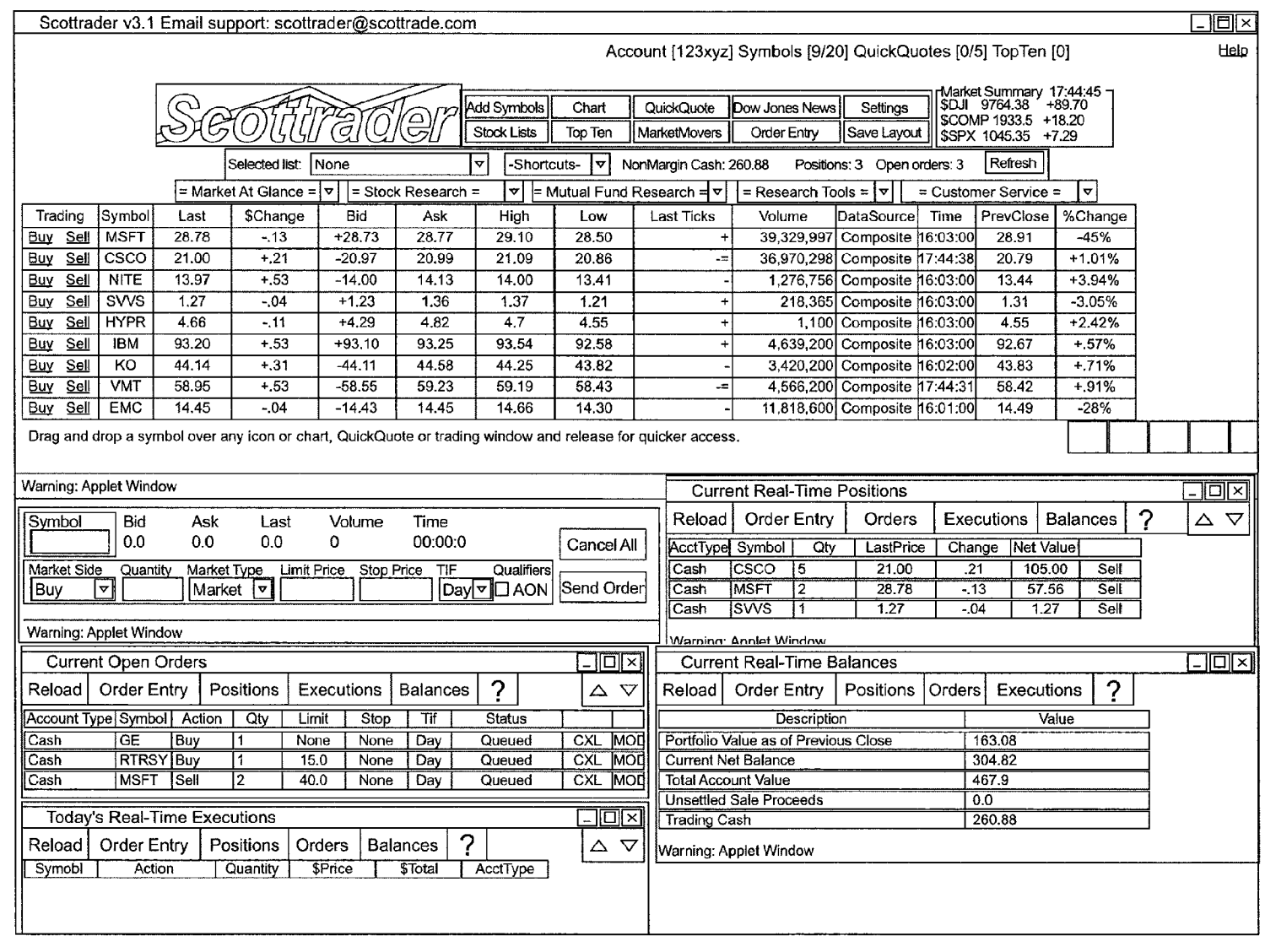

FIG. 11 illustrates a screenshot of a preferred Java-based desktop application customer interface supported by the Java trading application servers 196. The screenshot of FIG. 11 is from Scottrader software that can be installed on a PC. The Scottrader software is commercially available from the assignee of the present invention.

II. Intermediate Layer:

A. Order Service

The order service preferably accepts, transmits and validates activity requests that are orders to buy/sell financial instruments. The order servers 160 receive orders from the various front end delivery channels (e.g., through the web servers 158), request information from the WBO service to use in validating the order(s) (to obtain data such as the customer's money balances, any restrictions on the customer's account, etc.), request information from the quotes service (to use in pricing and validating orders), and from the SQL database server 166 (to determine if the particular financial instrument that is the subject of the order activity request is eligible to trade), if the delivery channel is enabled for trading, and so on. FIG. 7 illustrates this process. Preferred hardware for the order server is a Dell 1550, dual 1133 MHz server with 1 GB of RAM and mirrored 18 GB drives operating with Windows 2000 server.

If an order is rejected, the orders service operates to store that order in the orders database 178 along with the reason for the rejection, audit trail information, and so on. If the order is accepted, the orders service also stores the order and audit trail information in the Orders database 178. Further, the orders service then passes the order on to the Order Management System (OMS) 168 for further processing (see below). As noted above, multiple order servers 160 preferably exist behind a TCP/IP load balancer 202 to allow for the delivery channel application to fail over seamlessly if any particular order server should fail.

(i) OrderClient

OrderServer, which is a dedicated application, preferably a Windows C++ application, and OrderClient use a size-delimitated protocol where each X bytes contain a specific piece of data. This format is required by OrderServer.

As noted above, OrderClient 178 is a COM object that is preferably created in the language C++, but can be created under any language that supports COM. The use of a COM object allows for use of the same object on many different trading platforms while using a common code set for handling orders.

OrderClient 178 takes generic order information (account number, buy/sell stock, shares, limit price, qualifiers, etc) and creates a packet. OrderClient then sends this packet over a TCP/IP socket to an order server 160. The OrderServer program resident on the order server 160 then formats the packet using a protocol as explained below. It is preferred that OrderClient and OrderServer communicate with each other over a TCP/IP socket. OrderServer preferably listens on port 5665 of the order server 160 for connections.

OrderServer preferably (1) accepts socket connections from OrderClient, (2) parses the received packets into data structures that represent generic orders, (3) processes the order, (4) sends a response back over the same socket to the OrderClient that sent the packets, and (5) then disconnects from the socket.

OrderServer preferably processes the order by validating the order against the business rules specific to the client's account. To do this, OrderServer needs customer account data, and to obtain such data, WBOClient 180 is also resident on OrderServer. Using WBOClient 180 (which will be explained below), OrderServer is able to obtain the customer account data needed to validate the order activity request in accordance with business rules. OrderServer also preferably stores the order in the orders database 178. Further still, OrderServer sends the order to the order switch 168 over a socket, using FixOrderServer.

FixOrderServer takes general order information, creates a FIX packet, and sends the packet over a socket to the order switch 168. A FIX packet is a packet formatted in accordance with the FIX protocol, which is a well-known industry standard for communicating financial instrument orders on a trading market. FixOrderServer also receives the status updates for that order and any executions that occur. FixOrderServer stores the received data in the orders database 178, and notifies any waiting client applications that the updates occurred.

OrderServer then receives the response back from FixOrderServer, updates the orders database with the appropriate state and messages, and then sends a response back to OrderClient.

Further, when any activity occurs in a customer's account, FixOrderServer sends a multicast packet stating what specifically just happened in the account. Any server listening for the multicasts can receive this alert and take appropriate action. For example, the WBO server 162 may be interested in the action so it can update its cache memory usage rules. FixOrderServer preferably sends this multicast using NotificationSwitchClient.

NotificationSwitchClient is a COM object used to send multicasts over the TCP/IP network to notify interested applications of specific activity in a client's account. NotificationSwitchClient sends things like orders placed, cancels placed, modifies placed, executions received, order rejects, order status changes and cancels processed. Any application listening for these multicasts can receive them and handle the updates appropriately.

OrderClient, once this process has run, interprets the results received from OrderServer, and determines if the order was accepted or rejected. Thereafter, OrderClient passes this information back to the client application for display to the customer.

The preferred communication protocol for packets in this process is such that the packets contain a Header followed by a ReHeader, followed by appropriate Request data, and finally, followed by a Trailer.

The Header contains the following fields with their corresponding length:

Header—10 bytes

MessageLength—6 bytes

Request—10 bytes

Max Reply Size—6 bytes

User Reference—20 bytes

Account Number—8 bytes

The ReHeader contains the following fields with their corresponding length:

Number of Records—6 bytes

Size of each Record—6 bytes

The Request section will vary depending on the request type, indicated by the Request field of the Header. The Request field can have the following type values:

```
#define PACKET_HEADER_ORDER              "ORDER"
#define PACKET_HEADER_MODIFY             "MODIFY"
#define PACKET_HEADER_CANCEL             "CANCEL"
#define PACKET_HEADER_APPROVE_ORDER      "APPROVE"
#define PACKET_HEADER_REJECT_ORDER       "REJECT"
#define PACKET_HEADER_MANUAL_APPROVED    "MANAPPROVE"
#define PACKET_HEADER_MANUAL_REJECTED    "MANREJECT"
#define PACKET_HEADER_VALIDATE_ORDER     "VAL_ORDER"
#define PACKET_HEADER_DELETE_ORDER       "DELETE"
```

The Request section will then have the appropriate data for each request type.
"ORDER" or "VAL ORDER"
Account=8 bytes
Action=15 bytes
Quantity=14 bytes
Symbol=9 bytes
TradeType=12 bytes
LimitPrice=14 bytes
StopPrice=14 bytes
TIF=12 bytes
Restrictions=20 bytes
TradingPeriod=12 bytes
Commission=10 bytes
IgnoreWarnings=1 bytes
Source=10 bytes
ClientIp=20 bytes
LocalHost=20 bytes
QueryString=256 bytes
Language=3 bytes
Blank=125 bytes
"CANCEL"
Account=8 bytes
WebTrackingNumber=15 bytes
IgnoreWarnings=1 bytes
Source=10 bytes
ClientIp=20 bytes
LocalHost=20 bytes
QueryString=256 bytes
Language=3 bytes
Blank=125 bytes
"MODIFY"
Account=8 bytes
Action=12 bytes
Quantity=14 bytes
Symbol=6 bytes
TradeType=12 bytes
LimitPrice=14 bytes
StopPrice=14 bytes
TIF=12 bytes
Restrictions=20 bytes
TradingPeriod=12 bytes
Commission=10 bytes
IgnoreWarnings=1 bytes
Source=10 bytes
ClientIp=20 bytes
LocalHost=20 bytes
QueryString=256 bytes
WebTrackingNumber=15 bytes
AON=1 bytes
OriginalQuantity=14 bytes
Language=3 bytes
Blank=125 bytes
"APPROVE" or "MANAPPROVE"
WebTrackingNumber=16 bytes
Broker=16 bytes
Message=500 bytes
Blank=128 bytes
"REJECT" or "MANREJECT"
WebTrackingNumber=16 bytes
Broker=16 byte
Message=500 byte
Blank=128 bytes
"DELETE"
WebTrackingNumber=16 bytes
Broker=16 bytes
Message=500 bytes
Blank=128 bytes The Trailer section preferably contains the following:
End Of Message—1 byte
The response packet that OrderServer sends back to OrderClient is formatted according to the same protocol. However, with the response packet, the Request section is formatted as a response for the appropriate request type.
For an order, modify or cancel request the data is formatted like:

```
WebTrackingNumber = 20 bytes
AccountType = 6 bytes
Supported field values are:
// order types
static char* STR_MODIFY          =   "MODIFY";
static char* STR_CANCEL          =   "CANCEL";
static char* STR_ORDER           =   "ORDER";
static char* STR_OPTION          =   "OPTION";
static char* STR_MODIFY_OPTION   =   "MODIFY OPTION";
static char* STR_CANCEL_OPTION   =   "CANCEL OPTION";
// order actions
static char* STR_BUY             =   "BUY";
static char* STR_SELL            =   "SELL";
static char* STR_SELL_SHORT      =   "SELL_SHORT";
static char* STR_BUY_TO_COVER    =   "BUY_TO_COVER";
static char* STR_BUY_TO_OPEN     =   "BUY_TO_OPEN";
static char* STR_BUY_TO_CLOSE    =   "BUY_TO_CLOSE";
static char* STR_SELL_TO_OPEN    =   "SELL_TO_OPEN";
static char* STR_SELL_TO_CLOSE   =   "SELL_TO_CLOSE";
// account types
static char* STR_CASH            =   "CASH";
static char* STR_MARGIN          =   "MARGIN";
static char* STR_SHORT           =   "SHORT";
// order TIF's
static char* STR_DAY             =   "DAY";
static char* STR_GTC             =   "GTC";
static char* STR_FOK             =   "FOK";
// trade types
static char* STR_MARKET          =   "MARKET";
static char* STR_LIMIT           =   "LIMIT";
static char* STR_STOP            =   "STOP";
static char* STR_STOPLIMIT       =   "STOPLIMIT";
// restrictions
static char* STR_AON             =   "AON";
// trading periods
static char* STR_REGULAR_HOURS   =   "REGULAR";
static char* STR_EXTENDED_HOURS  =   "EXT_HOURS";
```

-continued

```
static char* STR_PREMARKET        =  "PREMARKET";
// source
static char* STR_WEB              =  "WEB";
static char* STR_IVR              =  "IVR";
static char* STR_STREAMER         =  "STREAMER";
static char* STR_WIRELESS         =  "WIRELESS";
static char* STR_APPROVAL         =  "APPROVAL";
static char* STR_ELITE            =  "ELITE";
static char* STR_WEB_OPTIMIZED    =  "WEB_OPT";
static char* STR_TAIWAN_SOURCE    =  "TW";
// options
static char* STR_PUT              =  "PUT";
static char* STR_CALL             =  "CALL";
static char* STR_ERROR            =  "ERROR";
static char* STR_EMPTY            =  "";
// languages
static char* STR_LANGUAGE_ENGLISH =  "US";
static char* STR_LANGUAGE_TAIWAN  =  "TW";
```

The specifications for various tasks of OrderClient are as follows:

Function: SendOrder
  SendOrder operates to send an order through the order routing system. SendOrder will return an array either containing warnings and errors for the order, or the web_tracking_number of the order if accepted.
  Case Errors and Warnings: A variable number of array elements, where each element is an array containing 2 elements: the first being a boolean value representing fatal errors with the order (FALSE would mean the error message is just a warning, and the order may be resubmitted if appropriate), and the second value being the message for the error/warning.
  Case Success: An array consisting of 2 elements, the first being a BSTR representing the web_tracking_number of the order, and the second being a BSTR representing the account type the trade was placed in (CASH, MARGIN, or SHORT)
Parameters [in]:
  BSTR account
  BSTR action
  BSTR quantity
  BSTR symbol
  BSTR tradeType
  BSTR limitprice
  BSTR stopPrice
  BSTR tif
  BSTR restrictions
  BSTR tradingPeriod
  BSTR commission
  BOOL ignorewarnings
  BSTR source
  BSTR clientip
  BSTR queryString
Parameters [out,retval]
  VARIANT* pRet
Function: SendModify
  SendModify operates to send an modify order through the order routing system. SendModify Will return an array either containing warnings and errors for the order, or the web_tracking_number of the order if accepted.
  Case Errors and Warnings: A variable number of array elements, where each element is an array containing 2 elements: the first being a boolean value representing fatal errors with the order (FALSE would mean the error message is just a warning, and the order may be resubmitted if appropriate), and the second value being the message for the error/warning.
  Case Success: An array consisting of 2 elements, the first being a BSTR representing the web_tracking_number of the order, and the second being a BSTR representing the account type the trade was placed in (CASH, MARGIN, or SHORT)
Parameters [in]:
  BSTR account
  BSTR action
  BSTR quantity
  BSTR symbol
  BSTR tradeType
  BSTR limitprice
  BSTR stopPrice
  BSTR tif
  BSTR restrictions
  BSTR tradingPeriod
  BSTR commission
  BOOL ignoreWarnings
  BSTR source
  BSTR clientip
  BSTR queryString
  BSTR origWebTrackingNumber
Parameters [out,retval]
  VARIANT* pRet
Function: SendCancel
  SendCancel operates to send a cancel request through the order routing system. SendCancel will return an array either containing warnings and errors for the order, or the web_tracking_number of the order if accepted.
  Case Errors and Warnings: A variable number of array elements, where each element is an array containing 2 elements: the first being a boolean value representing fatal errors with the order (FALSE would mean the error message is just a warning, and the order may be resubmitted if appropriate), and the second value being the message for the error/warning.
  Case Success: An array consisting of 2 elements, the first being a BSTR representing the web_tracking_number of the order, and the second being a BSTR representing the account type the original trade was placed in (CASH, MARGIN, or SHORT).
Parameters [in]
  BSTR account
  BSTR trackingNumber
  BOOL ignorewarnings
  BSTR source
  BSTR clientip
  BSTR queryString
Parameters [out, retval]
  VARIANT* pRet
Function: SendApproveOrder
  SendApproveOrder operates to approve an order from the approval desk. The approval desk is part of the administration process where some orders are routed for approval by a broker before being forwarded to the OMS. For example, large orders or short sells may be sent for review by a broker before the corresponding order is transmitted to an exchange. The broker, through the approval desk, may then approve or reject the order. The orders sent to the approval desk are preferably stored temporarily in the orders database and flagged to trigger the review process. It is preferred that orders rejected from the approval desk are written to the audit trail just as automatically rejected orders are. It is also preferred that orders approved from the approval desk are transmitted via FIX in the same manner as other orders.

The approval desk may also server as a destination of "last resort" should the order servers be unable to transmit an order to the OMS, exchanges, and backoffice. Once reaching the approval desk, an order can be manually dealt with if necessary, such as being phoned into an exchange.

Figure 16C:
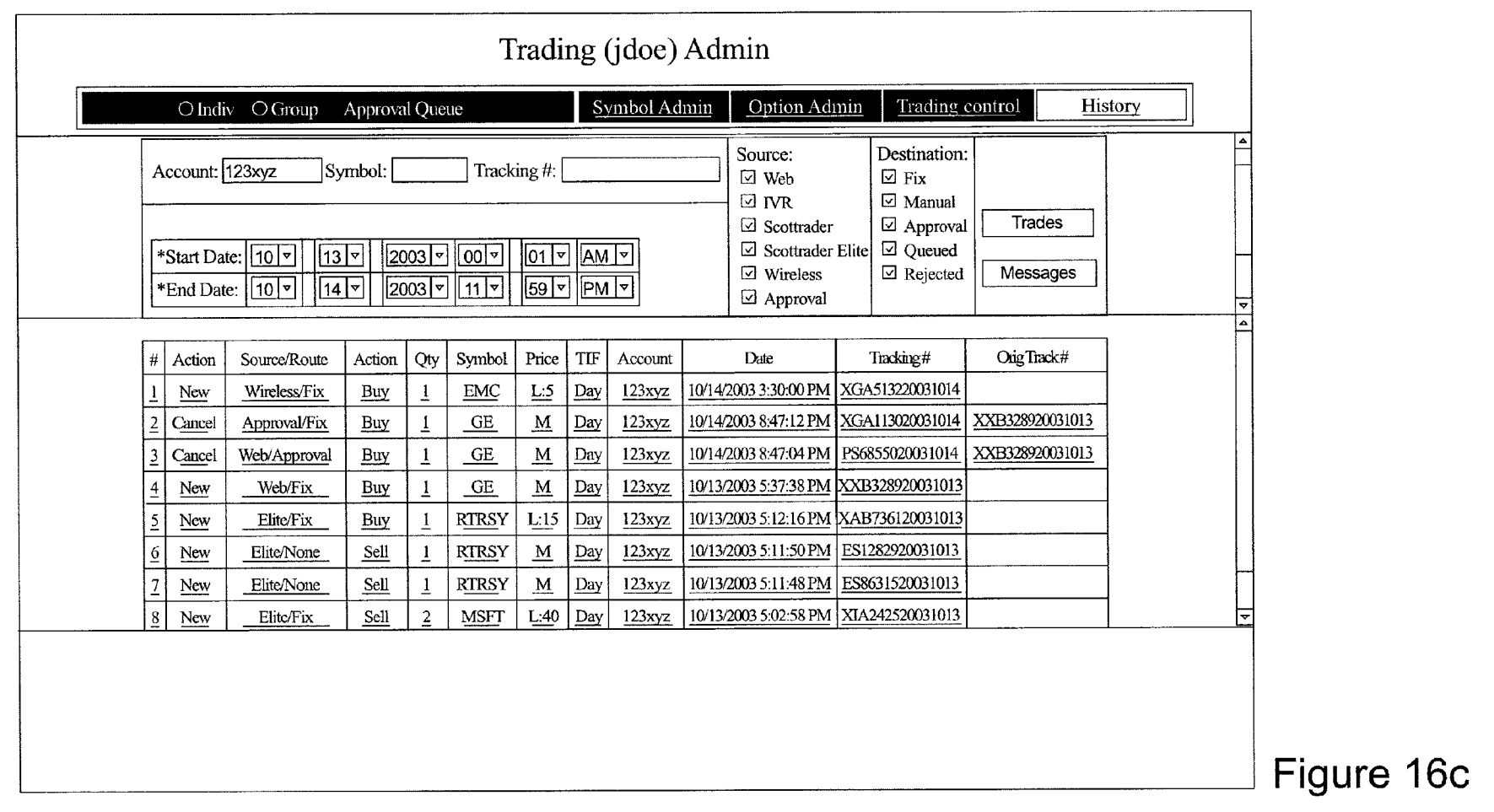

FIGS. 16(a)-(c) illustrate preferred approval desk interfaces from which a person an approve/reject orders. FIG. 16(a) illustrates a preferred main page for the approval desk interface that lists orders awaiting approval. By clicking on an order, a person using the approval desk interface (who is preferably a broker) will be linked to a page with detailed options for handling the order. FIG. 16(b) illustrates a preferred instance of such a detailed page. The page of FIG. 16(b) preferably provides the broker with the information necessary to either approve, reject, delete, or pass over the order. FIG. 16(c) illustrates a history page for an order that displays audit trail information therefor.

SendApproveOrder will attempt to send the order through to the backoffice and remove the order from 'tbl_orders_pending' in the orders database 178. If successful (meaning the order either went through to the OMS, or it got transferred to the approval desk), SendApproveOrder returns a VARIANT cast as a BSTR with the value "SUCCESS". Otherwise, if the order could not be found/transferred to approval desk/database error occurred/etc. . . . , then SendApproveOrder returns a value of "FAILED".
Parameters [in]:
  BSTR webTrackingNumber
  BSTR broker
  BSTR message
Parameters [out, retval]
  VARIANT* pRet
Function: SendRejectOrder
  SendRejectOrder operates to reject an order from the Approval desk. SendRejectOrder will attempt to reject an order that is pending, meaning that it will remove it from 'tbl_orders_pending' of the orders database 178, and notify the customer if necessary. If successful (meaning the order was successfully removed), SendRejectOrder returns a VARIANT cast as a BSTR with the value "SUCCESS". Otherwise, if the order could not be found if a database error occurred/etc. . . . , then SendRejectOrder returns a value of "FAILED".
Parameters [in]:
  BSTR webTrackingNumber
  BSTR broker
  BSTR message
Parameters [out, retval]:
  VARIANT* pRet);
Function: SendManualApproveOrder
  SendManualApproveOrder operates to manually approve an order from the approval desk. SendManualApproveOrder will attempt to update the system to reflect that an order has been manually entered into the backoffice already. If successful (meaning the order was successfully removed), SendManualApproveOrder returns a VARIANT cast as a BSTR with the value "SUCCESS". Otherwise, if the order could not be found/database error occurred/etc., then SendManualApproveOrder returns a value of "FAILED".
Parameters [in];
  BSTR webTrackingNumber
  BSTR broker
  BSTR message
Parameters [out, retval]
  VARIANT* pRet
Function: SendManualRejectOrder
  SendManualRejectOrder operates to manually reject an order from the approval desk This will attempt to update our system to reflect an order has been rejected by the Manual entry desk for one reason or another. If successful (meaning the order was successfully removed), SendManualRejectOrder returns a VARIANT cast as a BSTR with the value "SUCCESS". Otherwise, if the order could not be found/database error occurred/etc. . . . , then SendManualRejectOrder returns a value of "FAILED".
Parameters [in]:
  BSTR webTrackingNumber
  BSTR broker
  BSTR message
Parameters [out, retval]
  VARIANT* pRet);

(ii) OrderRules

OrderRules is a COM object that is preferably resident on the front end servers. OrderRules operates to take generic order information and determine whether the order parameters are acceptable according to the business rules for the source from which the order came.

Preferably, only order parameters are validated by OrderRules; anything specific to the customer account that is placing the order is disregarded (the order servers will handle this with business logic). OrderRules validates things like: order quantity (to make sure it's a valid quantity for that stock/option), limit/stop price (to make sure they are within the allowed range), symbol (to make sure it's a valid symbol that the financial institution allows trading of), qualifiers (to make sure it's a valid qualifier for the order type, etc.). OrderRules does this by taking the order parameters and processing them against the financial institution's rules engine and checking database settings in the trading admin database 180 to make sure that the order meets the institution's acceptable criteria. To obtain the necessary data from the trading admin database 180, an ODBC request is used.

The trading admin database's settings are preferably controlled through an administrator interface such as those shown in FIGS. 12(a)-(c).

The administrator interface of FIG. 12(a) allows an administrator to control settings in the trading admin database relative to a particular financial instrument symbol. Through the interface of FIG. 12(a), control is provided over whether restrictions are placed on any of the following for the specified symbol: routing for orders, buy enablement, sell enablement, sell short enablement, buy to cover enablement, buy to open enablement, buy to close enablement, sell to open enablement, sell to close enablement, extended hours trading enablement, option chain enablement, minimum lot size specification, margin requirement setting, and whether to add a disallowed option root or symbol and corresponding type.

The administrator interface of FIG. 12(b) provides administrative control over disallowed options. Preferably, the options are identified by symbol, type, and underlying security (if applicable). Control over the options listed in FIG. 12(b) is provided through the "Add Disallowed Option Root or Symbol" field of FIG. 12(a).

The administrator interface of FIG. 12(c) provides administrative control over various other tasks, such as control of master trading for entries, modifies, and cancellations. Further, master control is provided for trading over the NYSE, Nasdaq, and AMEX. Further still, entry, modify, and cancellation control is provided for equities, options, extended hours, and the Scottrader application. Further, entry control for bulletin board trading is supported.

The specifications for OrderRules are as follows:

Function: CheckMasterTrading
  CheckMasterTrading operates to return a Boolean value on whether or not there are trading restrictions on MASTER_TRADING in the trading admin database 180 (see FIG. 12(*c*) for administrative control of MASTER_TRADING). If no restrictions are found therein, the function returns a true value. If there are restrictions, the function returns a false value.
  Parameters [in]:
  none
  Parameters [out, retval]:
  BOOL* pRet
Function: CheckMasterModifies
  CheckMasterModifies operates to return a Boolean value on whether or not there are trading restrictions on MASTER_MODIFIES in the trading admin database 180 (see FIG. 12(*c*) for administrative control of MASTER_MODIFIES). If no restrictions are found therein, the function returns a true value. If there are restrictions, the function returns a false value.
  Parameters [in]:
  none
  Parameters [out, retval]:
  BOOL* pRet
Function: CheckMasterCancels
  CheckMasterCancels operates to return a Boolean value on whether or not there are trading restrictions on MASTER_CANCELS in the trading_admin database 180 (see FIG. 12(*c*) for administrative control of MASTER_CANCELS). If there are no restrictions, the function returns a true value. If there are restrictions, the function returns a false value.
  Parameters [in]:
  none
  Parameters [out, retval]:
  BOOL* pRet
Function: CheckEquityTrading
  CheckEquityTrading operates to return a Boolean value on whether or not there are trading restrictions on EQUITY_TRADING in the trading admin database 180 (see FIG. 12(*c*) for administrative control of EQUITY_TRADING). If there are no restrictions, the function returns a true value. If there are restrictions, the function returns a false value.
  Parameters [in]:
  none
  Parameters [out, retval]:
  BOOL* pRet
Function: CheckEquityModifies
  CheckEquityModifies operates to return a Boolean value on whether or not there are trading restrictions on EQUITY_MODIFIES in the trading admin database 180 (see FIG. 12(*c*) for administrative control of EQUITY_MODIFIES). If there are no restrictions, the function returns a true value. If there are restrictions, the function returns a false value.
  Parameters [in]:
  none
  Parameters [out, retval]:
  BOOL* pRet
Function: CheckEquityCancels
  CheckEquityCancels operates to return a Boolean value on whether or not there are trading restrictions on EQUITY_CANCELS in the trading admin database 180 (see FIG. 12(*c*) for administrative control of EQUITY_CANCELS). If there are no restrictions, the function returns a true value. If there are restrictions, the function returns a false value.
  Parameters [in]:
  none
  Parameters [out, retval]:
  BOOL* pRet
Function: CheckBBTrading
  CheckBBTrading operates to return a Boolean value on whether or not there are trading restrictions on BB_TRADING in the trading admin database 180 (see FIG. 12(*c*) for administrative control of BB_TRADING). If there are no restrictions, the function returns a true value. If there are restrictions, the function returns a false value.
  Parameters [in]:
  none
  Parameters [out, retval]:
  BOOL* pRet
Function: CheckBBModifies
  CheckBBModifies operates to return a Boolean value on whether or not there are trading restrictions on BB_MODIFIES in the trading admin database 180 (see FIG. 12(*c*) for administrative control of BB_MODIFIES). If there are no restrictions, the function returns a true value. If there are restrictions, the function returns a false value.
  Parameters [in]:
  none
  Parameters [out, retval]:
  BOOL* pRet
Function: CheckBBCancels
  CheckBBCancels operates to return a Boolean value on whether or not there are trading restrictions on BB_CANCELS in the trading admin database 180 (see FIG. 12(*c*) for administrative control of BB_CANCELS). If there are no restrictions, the function returns a true value. If there are restrictions, the function returns a false value.
  Parameters [in]:
  none
  Parameters [out, retval]:
  BOOL* pRet
Function: CheckOptionTrading
  CheckOptionTrading operates to return a Boolean value on whether or not there are trading restrictions on OPTION_TRADING in the trading admin database 180 (see FIG. 12(*c*) for administrative control of OPTION_TRADING). If there are no restrictions, the function returns a true value. If there are restrictions, the function returns a false value.
  Parameters [in]:
  none
  Parameters [out, retval]:
  BOOL* pRet
Function: CheckOptionModifies
  CheckOptionModifies operates to return a Boolean value on whether or not there are trading restrictions on OPTION_MODIFIES in the trading admin database 180 (see FIG. 12(*c*) for administrative control of OPTION_MODIFIES). If there are no restrictions, the function returns a true value. If there are restrictions, the function returns a false value.
  Parameters [in]:
  none Parameters [out, retval]:
BOOL* pRet
Function: CheckOptionCancels
   CheckOptionCancels operates to return a Boolean value on whether or not there are trading restrictions on OPTION_CANCELS in the trading admin database 180 (see FIG. 12(c) for administrative control of OPTION_CANCELS). If there are no restrictions, the function returns a true value. If there are restrictions, the function returns a false value.
Parameters [in]:
none
Parameters [out, retval]:
BOOL* pRet
Function: CheckExtHoursTrading
   CheckExtHoursTrading operates to return a Boolean value on whether or not there are trading restrictions on EXT_HOURS_TRADING in the trading admin database 180 (see FIG. 12(c) for administrative control of EXT_HOURS_TRADING). If there are no restrictions, the function returns a true value. If there are restrictions, the function returns a false value.
Parameters [in]:
none
Parameters [out, retval]:
BOOL* pRet
Function: CheckExtHoursModifies
   CheckExtHoursModifies operates to return a Boolean value on whether or not there are trading restrictions on EXT_HOURS_MODIFIES in the trading admin database 180 (see FIG. 12(c) for administrative control of EXT_HOURS_MODIFIES). If there are no restrictions, the function returns a true value. If there are restrictions, the function returns a false value.
Parameters [in]:
none
Parameters [out, retval]:
BOOL* pRet
Function: CheckExtHoursCancels
   CheckExtHoursCancel operates to return a Boolean value on whether or not there are trading restrictions on EXT_HOURS_CANCELS in the trading admin database 180 (see FIG. 12(c) for administrative control of EXT_HOURS_CANCELS). If there are no restrictions, the function returns a true value. If there are restrictions, the function returns a false value.
Parameters [in]:
none
Parameters [out, retval]:
BOOL* pRet
Function: ValidateEquityorderEntry
   ValidateEquityorderEntry operates to return a Variant array of ValidationResults values for several parameters passed into the function. The ValidationResults values are determined by creating an Equity order and performing a validity check on the action, quantity, symbol, limitprice, stopPrice, tif, restrictions, tradingPeriod, and commission.
Parameters [in]:
BSTR customer
BSTR symbol
BSTR type
BSTR action
BSTR quantity
BSTR tradeType
BSTR limitprice
BSTR stopPrice
BSTR tradingPeriod
BSTR tif
BSTR restrictions
BSTR orderSource
Parameters [out, retval]:
VARIANT* pResults
Function: ValidateOptionOrderEntry
   ValidateOptionOrderEntry operates to return a Variant array of ValidationResults values for several parameters passed into the function. The ValidationResults values are determined by creating an Option order and performing a validity check on the action, quantity, symbol, limitprice, stopPrice, tif, restrictions, tradingPeriod, and commission.
Parameters [in]:
BSTR customer
BSTR symbol
BSTR type
BSTR action
BSTR quantity
BSTR tradeType
BSTR limitprice
BSTR stopPrice
BSTR tradingPeriod
BSTR tif
BSTR restrictions
BSTR ordersource
Parameters [out, retval]:
VARIANT* pResults
Function: ValidateExtHoursOrderEntry
   ValidateExtHoursOrderEntry operates to return a Variant array of ValidationResults values for several parameters passed into the function. The ValidationResults values are determined by creating an ExtHours order and performing a validity check on the action, quantity, symbol, limitprice, stopPrice, tif, restrictions, tradingPeriod, and commission.
Parameters [in]:
BSTR customer
BSTR symbol
BSTR type
BSTR action
BSTR quantity
BSTR tradeType
BSTR limitprice
BSTR stopPrice
BSTR tradingPeriod
BSTR tif
BSTR restrictions
BSTR ordersource
Parameters [out, retval]:
VARIANT* pResults
Function: ValidateBBOrderEntry
   ValidateBBOrderEntry operates to return a Variant array of ValidationResults values for several parameters passed into the function. The ValidationResults values are determined by creating a BB order and performing a validity check on the action, quantity, symbol, limitprice, stopPrice, tif, restrictions, tradingPeriod, and commission.
Parameters [in]:
BSTR customer
BSTR symbol
BSTR type
BSTR action
BSTR quantity
BSTR tradeType BSTR limitprice
BSTR stopPrice
BSTR tradingPeriod
BSTR tif
BSTR restrictions
BSTR orderSource
Parameters [out, retval]:
VARIANT* pResults
Function: CheckMarketOpen
    CheckMarketOpen operates to determine (1) if it is a market day (i.e., not a weekend or a holiday) and (2) whether the market is open on that market day.
Parameters [in]:
none
Parameters [out, retval]:
BOOL* pRet
Function: CheckExtHoursOpen
    CheckExtHoursOpen operates to determine there is an extended trading session.
Parameters [in]:
none
Parameters [out, retval]:
BOOL* pRet
Function: GetFullQuote
    GetFullQuote operates to create a QuoteClient object and validates each parameter within that object, then returns a Variant array which contains the results of the validation for each respective parameter.
Parameters [in]:
BSTR symbol
Parameters [out, retval]:
VARIANT *pResults
Function: OptionLookup
    OptionLookup operates to retrieve a quote for a particular option and returns a Variant from the results of the quote.
Parameters [in]:
BSTR symbol
Parameters [out, retval]:
VARIANT *pResults (iii) NotificationSwitchClient The NotificationSwitchClient object preferably resides on the order servers and operates to issue multicast packets containing notifications of the progress of order activity requests. To receive notifications, an interested application must preferably subscribe for multicasts to the address on the subnet to which the NotificationSwitchClient sends its multicasts.

Each notification is in a similar format to an HTTP querystring. Where each name value pair is separated by an ampersand (&) and an equal (=) that separates the name and the value. Each notification starts with the type of notification and then an ampersand. The following notifications are preferably available:

Order—an Order was Placed.
    Data: Customer, Action, Quantity, Symbol, Limit Price, Stop Price, Account Type, TIF, AON, Trading Period, Commission
Execution—a Trade Executed.
    Data: Customer, Action, Quantity, Symbol, Price, Account Type, Time, Description, Web Tracking number, Orig Web Tracking Number
Invalidate—General Cache Invalidation
    Data: Customer
Cancel—Customer Placed a Cancel Request
    Data: Customer, Web Tracking Number
Modify—Customer Placed a Modify Request
    Data: Customer, Web Tracking Number
Approve—an Order was Approved by the Net Desk
    Data: Customer, Web Tracking Number
Reject—an Order was Rejected by the Net Desk
    Data: Customer, Web Tracking Number, Reason
Dequeue—an Order was Dequeued
    Data: Customer, Web Tracking Number
U R Out—a Cancel Request Executed
    Data: Customer, Web Tracking Number
Replaced—a Modify Request Executed
    Data: Customer, Web Tracking Number
Status—the Status of an Order Changed
    Data: Customer, Web Tracking Number The following definitions are used for notifications:

Headers

```
#define NOTIFICATION_ORDER            "ORDER"
#define NOTIFICATION_EXECTION         "EXECUTION"
#define NOTIFICATION_INVALIDATION     "INVALIDATE"
#define NOTIFICATION_CANCEL           "CANCEL"
#define NOTIFICATION_MODIFY           "MODIFY"
#define NOTIFICATION_APPROVE          "APPROVE"
#define NOTIFICATION_REJECT           "REJECT"
#define NOTIFICATION_DEQUEUE          "DEQUEUE"
#define NOTIFICATION_UROUT            "UROUT"
#define NOTIFICATION_STATUS_CHANGE    "STATUS"
#define NOTIFICATION_REPLACED         "REPLACED"
#define NOTIFICATION_DELETED          "DELETED"
#define NOTIFICATION_SYMBOL_UPDATE    "SYM_UPDATE"
```

Data

```
#define NOTIFICATION_CUSTOMER          "CUSTOMER"
#define NOTIFICATION_SYMBOL            "SYMBOL"
#define NOTIFICATION_QUANTITY          "QUANTITY"
#define NOTIFICATION_LIMIT_PRICE       "LIMIT_PRICE"
#define NOTIFICATION_STOP_PRICE        "STOP_PRICE"
#define NOTIFICATION_AON               "AON"
#define NOTIFICATION_TIF               "TIF"
#define NOTIFICATION_ACTION            "ACTION"
#define NOTIFICATION_TRADING_PERIOD    "TRADING_PERIOD"
#define NOTIFICATION_ACCOUNT_TYPE      "ACCOUNT_TYPE"
#define NOTIFICATION_PRICE             "PRICE"
#define NOTIFICATION_TIME              "TIME"
#define NOTIFICATION_DESCRIPTION       "DESCRIPTION"
#define NOTIFICATION_COMMISSION        "COMMISSION"
#define NOTIFICATION_WEB_TRACKING      "WEB_TRACKING"
#define NOTIFICATION_REASON            "REASON"
#define NOTIFICATION_ORIG_WEB_TRACKING "ORIG_WEB_TRACKING"
#define NOTIFICATION_SOURCE            "SOURCE"
```

Methods
PostSymbolUpdate
Event: the security master has been updated for a symbol
   Input:
      BSTR symbol
PostDelete
Event: a pending order was deleted
   Input:
      BSTR customer
      BSTR webTrackingNumber
PostOrder
Event: an order was placed
   Input:
      BSTR account
      BSTR action
      BSTR quantity
      BSTR symbol
      BSTR limitprice
      BSTR stopPrice
      BSTR accountType
      BSTR tif
      BSTR aon
      BSTR tradingPeriod
      BSTR commission
      BSTR source
PostExecution
Event: an order executed
   Input:
      BSTR customer
      BSTR action
      BSTR quantity
      BSTR symbol
      BSTR price
      BSTR accountType
      BSTR time
      BSTR description
      BSTR webTrackingNumber
      BSTR origWebTrackingNumber
PostCancel
Event: an order was cancelled
   Input:
      BSTR customer
      BSTR originalWebTrackingNumber
      BSTR symbol
      BSTR source
PostModify
Event: an order was modified
   Input:
      BSTR customer
      BSTR webTrackingNumber
      BSTR symbol
      BSTR source
PostReject
Event: an order was rejected by the approval desk
   Input:
      BSTR customer
      BSTR webTrackingNumber
      BSTR reason
PostApprove
Event: an order was approved by the approval desk
   Input:
      BSTR customer
      BSTR webTrackingNumber
      BSTR originalWebTrackingNumber
PostUROUT
Event: an order was successfully cancelled at the exchange
   Input:
      BSTR customer
      BSTR originalWebTrackingNumber
      BSTR symbol
      BSTR time
PostReplaced
Event: an order was successfully modified at the exchange
   Input:
      BSTR customer
      BSTR webTrackingNumber
      BSTR time
PostStatusChange
Event: an order's status changed in some way
   Input:
      BSTR customer
      BSTR webTrackingNumber (iv) Timestamps Outgoing orders are preferably timestamped by the order server, and the timestamp data is preferably retained in the orders database 178 before those orders are sent to the exchange. Timestamps are also preferably sent to the OMS, where they are again timestamped in a text file. Further, the OMS preferably timestamps the ACK on the order at the time the OMS sends the receipt response to the OrderServer. This timestamp is logged in a text file.

When the OMS forwards the order to the exchange 174, the exchange 174 ACKS the order and sends the timestamp to the OMS, which in turn sends the timestamp to the order servers, where it is saved in a text file.

When the exchange 174 executes the order, it sends a timestamp back to the OMS, which forwards it to the order servers. Again the timestamp is saved in a text file and is written to the orders database 178 with another timestamp.

This timestamp information is useful for an audit trail of all orders.

B. WBO Service

The Web to Back Office (WBO) service supplies all of the accounting information for a customer's account(s) to interested applications in the system 150. This customer account data preferably includes monies held in the account, what stocks are owned in the account, trade executions in the account, open orders (buy, sell, etc) for the account, and ancillary information such as name, address, and so on. This information is often delivered to the customer for information on his account (e.g., a "view my portfolio" display on the front end customer interface), but the customer account data is also preferably used to determine whether orders for financial instruments are accepted or rejected.

For example, if a customer wishes to sell 100 shares of IBM stock, this order activity request is checked to verify the customer actually owns 100 shares of IBM. If the customer wishes to buy 100 shares of IBM, and IBM is trading at $10 per share, this information is used to determine if he has the $1000 in his account necessary to carry out this purchase.

The WBO service can also be used to aggregate data between various brokerage accounting systems. For example, if a brokerage firm is converting from one back office system to another, and must account for trade data information on one system and settlement data information on the other (typically three days later), the WBO service can allow for aggregation of data from the two different backend database systems. As will be explained in greater detail below, as part of this aggregation, a "Three Day System" was developed to facilitate such changes in backoffice database accounting systems, thereby allowing the other services of the system to continue seamlessly during a backoffice accounting database transition.

WBO service primarily acquires customer account data from the backoffice accounting database system 170, which is preferably an AS/400 CRI brokerage accounting system, but can also acquire data from the SQL database schema 166 (such as the customers database 182 or orders database 178), or other data stores. The WBO service of the preferred embodiment of the present invention eliminates the need for the front end applications to have to know where customer account data resides or in which format it is stored. With WBO Service, multiple WBO servers 162 preferably exist behind a TCP/IP load balancer 200 to allow for the front end applications to fail over seamlessly if any particular WBO server 162 should fail. Preferred hardware for the WBO server is a Dell 1550, dual 1133 MHz server with 1 GB of RAM and mirrored 18 GB drives operating with Microsoft Windows 2000 server.

The WBOClient.dll is a COM object that communicates with the WBOServer application to get account data from the backoffice accounting database system 170 using a TCP/IP socket. WBOClient preferably resides on both the order servers 160 and the front end applications. The WBOClient.dll object is preferably created in the C++ language, but can be created under any language that supports COM.

The packets produced and processed by the WBO service are preferably formatted in accordance with the protocol described below. However, it should be noted that any protocol suitable for formatting messages transmitted between applications is suitable for use with the present invention. This protocol is preferably a size-delimited protocol where each X bytes contain a specific piece of data.

In operation, the WBO server listens to a port for connections from a WBOClient object. When initiated, WBOClient retrieves customer account data from the WBOServer application for such things that include, but are not limited to account balances, executions, open orders, positions and account settings.

The WBOServer program receives the customer account activity request from WBOClient as a packet, and creates a generic request structure out of the data contained therein.

Preferably when processing a customer account activity request, WBOServer searches its resident memory, preferably its application-in-memory cache, for any cached data. As will be described in greater detail below, customer account data found in cached memory that is pertinent to a customer account activity request will be used by WBOServer to process the customer account activity request if that cache data complies with predetermined usage rules. Preferably, these usage rules are reconfigurable. In either event, if cached data is found and the data is valid according to the cache usage rules, then WBOServer sends that cached data back to WBOClient.

If no cached data can be found or if the cache data does not comply with the cache usage rules, WBOServer queries the backoffice accounting database system 170 for the data. Upon retrieving the appropriate data from the backoffice accounting database system 170, the WBOServer preferably merges this data with data found in the SQL databases, e.g. account settings, open orders, specific calculations, etc.

WBOServer thereafter preferably performs other calculations based on this data to determine more specific account values, and then updates its cache record. Lastly, WBOServer preferably returns the retrieved customer account data to the client application via the same socket.

During the above operation, WBOServer is also listening for multicasts from the order servers 160 to know when a client places a trade or receives an execution, etc. When an account event occurs in a customer account, WBOServer preferably marks any cached data pertaining to that customer account as invalid, thereby forcing any activity request for information on that account to perform a query of fresh data from the backoffice accounting database system 170. Preferred instances of account events will be described below.

WBOCalculations is a COM object resident on the front end COM interface that takes account data as parameters and performs calculations to determine specific values for an account such as buying power, total account value, and market value for account positions. Parameters received are data structures representing account data such as money balances, open orders, current positions and current day executions. The logic for these calculations are known in the art. As a COM object, WBOCalculations can be used by any trading platform that supports COM, thereby facilitating the scalability, which allows the system to maintain prompt response times despite growing traffic volumes. The WBOCalculations methods preferably come in two versions, one that takes the "Stream" data in byte stream format (e.g. UnsettledReleases) and then another variation that takes the array format returned by WBOClient (e.g. UnsettledReleasesArr) where each BSTR input parameter can be replaced with a VARIANT*. These are as follows:

UnsettledReleases
Purpose: Total amount of unsettled sells in the account
    IN
    BSTR moneyBalanceStream
    BSTR accountMasterStream
    BSTR openOrderStream
    BSTR executionListStream
    BSTR positionListStream
    OUT
    BSTR* pRet
TodaysExecutions
Purpose: The total amount in dollars of executions today
    IN
    BSTR accountMaster
    BSTR executionList
    unsigned char cAccountType (optional)
    OUT
    BSTR* pRet
GetOpenBuyOrderAmount
Purpose: The total dollar amount of open buy orders in the account
    IN
    BSTR accountMaster
    BSTR openOrderList
    BSTR bstrsymbol (optional)
    unsigned char cAccountType (optional)
    OUT
    BSTR* pRet
CashMarketValue
Purpose: The total amount of unused cash the account is holding in type 1 (cash)
    IN
    BSTR moneyBalanceStream
    OUT
    BSTR* pRet
TradingCash
Purpose: The total amount of available funds for making stock purchases for a cash account
    IN
    BSTR moneyBalanceStream
    BSTR accountMasterStream
    BSTR openOrderStream
    BSTR executionListStream OUT
BSTR* pRet
NetTradeBalance
Purpose: The total amount of trade date balances in the account (type 1, 2 and 3)
IN
BSTR moneyBalanceStream
BSTR executionListStream
BSTR positionListStream
OUT
BSTR* pRet
NetEquity
Purpose: The total amount of trade date balances and market value of the positions
IN
BSTR moneyBalanceStream
OUT
BSTR* NetEquity
MarketValue
Purpose: The total amount of the market value of the positions
IN
BSTR moneyBalances
OUT
BSTR* pRet
SettlementBalance
Purpose: The total amount of settlement date balances in the account
IN
BSTR moneyBalanceStream
OUT
BSTR* pRet
ShortMarketValue
Purpose: The total market value of all short positions in the account
IN
BSTR moneyBalanceStream
OUT
BSTR* pRet
MarginMarketValue
Purpose: The total market value of all positions held in type 2 (margin)
IN
BSTR moneyBalanceStream
OUT
BSTR* pRet
TotalAccountValue
Purpose: The total account value of the account. Positions and free funds.
IN
BSTR moneyBalanceStream
OUT
BSTR* pRet
BuyingPower
Purpose: Total funds available for purchase for a margin account. Does not take out open buy orders.
IN
BSTR accountMasterStream
BSTR moneyBalanceStream
BSTR positionListStream
BSTR executionListStream
OUT
BSTR* pRet
AvailableBuyingPower
Purpose: Total funds available for purchases for a margin account.
IN
BSTR accountMasterStream
BSTR moneyBalanceStream
BSTR positionListStream
BSTR executionListStream
BSTR openOrderStream
OUT
BSTR* pRet
AvailableDTBuyingPower
Purpose: Total funds available for day trade purchases
IN
BSTR accountMasterStream
BSTR moneyBalanceStream
BSTR positionListStream
BSTR executionListStream
BSTR openOrderStream
OUT
BSTR* pRet Packets created and processed by the WBO Service are formatted such that they contain a Header followed by a ReHeader, followed by appropriate Request data, followed by a Trailer.

The Header contains the following fields with their corresponding length:
Header—10 bytes
MessageLength—6 bytes
Request—10 bytes
Max Reply Size—6 bytes
User Reference—20 bytes
Data Source—8 bytes
Protocol—1
Reserved—31 bytes The ReHeader contains the following fields with their corresponding length:
Query—20 bytes
Number of Records—4 bytes
Size of each Record—6 bytes
The Request section will vary depending on the request type, indicated by the Request field of the Header. The Request field can have the following values:

```
#define PACKET_HEADER_NONE                    "NONE"
#define PACKET_HEADER_ALL                     "ALL"
#define PACKET_HEADER_POSITIONS               "POSITIONS"
#define PACKET_HEADER_OPENORDERS              "OPENORDERS"
#define PACKET_HEADER_EXECUTIONS              "EXECUTIONS"
#define PACKET_HEADER_SECURITY_MASTER         "SECMASTER"
#define PACKET_HEADER_ACCOUNT_MASTER          "ACTMASTER"
#define PACKET_HEADER_MONEY_BALANCE           "MNYBALANCE"
#define PACKET_HEADER_CALCULATION             "CALCULATION"
#define PACKET_HEADER_PENDING_TRANSACTIONS    "PENDINGTRAN"
#define PACKET_HEADER_ERROR                   "ERROR"
#define PACKET_HEADER_PING                    "PING"
```

The request types for the WBO Service are as follows, the functionality of which is readily recognizable to those of ordinary skill in the art:

"ACTMASTER"
Account=8 bytes
OfficeCode=3 bytes
AccountEx=3 bytes
TaxId=11 bytes
TradingAuth=1 bytes
MarginAgreement=1 bytes
OptionAgreement=1 bytes
Name=40 bytes
Address1=40 bytes
Address2=40 bytes
Address3=40 bytes
Email=71 bytes
Class=1 bytes
DayTrader=1 bytes
InetTrading=1 bytes
TestGroup=1 bytes
CommissionSchedule=1 bytes
AccountRestrictions=1 bytes
DateOpen=8 bytes
Address4=40 bytes
Address5=40 bytes
"MNYBALANCE"
TradeDateBal1=14 bytes
TradeDateMktValue1=14 bytes
SettleBal1=14 bytes
TradeDateBal2=14 bytes
TradeDateMktValue2=14 bytes
SettleBal2=14 bytes
TradeDateBal3=14 bytes
TradeDateMktValue3=14 bytes
SettleBal3=14 bytes
TradeDateBal4=14 bytes
TradeDateMktValue4=14 bytes
SettleBal4=14 bytes
TradeDateBal5=14 bytes
TradeDateMktValue5=14 bytes
SettleBal5=14 bytes
TradeDateBal6=14 bytes
TradeDateMktValue6=14 bytes
SettleBal6=14 bytes
TradeDateBal7=14 bytes
UnsettledOptions=14 bytes
UnsettledSpecialFunds=14 bytes
SnapshotMarketVal1=14 bytes
SnapshotMarketVal2=14 bytes
SnapshotMarketVal3=14 bytes
UnsettledFunds=14 bytes
TradeDateMktValue9=14 bytes
UsableSMA=14 bytes
MaintenanceCall=14 bytes
FedCall=14 bytes
BuyingPower=14 bytes
FreeCash=14 bytes
StockValue=14 bytes
OptionValue=14 bytes
TradeCount=6 bytes
BranchId=3 bytes
EquityCallAmount=10 bytes
DayTradeCall=10 bytes
SMACharge=12 bytes
SMARelease=12 bytes
ExtraFreeCash=14 bytes
SnapshotFreeCash=14 bytes
SnapshotTradeBal1=14 bytes
SnapshotTradeBal2=14 bytes
SnapshotTradeBal3=14 bytes
YesterdayDeposit=11 bytes
DTMaintenanceExcess=12 bytes
DTMaintenanceRequirement=12 bytes
DTBODFreeCash=12 bytes
DTExecutions=12 bytes
SnapShotDate=8 bytes
"POSITIONS"
AccountType=1 bytes
Symbol=6 bytes
Location=1; bytes
Description=42 bytes
Shares=10
MktValue=13 bytes
SecurityType=1 bytes
Cusip=12 bytes
PurchasePrice=13 bytes
ScottSymbol=9 bytes
TPurch=11 bytes
TSale=11 bytes
OvernightQuantity=11 bytes
RestrictedQuantity=12 bytes
NewSymbol=12 bytes
ClosingOption=1 bytes
TransferOutQuantity=12 bytes
Price=12 bytes
"OPENORDERS"
AccountCode=1 bytes
Symbol=7 bytes
WebTrackingNumber=15 bytes
FixTrackingNumber=15 bytes
OriginalWebTrackingNumber=15 bytes
Action=1 bytes
Quantity=14 bytes
StopPrice=14 bytes
LimitPrice=14 bytes
AllOfNone=1 bytes
TIF=1 bytes
Cusip=12 bytes
OrderStatus=1 bytes
QuantityFilled=14 bytes
QuantityOpen=14 bytes
Bid=14 bytes
Ask=14 bytes
GoodThruDate=8 bytes
OrderTime=6 bytes
ExecDestination=4 bytes
DestOverride=27 bytes
Commission=14 bytes
SecurityType=1 bytes
UnderlyingSymbol=6 bytes
PossibleDuplicate=1 bytes
TradingSession=1 bytes
OrderType=1 bytes
ScottSymbol=9 bytes
OrderDate=8 bytes
Route=1 bytes
SenderCompId=10 bytes
Comment=40 bytes
CumQuantity=13 bytes
Comment2=125 bytes
Cancellable=1 bytes
Modifiable=1 bytes
SecurityClass=1 bytes
"EXECUTIONS"

AccountCode=1 bytes
BuySellCode=2 bytes
TradeDate=8 bytes
Symbol=12 bytes
OrderDate=8 bytes
BranchCode=7 bytes
SeqNo=4 bytes
ExecutionTime=6 bytes
Cusip=12 bytes
Quantity=14 bytes
Description=42 bytes
PriceOffset=14 bytes
Commission=14 bytes
ExecDestination=4 bytes
AveragePrice=14 bytes
SettlementDate=8 bytes
OrderStatusOffset=1 bytes
SecurityClass=1 bytes
ContraAccount=10 bytes
ExecType=1 bytes
ScottSymbol=9 bytes
SecFee=8 bytes
Eamt=13 bytes
WebTrackingNumber=15 bytes
"SECYMASTER"
Cusip=12 bytes
ExchangeCode=2 bytes
CType=1 bytes
SecClass=4 bytes
Elig=2 bytes
MarginableFlag=1 bytes
PriceDate=8 bytes
Price=11 bytes
UnderlyingCusip=12 bytes
UnderlyingSymbol=6 bytes
MPV=5 bytes
Desc=52 bytes
ExpMonth=3 bytes
ExpYear=4 bytes
CallPut=1 bytes
StrikePrice=9 bytes
Symbol=6 bytes
MarketCode=6 bytes
MarketRank=6 bytes
ScottSymbol=9 bytes The Trailer Contains the following fields with their corresponding length:
More Flag—1 byte
End Of Message—1 byte Upon receiving an activity request from WBOClient, WBOServer processes the request and returns a response. The response will be formatted in the same manner as the request, with the Request field containing the correct data for the request type. If the Number of Records field of the ReHeader is greater than 1, then Request will contain the specified number of records. The records will be return one after another up to the amount of bytes specified in the Max Reply Size of the Header. If not all data can fit in the amount of space specified in Max Reply Size then the More Flag of the Trailer will contain a "Y" and WBOClient will follow up with a subsequent request to get the rest of the records.

Miscellaneous field values for the WBO Service are as follows:

```
    // data sources
#define PACKET_HEADER_DATA_FRESH                'F'
#define PACKET_HEADER_DATA_CACHE                'C'
    // protocol
#define PACKET_HEADER_PROTOCOL_ASCII            'A'
#define PACKET_HEADER_PROTOCOL_BINARY           'B'
    // error codes
#define PACKET_REQUEST_TIMEOUT                  "TIMEOUT"
#define PACKET_REQUEST_INVALID                  "INVALID_REQUEST"
#define PACKET_REQUEST_ERROR_UNKNOWN            "UNSPECIFIED"
const int ClientMaxReplySize = 1400;
    // account types
#define SCOTTRADE_STR_CASH                      '0'
#define SCOTTRADE_STR_MARGIN                    '1'
#define SCOTTRADE_STR_SHORT                     '2'
#define SCOTTRADE_STR_ACCOUNT_UNKNOWN           '9'
    // security classes
#define SCOTTRADE_STR_EQUITY                    '0'
#define SCOTTRADE_STR_OPTION                    '1'
#define SCOTTRADE_STR_MUTUAL_FUND               '2'
#define SCOTTRADE_STR_UIT                       '3'
#define SCOTTRADE_STR_FIXED                     '4'
#define SCOTTRADE_STR_TREASURY                  '5'
#define SCOTTRADE_STR_BOND                      '6'
#define SCOTTRADE_STR_CD                        '7'
#define SCOTTRADE_STR_SEC_CLASS_UNKNOWN         '9'
    //open order secy types
#define SCOTTRADE_STR_SECY_OPTION               "O"
    // call/put
#define SCOTTRADE_STR_CALL                      'C'
#define SCOTTRADE_STR_PUT                       'P'
#define SCOTTRADE_STR_CALL_NOR_PUT              ' '
    // B/S Codes
#define SCOTTRADE_STR_BUY                       "0"
#define SCOTTRADE_STR_SELL                      "1"
#define SCOTTRADE_STR_SELL_SHORT                "2"
#define SCOTTRADE_STR_BUY_TO_COVER              "3"
#define SCOTTRADE_STR_BUY_TO_OPEN               "4"
#define SCOTTRADE_STR_BUY_TO_CLOSE              "5"
```

```
                                              -continued
    #define SCOTTRADE_STR_SELL_TO_OPEN                               "6"
    #define SCOTTRADE_STR_SELL_TO_CLOSE                              "7"
    #define SCOTTRADE_STR_ACTION_UNKNOWN                             "U"
    // TIF Codes
    #define SCOTTRADE_STR_DAY                                        "0"
    #define SCOTTRADE_STR_GTC                                        "1"
    #define SCOTTRADE_STR_TIF_UNKNOWN                                "9"
    // Status Codes
    #define SCOTTRADE_STR_STATUS_NONE                                 0
    #define SCOTTRADE_STR_SENT                                        1
    #define SCOTTRADE_STR_ACCEPTED                                    2
    #define SCOTTRADE_STR_REJECTED                                    3
    #define SCOTTRADE_STR_CANCELLED                                   4
    #define SCOTTRADE_STR_PENDING_CANCEL                              5
    #define SCOTTRADE_STR_PENDING_MODIFY                              6
    #define SCOTTRADE_STR_MODIFIED                                    7
    #define SCOTTRADE_STR_SENT_AND_QUEUED                             8
    // Route Codes
    #define SCOTTRADE_STR_ROUTE_NONE                                 "0"
    #define SCOTTRADE_STR_ROUTE_FIX                                  "1"
    #define SCOTTRADE_STR_ROUTE_QUEUE                                "2"
    #define SCOTTRADE_STR_ROUTE_APPROVAL                             "3"
    #define SCOTTRADE_STR_ROUTE_MANUAL                               "4"
    // Trading Sessions
    #define SCOTTRADE_STR_SESSION_REGULAR                             0
    #define SCOTTRADE_STR_SESSION_EXT_HOURS                           1
    #define SCOTTRADE_STR_SESSION_PREMARKET                           2
    // transaction type
    #define SCOTTRADE_STR_ORDER                                       0
    #define SCOTTRADE_STR_CANCEL                                      1
    #define SCOTTRADE_STR_MODIFY                                      2
    // option trading auth codes
    #define SCOTTRADE_STR_OPTION_YES                                 'D'
    #define SCOTTRADE_STR_OPTION_COVERED                             '2'
    #define SCOTTRADE_STR_OPTION_PROTECTED_PUT                       '3'
    #define SCOTTRADE_STR_OPTION_SPREAD                              '4'
    #define SCOTTRADE_STR_OPTION_LONG                                '5'
    #define SCOTTRADE_STR_OPTION_SHORT                               '6'
    #define SCOTTRADE_STR_OPTION_NAKED                               '8'
// trading auth
    #define SCOTTRADE_STR_LIMITED_TRADING                            'J'
    #define SCOTTRADE_STR_FULL_TRADING                               'K'
    #define SCOTTRADE_STR_OTHER_TRADING                              'L'
    #define SCOTTRADE_STR_ACCOUNT_ESTABLISHED                        'E'
    #define SCOTTRADE_STR_TRADING_APPROVED                           'M'
    // account types
    #define SCOTTRADE_STR_IRA                                        '0'
    #define SCOTTRADE_STR_ACCOUNT_CLASS_OTHER                        'O'
    // risk levels
    #define SCOTTRADE_STR_RISK_SELLS_ONLY                            '1'
    #define SCOTTRADE_STR_RISK_NO_TRADING                            '2'
    // commission schedules
    #define SCOTTRADE_STR_COMMISSION_SCHED_SAFEKEEPING               '1'
    #define SCOTTRADE_STR_COMMISSION_SCHED_TRADITIONAL               '2'
    #define SCOTTRADE_STR_COMMISSION_SCHED_INTERNET                  '3'
    #define SCOTTRADE_STR_COMMISSION_SCHED_SUPERSAVER                '4'
    // account restrictions
    #define SCOTTRADE_STR_ACCOUNT_RESTRICTIONS_NONE                  ' '
    #define
SCOTTRADE_STR_ACCOUNT_RESTRICTIONS_SETTLED_FUNDS_ONLY                '1'
    (i) WBOClient Interfaces
```

For each record type, there are four interfaces. There will be a GetDataStream, GetData, GetDataStreamEx, and GetDataEx, wherein "Data" or "DataStream" is a placeholder for the request type. The following describes each record type:

GetDataStream: Returns a byte stream of data for the entire record (or recordset). The data is returned as one continuous character array, where each data element is a fixed length delimited field.

GetDataStreamEx: same as GetDataStream, but allows some extra flexibility. It allows the client to determine the source of the data, whether it is from cache or if it is from the backoffice accounting database system.

GetData: The data is returned as an array. In the case of recordsets, the array is actually an array of arrays, where each element of the master array is an array of data elements.

GetDataEx: same as GetData, but allows some extra flexibility. It allows the client to determine the source of the data, whether it is from cache or if it is from the backoffice accounting database system.

Each "Stream" method for recordsets will preface the data by fixed-length delimited information describing the data. This will contain the size of each record, and how many records to expect in the stream.

| Name | Str-Length | Str-Offset |
|---|---|---|
| RecordSize | 4 | 0 |
| RecordCount | 4 | 1 |

Immediately after the header, the data will begin.

It is preferred that internal programming used by the system application decide which of the GetDataStream, GetDataStreamEx, GetData, and GetDataEx is used, the programming being configured in accordance with any design choices of the programmer. With the present invention, the GetDataStream interface is preferably used.

A description of the functions supported by WBOClient will now be described.

Function: GetPositionStream (recordset)

This function returns data as an array of elements in the same format as the Comm protocol between the WBOServer and WBOClient.
Parameters [in]:
 BSTR strAccount
Parameters [out,retval]
 VARIANT* pRet (The data is described below)
Function: GetPositions (recordset)
Parameters [in]:
 BSTR account
Parameters [out, retval]:
 VARIANT* pRet
Function: GetPositionsStreamEx (recordset)

This function takes 1 extra parameter that is a boolean value which can override the cache on the WBOServer. If the value is true then fresh data is pulled from the backoffice accounting database. If the data is false the WBOServer cache is checked and, if available, is used.
Parameters [in]:
 BSTR account
 BOOL fresh?
Parameters [out, retval]:
 * VARIANT* pRet
Function: GetPositionsEx (recordset)

This function returns data as one long string in the same format as the Comm protocol between the WBOServer and WBOClient, which the client parses.
Parameters [in]:
 BSTR account
 BOOL fresh?
Parameters [out, retval]:
 * VARIANT* pRet
Function: GetAccountMaster This function gets account settings and name and address. Returns data as an array of elements in the same format as the Comm protocol between the WBOServer and WBOClient.
Parameters [in]:
 BSTR account
Parameters [out,retval]:
 VARIANT* pRet
Function: GetAccountMasterStream This function returns data as an array of elements in the same format as the Comm protocol between the WBOServer and WBOClient.
Parameters [in]:
 BSTR account
Parameters [out, retval]:
 VARIANT* pRet
Function: GetAccountEx
Parameters [in]:
 BSTR account
 BOOL fresh?
Parameters [out, retval]:
 VARIANT* pRet
Function: GetAccountMasterStreamEx This function takes 1 extra parameter that is a boolean value which can override the cache on the WBOServer. If the value is true then fresh data is pulled from the backoffice accounting database system. If the data is false the WBOServer cache is checked and, if available, is used.
Parameters [in]:
 BSTR account
 BOOL fresh?
Parameters [out, retval]:
 * VARIANT* pRet
Function: GetMoneyBalance This function gets account balances. It returns data as an array of elements in the same format as the Comm protocol between the WBOServer and WBOClient.
Parameters [in]:
 BSTR account
Parameters [out, retval]:
 VARIANT* pRet
Function: GetMoneyBalanceStream This function returns data as an array of elements in the same format as the Comm protocol between the WBOServer and WBOClient.
Parameters [in]:
 BSTR account
Parameters [out, retval]
 VARIANT* pRet
Function: GetMoneyBalanceEx
Parameters [in]:
 BSTR account
 BOOL fresh?
Parameters [out, retval]
 VARIANT* pRet
Function: GetMoneyBalanceStreamEx This function takes 1 extra parameter that is a boolean value which can override the cache on the WBOServer. If the value is true then fresh data is pulled from the backoffice accounting database. If the data is false the WBOServer cache is checked and, if available, is used.
Parameters [in]:
 BSTR account
 BOOL fresh?
Parameters [out, retval]
 VARIANT* pRet
Function GetExecutions (recordset)

This function gets current day executions for a client. Returns data as an array of elements in the same format as the Comm protocol between the WBOServer and WBOClient.
Parameters [in]:
 BSTR account
Parameters [out, retval]:
 VARIANT* pRet
Function: GetExecutionStream (recordset)

This function returns data as an array of elements in the same format as the Comm protocol between the WBOServer and WBOClient.
Parameters [in]:
 BSTR account
Parameters [out, retval]
 VARIANT* pRet Function GetExecutionsEx (recordset)
This function returns data as one long string in the same format as the Comm protocol between the WBOServer and WBOClient, which the client parses.
Parameters [in]:
BSTR account
BOOL fresh?
Parameters [out, retval]:
* VARIANT* pRet
Function: GetExecutionStreamEx (recordset)
This function takes 1 extra parameter that is a boolean value which can override the cache on the WBOServer. If the value is true then fresh data is pulled from the backoffice accounting database system. If the data is false the WBOServer cache is checked and, if available, is used.
Parameters [in]:
* BSTR account
BOOL fresh?
Parameters [out, retval]
VARIANT* pRet
Function: GetOpenOrders (recordset)
This function gets current open orders for a client. It returns data as an array of elements in the same format as the Comm protocol between the WBOServer and WBOClient.
Parameters [in]:
BSTR account
Parameters [out, retval]:
VARIANT* pRet
Function: GetOpenOrderStream (recordset)
This function returns data as an array of elements in the same format as the Comm protocol between the WBOServer and WBOClient.
Parameters [in]:
BSTR account
Parameters [out, retval]
VARIANT* pRet
Function: GetOpenOrdersEx (recordset)
This function returns data as one long string in the same format as the Comm protocol between the WBOServer and WBOClient, which the client parses.
Parameters [in]:
BSTR account
BOOL fresh?
Parameters [out, retval]:
VARIANT* pRet
Function: GetOpenOrderStreamEx (recordset)
This function takes 1 extra parameter that is a boolean value which can override the cache on the WBOServer. If the value is true then fresh data is pulled from the back office accounting database system. If the data is false the WBOServer cache is checked and, if available, is used.
Parameters [in]:
BSTR account
BOOL fresh?
Parameters [out, retval]
VARIANT* pRet
Function: GetSecurityMaster
Parameters [in]:
BSTR symbol
Parameters [out, retval]:
VARIANT* pRet
Function: GetSecurityMasterStream
This function returns data as an array of elements in the same format as the Comm protocol between the WBOServer and WBOClient.
Parameters [in]:
BSTR symbol
Parameter [out,retval]:
VARIANT* pRet
Function: GetSecurityMasterEx
Parameters [in]:
BSTR symbol
BOOL fresh?
Parameters [out, retval]:
VARIANT* pRet
Function: GetSecurityMasterStreamEx
This function takes 1 extra parameter that is a boolean value which can override the cache on the WBOServer. If the value is true then fresh data is pulled from the back office accounting database system. If the data is false the WBOServer cache is checked and, if available, is used.
Parameters [in]:
BSTR symbol
BOOL fresh?
Parameter [out,retval]:
VARIANT* pRet (ii) WBO Caching As noted above, when a WBO server 162 gets a request to retrieve customer account data, it is preferred that the WBO server first check its cache for "fresh" data that has already been retrieved from the back office accounting database system 170. By maintaining customer account data in its application-in-memory cache, the WBO server will reduce the number of times it will need to issue data requests to the backoffice accounting database system, thereby reducing traffic at a potential bottleneck and also increasing response time for handling customer account activity requests.

In order to be considered "fresh", the cached account data preferably complies with a plurality of cache usage rules. These rules, which are preferably directed toward ensuring that the customer account data returned by the WBO server is an accurate current time reflection of the customer's account, can be programmed into the logic of the WBO server. Examples of preferred rules that define the conditions under which cached data can or cannot be used include: (1) for cached data to be used, data for the requested customer account must exist in the cache, (2) for cached data to be used, the cached data must not have been requested more than a predetermined number of times (preferably 30 times), (3) for cached data to be used, the cached data must not have been stored in the cache for longer than a predetermined duration of time (preferably 5 minutes), and (4) for cached data to be used, account events must not have occurred in the pertinent customer account since the time that the customer account data was cached.

Preferably, the WBO servers 162 listen for account events which can be communicated thereto via multicasts from other servers. The WBO servers can perform this listening task by joining subscription lists on a specific multicast IP address and port on the server. An account event is any event that alters a customer's account. Examples of preferred account events include: (1) the placing of an order for the pertinent customer account, (2) the placing of a modify order for a pertinent customer account, (3) the placing of a cancel order for a pertinent customer account, (4) the execution of an order for a pertinent customer account, (5) approval of an order from the approval desk for a pertinent customer account, (6) rejection of an order from the approval desk for a pertinent customer account, (7) an exchange 174 updating an order for a pertinent customer account (preferably coming in through a FixOrderServer multicast), (8) an exchange 174 canceling an order for a pertinent customer account, and (9) the deletion of a pending order for the pertinent customer account.

Applications preferably create these account events using the NotificationSwitchClient COM object described above. Each application which may create an account event preferably provides methods such as PostOrder, PostExecution, PostModify, and PostCancel that takes customer account data as parameters and sends a multicast packet to the IP port on which the WBO servers are listening.

In the event that cached data is not found or cannot be used because of the cache usage rules, the WBO server queries the backoffice accounting database system for the customer account data. Thereafter, the WBO server queries the orders database 178 and customers database 182 for data such as pending orders and specific calculations for the account, which are not available from the backoffice accounting database system.

Once it has obtained the requisite customer account data from the backoffice and the orders database, the WBO server merges the data into one common dataset and updates its cache with the new data. At this time, the "fresh" data timer and "fresh" data request counter are reset.

C. Database Schema

The database schema 166 for the preferred embodiment of the present invention preferably is a SQL database schema that uses a Microsoft SQL Server 2000 to store a variety of information not included in the order, WBO, or quote services but still needed to support the various front end applications and the other three services.

Figure 13:
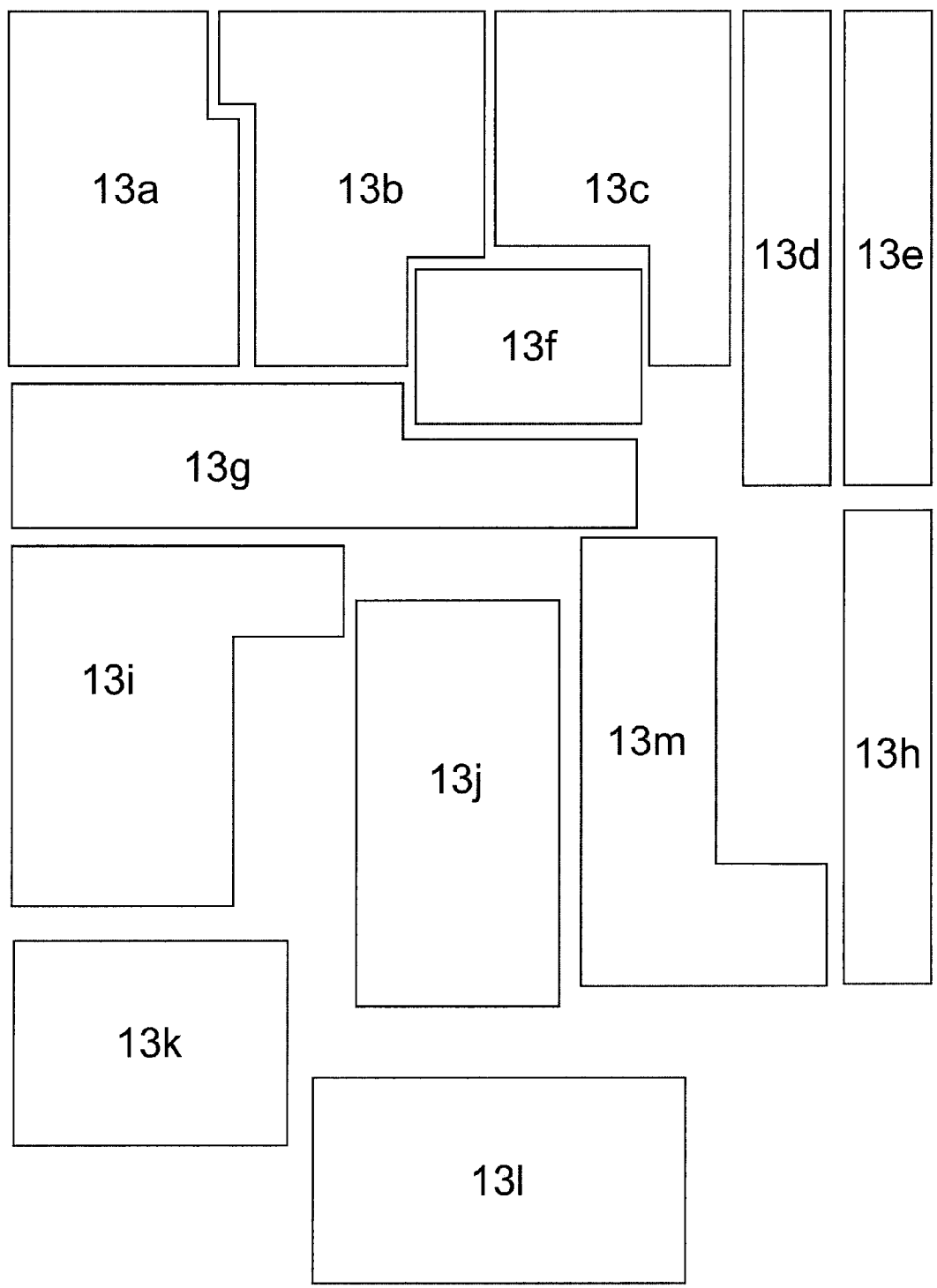
Figure 13I:
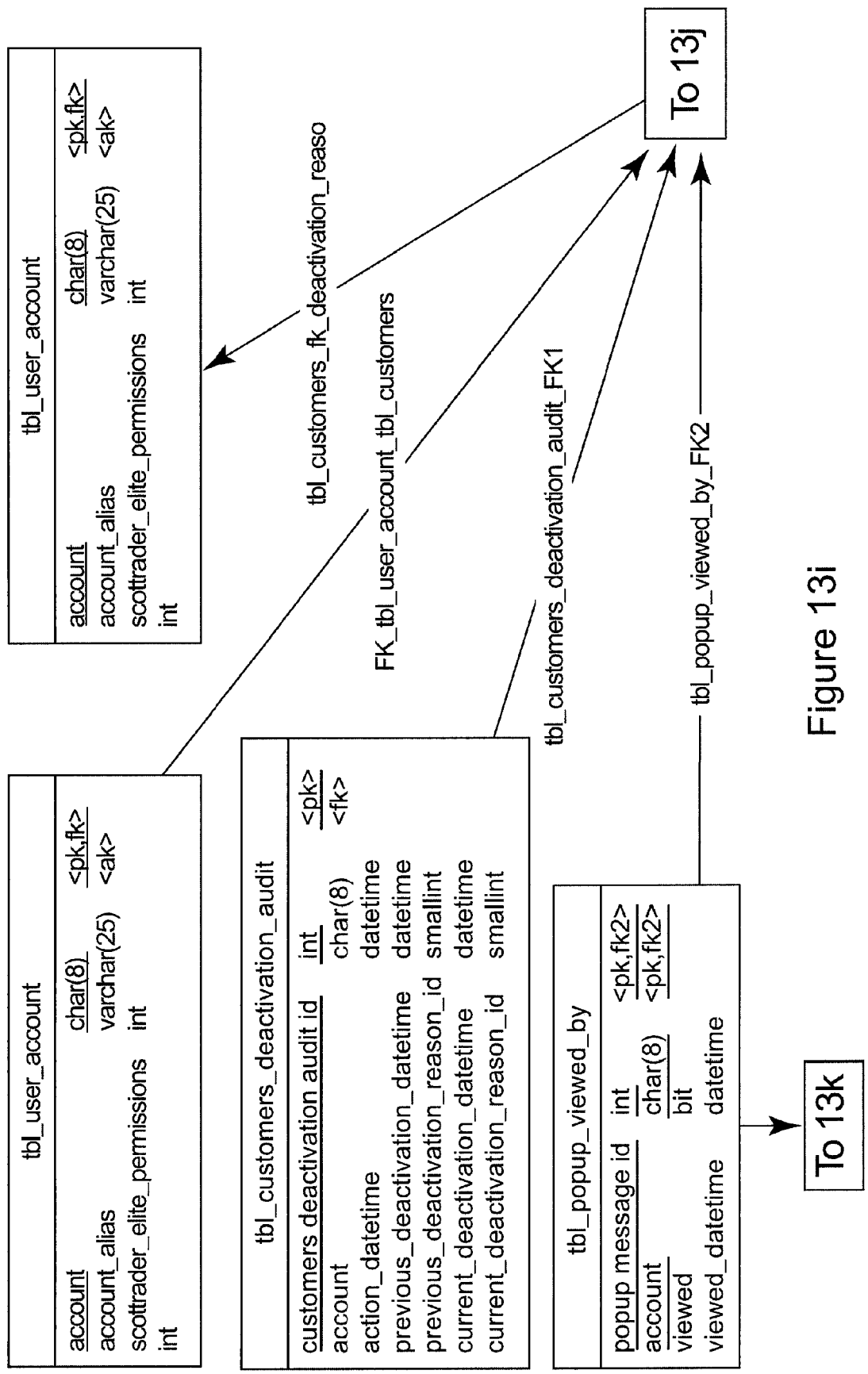
Figure 13J:
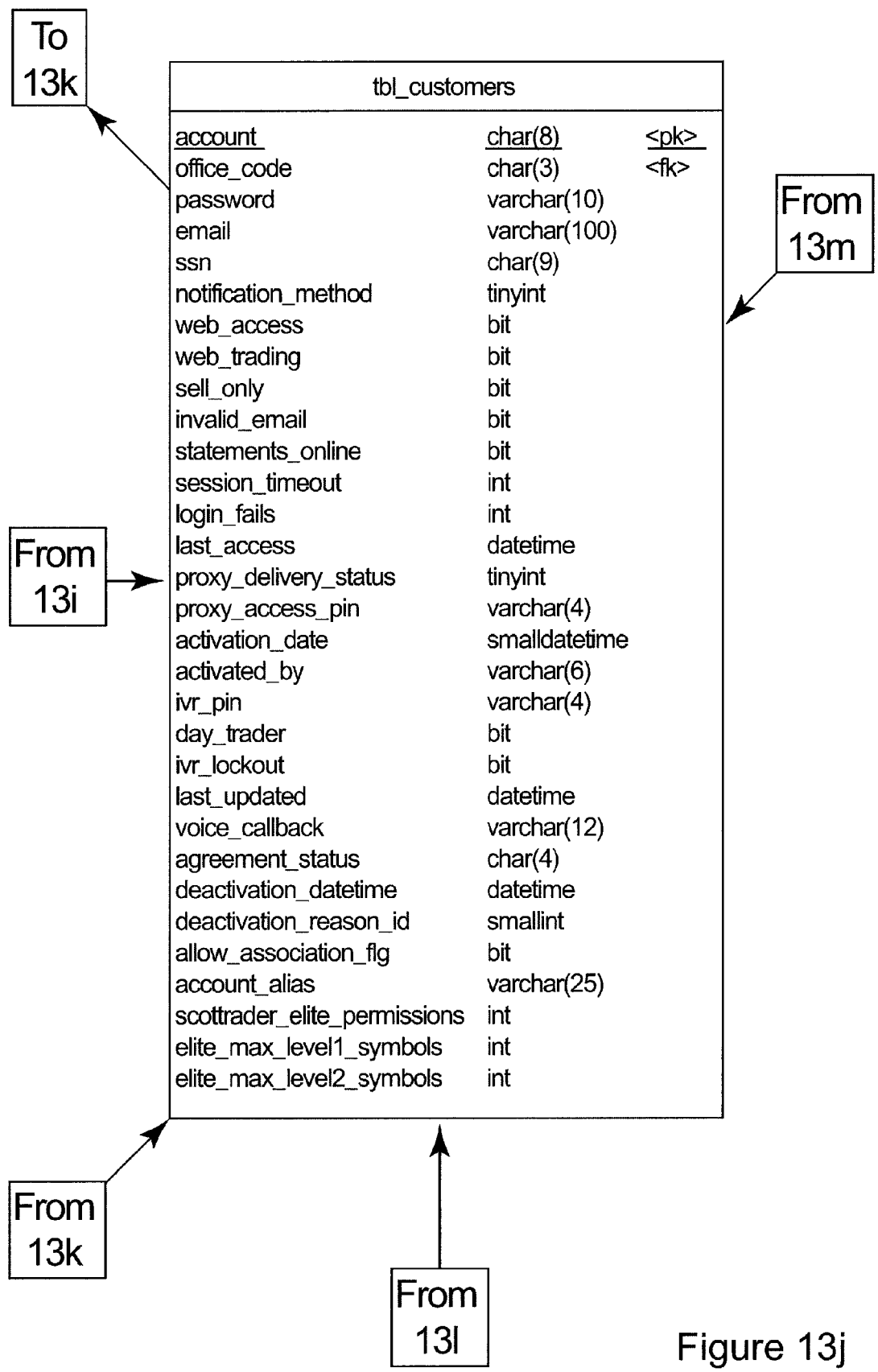
Figure 13K:
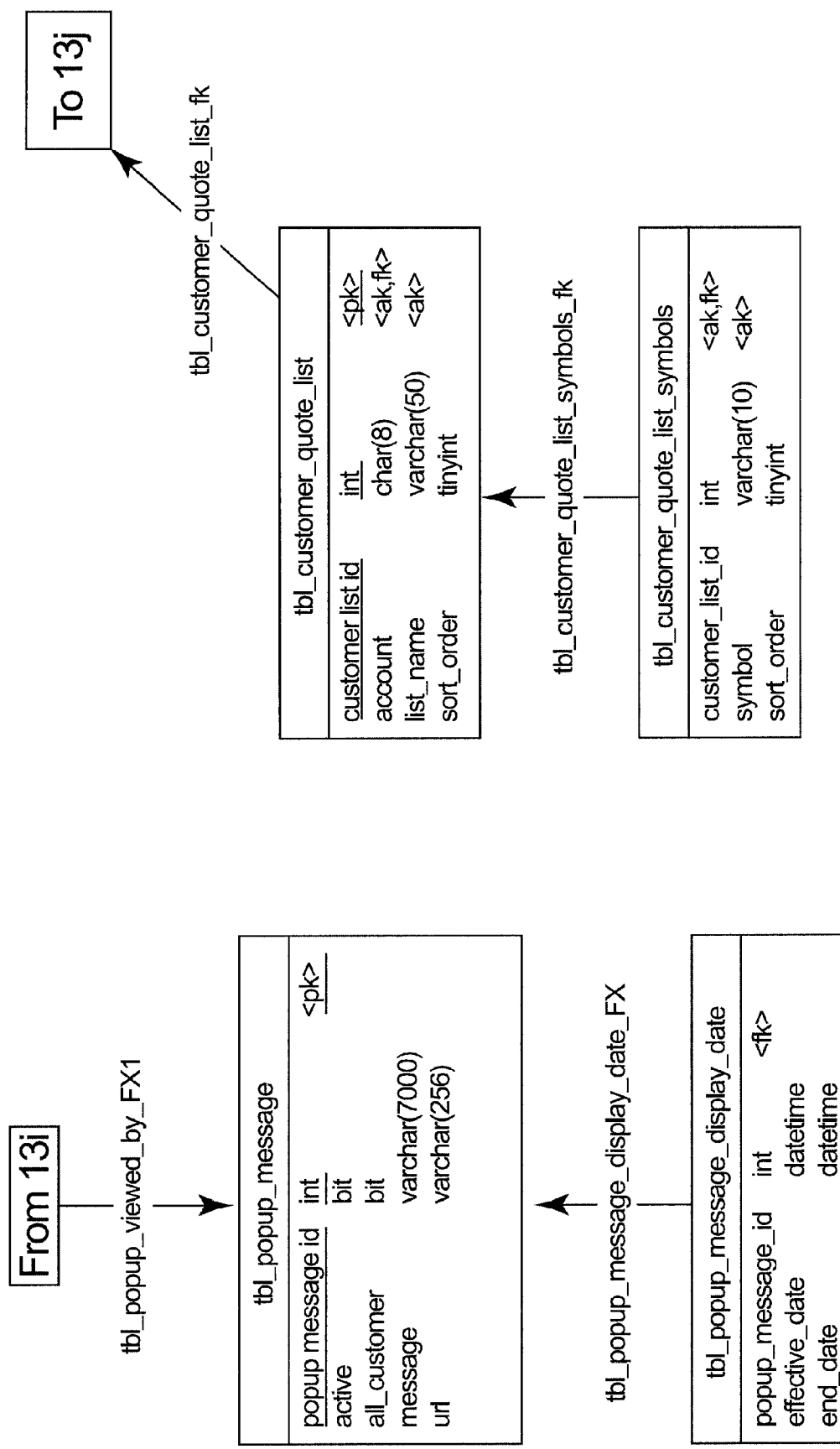
Figure 13L:
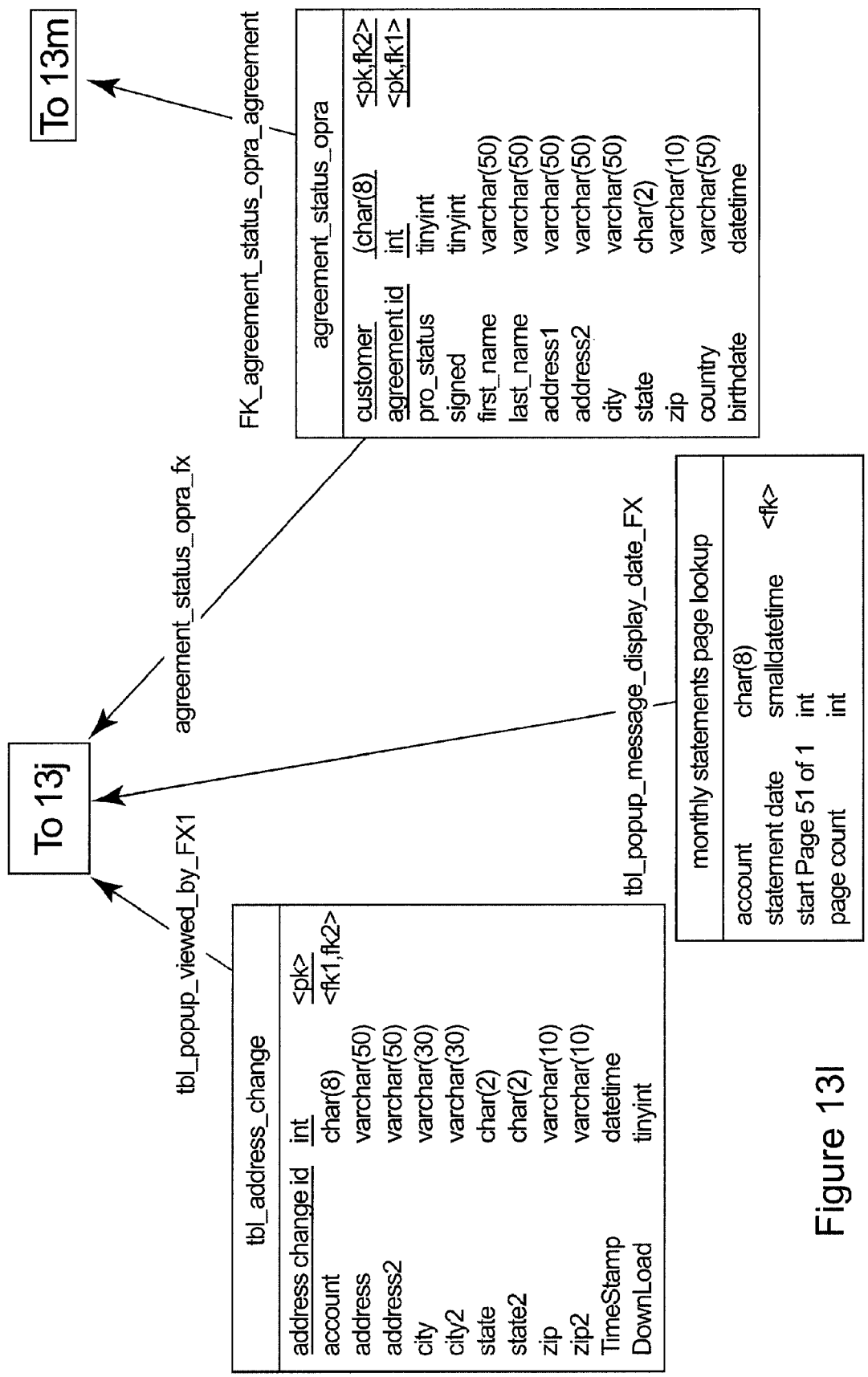
Figure 13M:
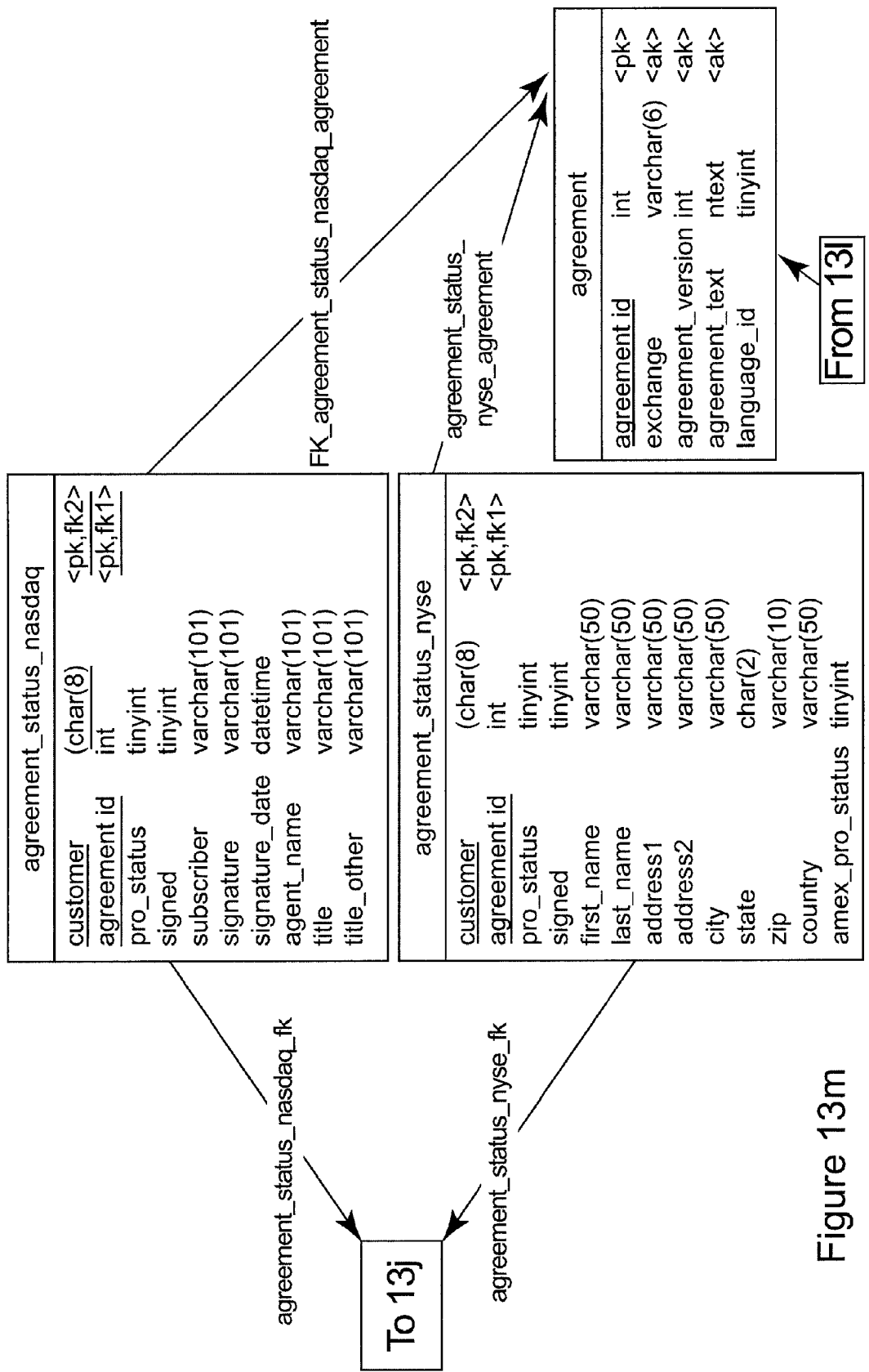

As part of the service, the "customers" database 182 contains customer account specific information that is not stored on the backoffice accounting database system 170, such as email address, trading password, web site preferences, access information such as web-site authentication credential, buying power for day-traders, exchange agreement signatures, popup messages to be display during authentication, address change history, notes, etc. FIGS. 13 and 13(*a*)-(*m*) illustrate a preferred table arrangement for the customers database 182.

Internet customers are preferably added to the customers database 182 when a branch manager opens a new account for such customers. Non-internet customers are added to the customers database 182 through a nightly process in which the data is extracted from the back office system 170 and loaded into the customers database 182. An Internet customer is a customer who conducts some specified percentage of transactions on his account through the Internet. A preferred threshold for Internet customers is one who conducts 90% of his account transactions through the Internet.

Figure 14:
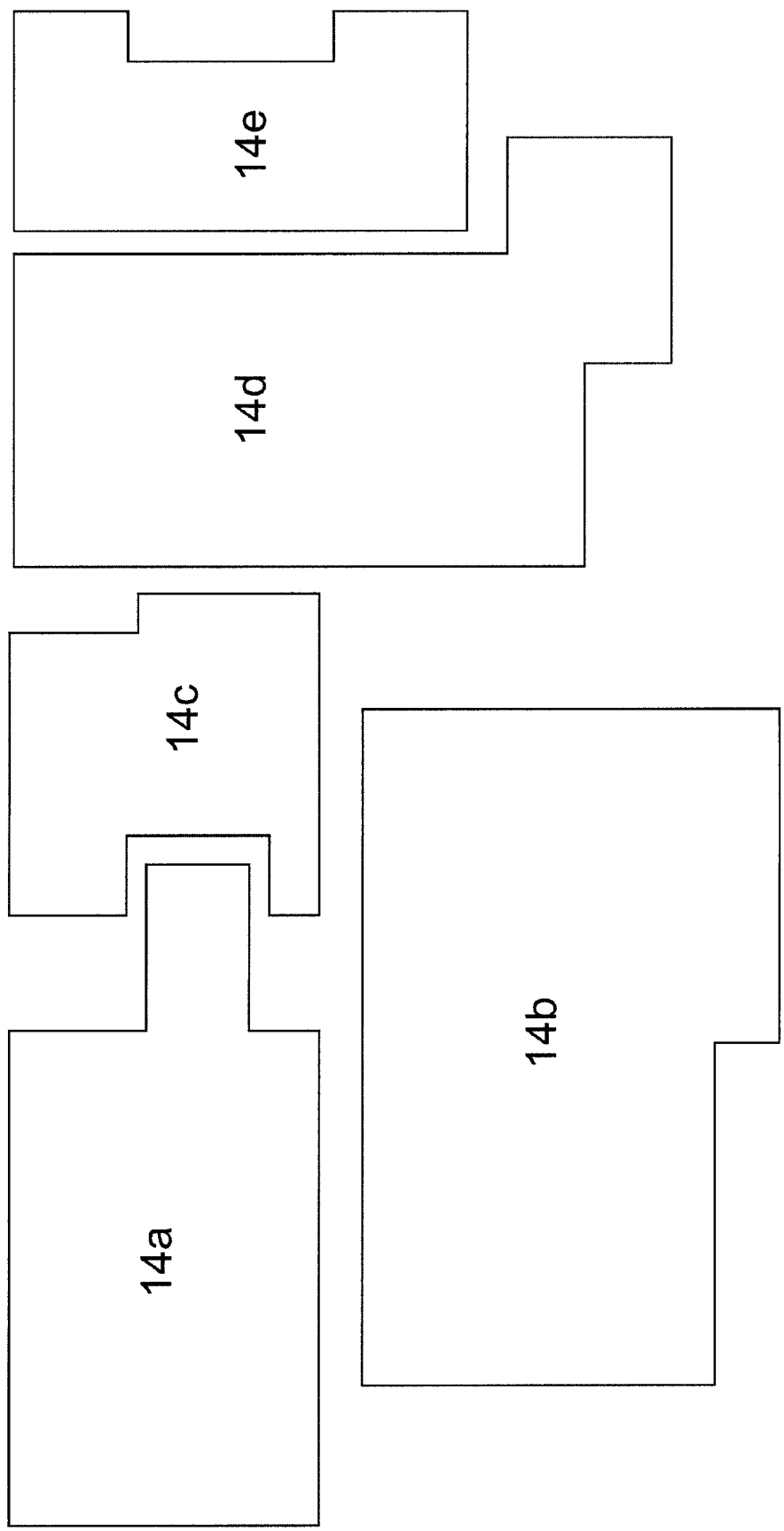
Figure 14A:
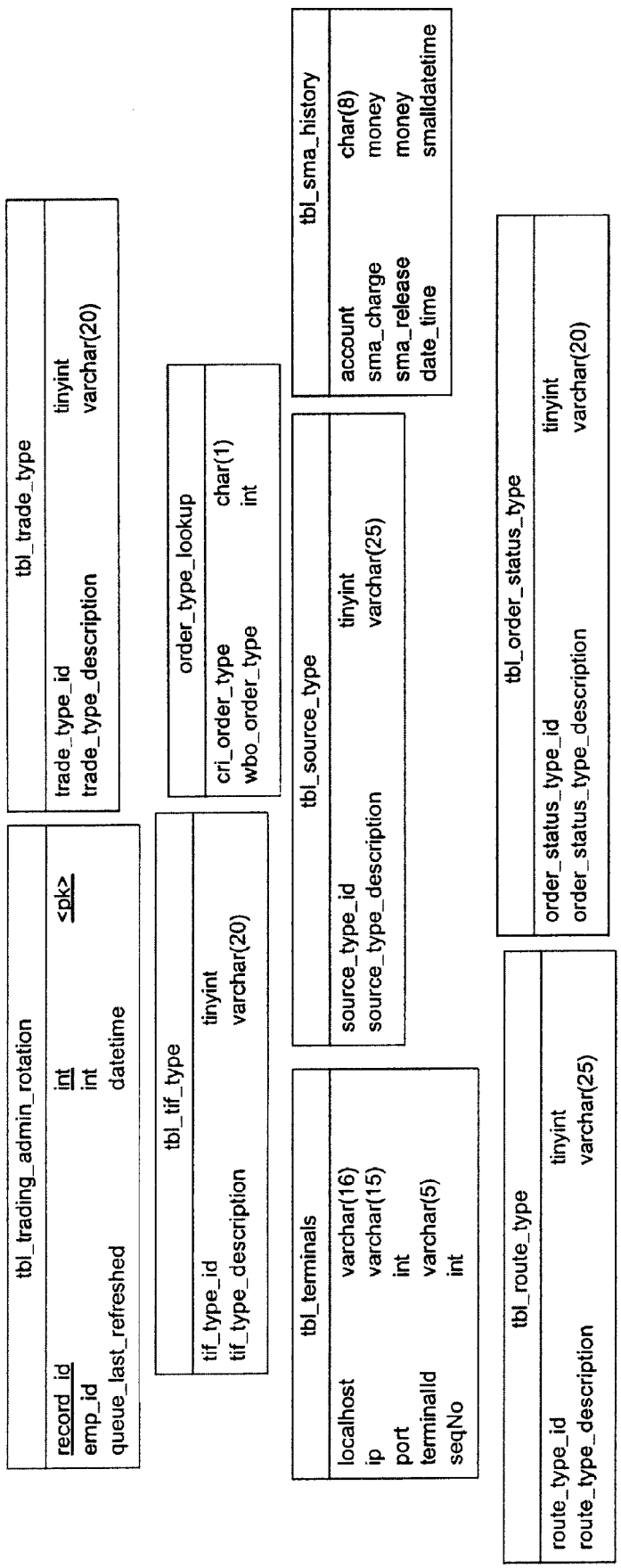
Figure 14D:
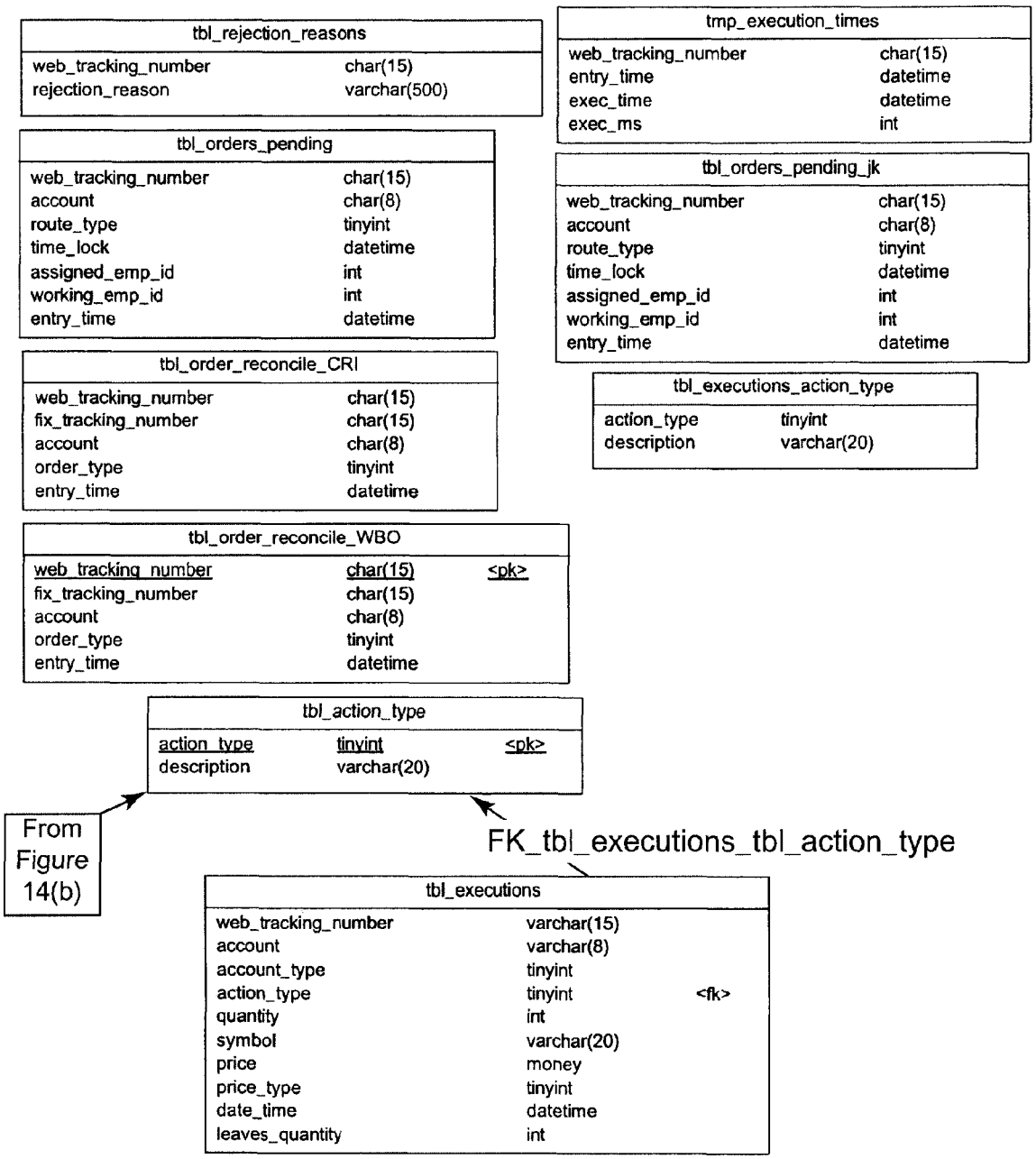

The "orders" database 178 contains orders entered via the various front end applications, including orders that may have been rejected by the system 150 for various reasons. The orders database 178 also contains audit trail information on each order such as the front end application from which it was entered and the computer address from which the order originated. Further, the orders are preferably logged by account, symbol, when the order was placed, where the order was placed from (internet, IVR, streaming product, international trading site, etc), limit/market, time in force for limit orders, and quantity. When orders are executed by the system, a corresponding entry is added to an execution table, with details of the execution such as account number, total shares for this execution, total shares remaining for this transaction, price of execution. FIGS. 14 and 14(*a*)-(*e*) illustrate a preferred table arrangement for the orders database 178.

Every time an order is modified internally or by the customer, an audit record is maintained.

Due to the large amount of data kept for orders, a copy of all data in the orders database is preferably placed on a report server nightly. This allows internal users to query the database without affecting the customer experience.

Figure 15:
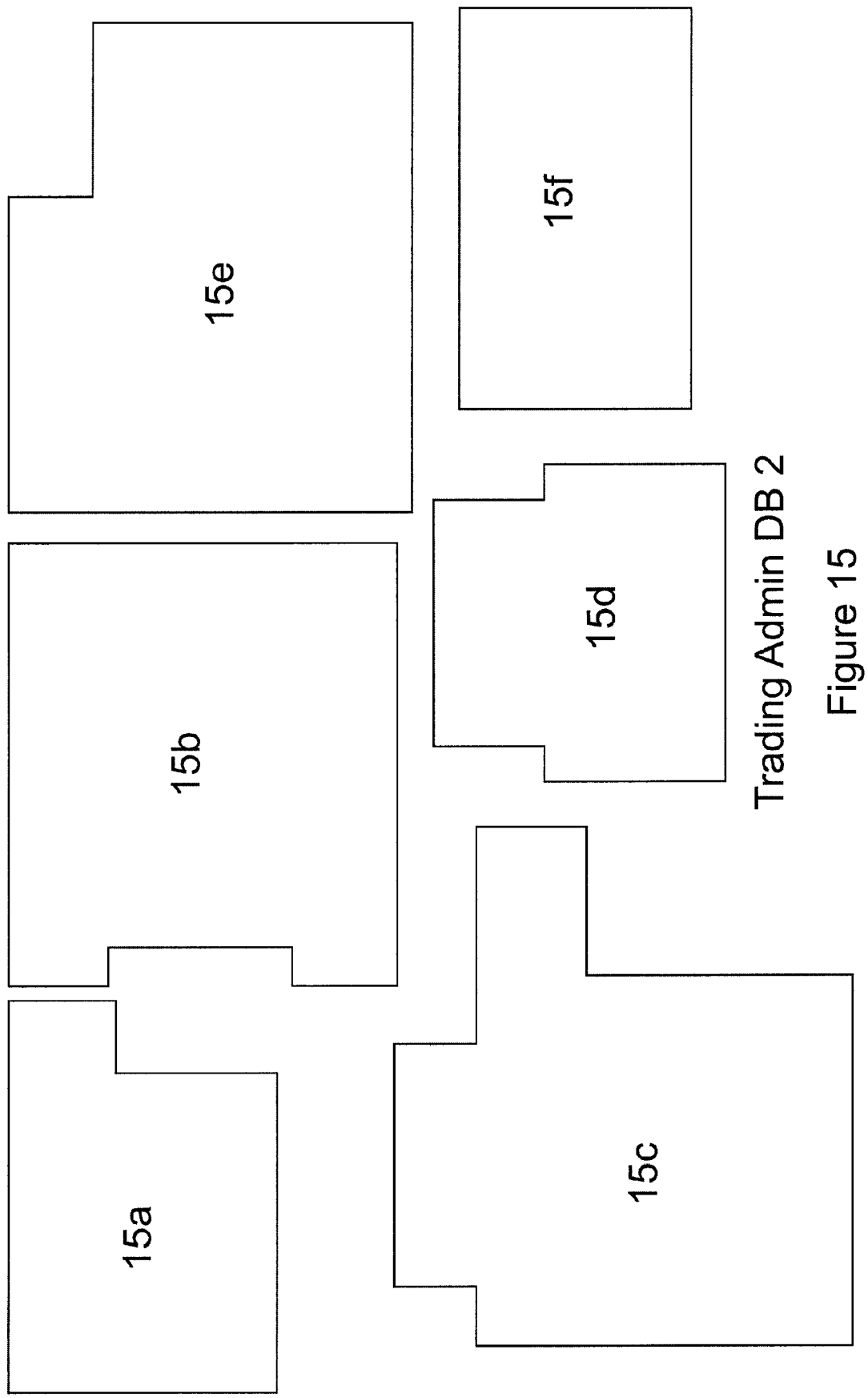
Figure 15C:
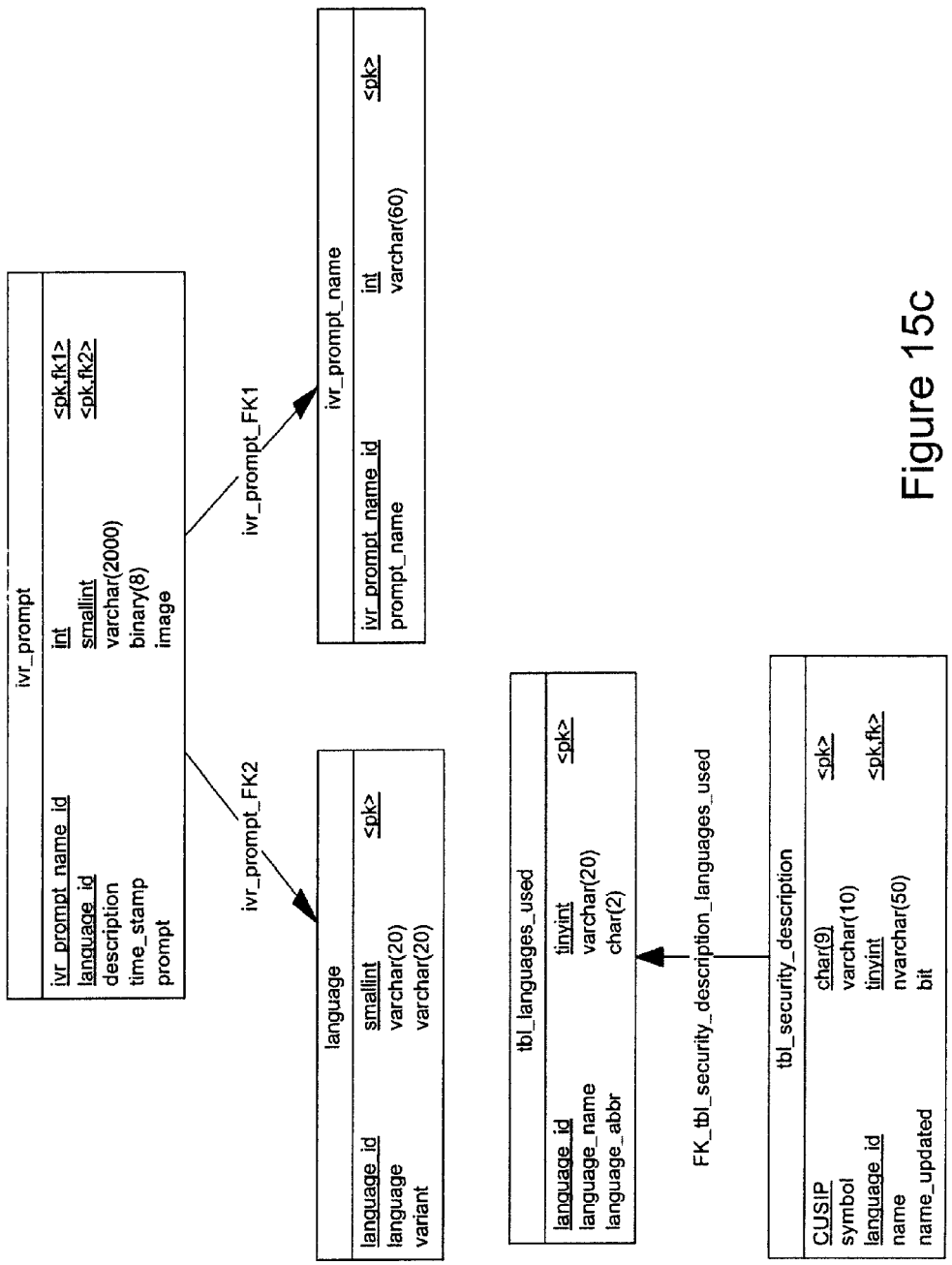
Figure 15D:
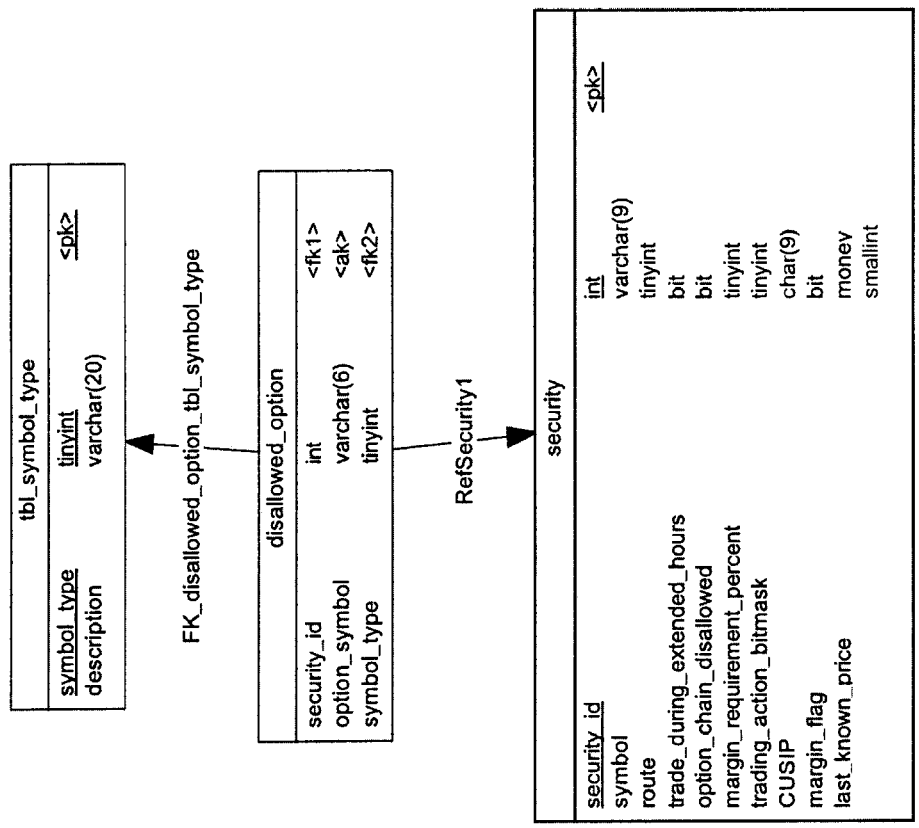
Figure 15E:
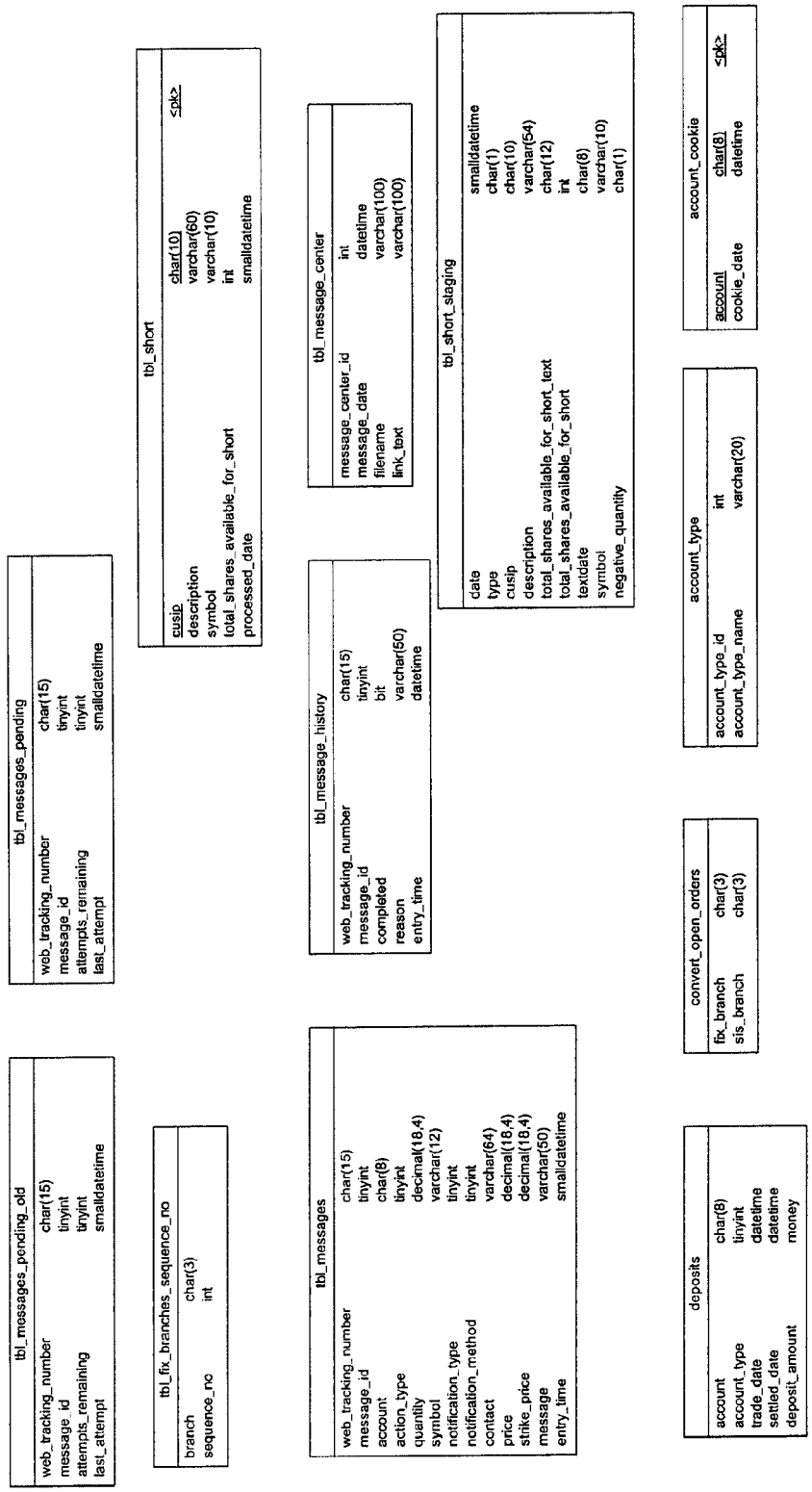
Figure 15F:
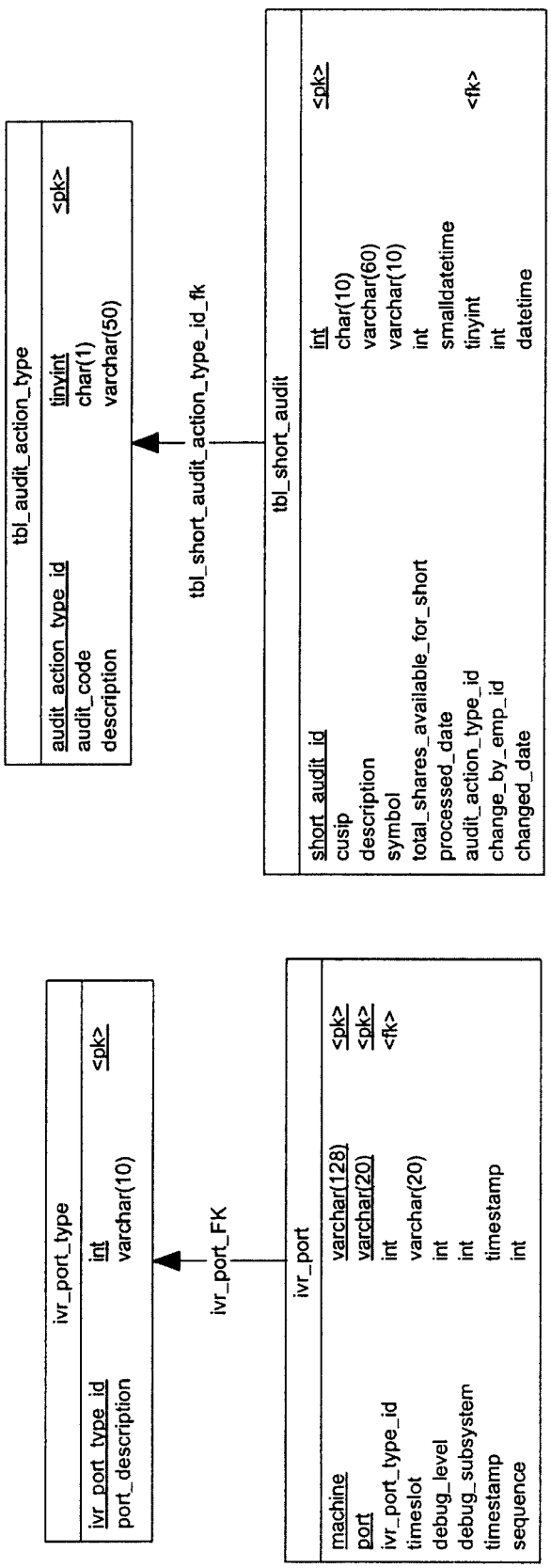

The "trading admin" database 180 stores non-customer specific information required to run the various services, including information on the availability for trading of various financial instruments, which of the front end applications are available and the status of each service, and other administration and control data. The trading admin database 180 is also preferably used to generate a web tracking number for orders received over the Internet. As previously noted, FIGS. 12(*a*)-(*c*) illustrate various administrator interfaces for controlling the trading admin database 180. FIGS. 15 and 15(*a*)-(*f*) illustrate a preferred table arrangement for the trading admin database 180.

It is preferred that these SQL databases exist in the system in a clustered node configuration, as shown in FIG. 2, to allow for redundancy and fail over.

Whereas most databases are designed as one large database, thereby requiring additional hardware be added to the same physical box in an effort to keep up with growth requirements, the preferred embodiment of the present invention segments the logically grouped elements of customers, orders, and trading administration into distinct databases. Interaction with each of these databases is preferred in order to complete a transaction. This partitioning of data into separate databases prevents overtaxing of the system, which would be a distinct risk under normal database design convention in which all of these divisions would have been designed to operate as a single database. Because the data is already in separate databases the system 150 is always ready for scaling.

Further, by segregating each of the individual components to isolated databases, a system administrator is able to place these unique databases on a separate physical database servers 166 if conditions are such that utilization is high. If conditions are such that database utilization is low, the system administrator can instead use a single database server 166 to host multiple databases.

D. Quote Service

The quote service preferably utilizes QuoteDB, which is a dynamically linked library, to handle communication between client applications and QuoteServer, which is an application running on the quote server. QuoteDB creates packets to retrieve stock data from QuoteServer, parses the response from QuoteServer, and creates data structures for easy access to the quote data. QuoteClient is preferably a COM wrapper for QuoteDB, thereby rendering the quote data accessible through any language that supports COM.

The quote service preferably supplies real-time and static pricing and descriptive information on financial instruments. The descriptive information preferably includes: last sale, bid, ask, volume, and CUSIP, for these instruments. Quote data is typically delivered for display to a customer, but is also used to value the positions that the customer owns (stocks, bond, options), and as part of the order acceptance process.

> For example, if a customer wishes to purchase 100 shares of IBM, and has $1000 in his cash account, the ask price for IBM is requested and multiplied by the number of shares to determine the total cost of the purchase, and if it exceeds the cash in the account the order is rejected.

The raw quote data is primarily acquired from market data vendors as is known in the art, but can also be acquired from SQL databases or other data stores. The QuoteClient/QuoteServer combination eliminates the need for the front end applications to know where quote data resides or know the format in which the data is stored.

Also, through the use of the quote data aggregation technique of the preferred embodiment of the present invention, the quote service can also fail over between raw quote data sources should a real-time vendor cease to update, consistently providing the requested data. According to this aspect of the preferred embodiment, QuoteServer merges various quote feeds as one generic quote source. QuoteServer achieves this by creating connections to quote vendors and abstracting their data into a common data format used internally by the system 150. Thus, when the quote service switches to a new quote vendor 172, the quote server will be able to appropriately process the raw quote data despite the fact the raw quote data from the new vendor may not match the raw quote data from the old vendor. For example. Different vendors may use different data formatting to describe the same financial instrument. For example, Berkshire Hathaway Class A stock on the NYSE uses the symbol "BRKA". On one vendor, this symbol may be formatted as "BRK.A" while on another vendor, that same symbol may be formatted as "BRK-A". With this aspect of the preferred embodiment, the quote server abstracts this symbol data to a common data format, thereby rendering a switch from one quote vendor 172 to another seamless and transparent to other services in the system 150.

Figure 19A:
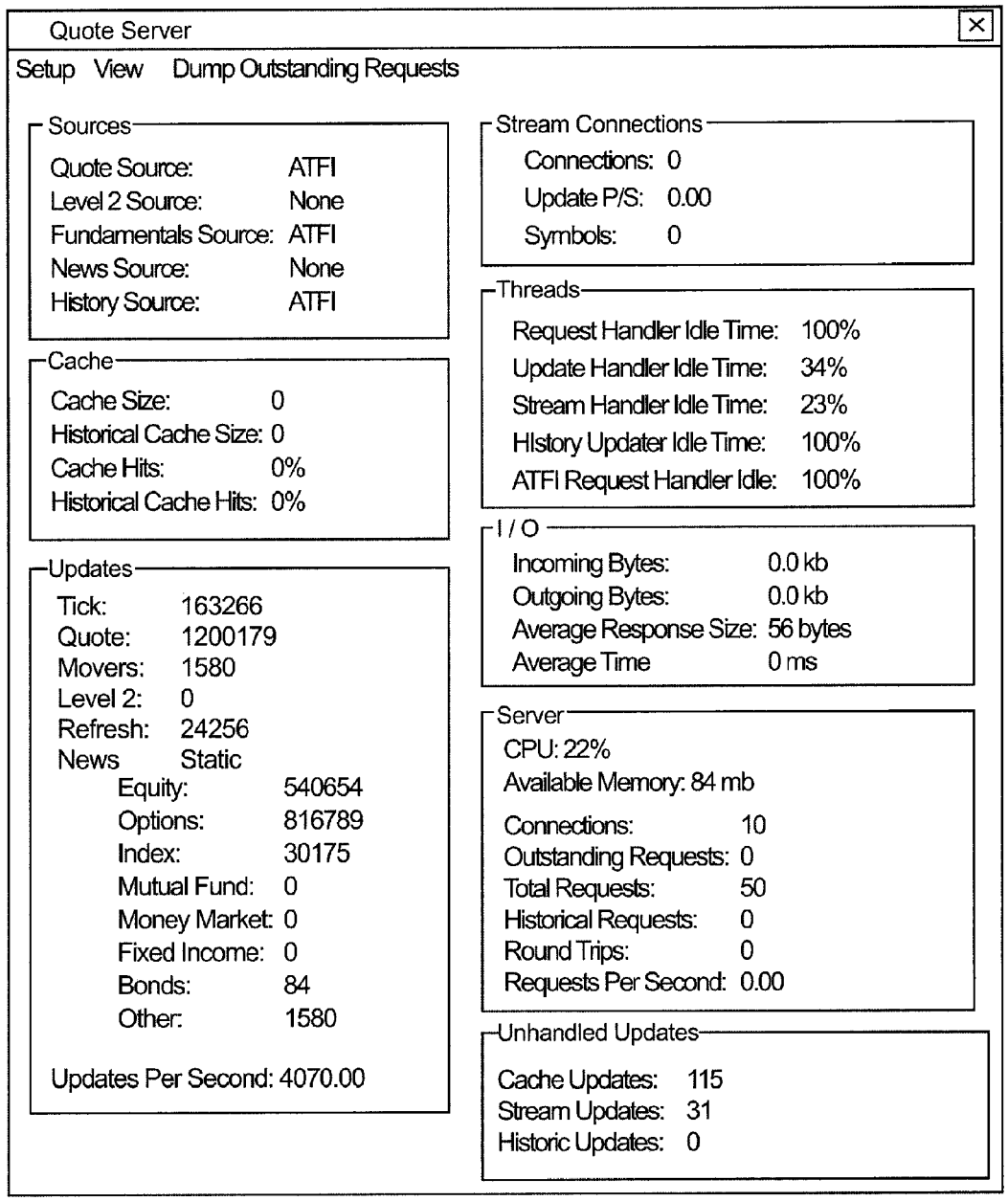

FIGS. 19(a)-(f) illustrate the administrative control available with the preferred system 150 over the quote feeds used by the quote service. Quote data can be divided into different types, including, but not limited to, basic real-time quote data (e.g., last sale, bid price, ask price, etc.), market depth data (e.g., level 2 data), fundamental data, news, and historical quote data, as is known in the art. It may be desirable to use different quote vendors for these different types of quote data. Through the preferred system's use of a common internal format for quote data, the use of different quote vendors for different types of quote data is greatly facilitated. FIG. 19(a) illustrates a summary screen that identifies the quote vendor for the different quote data types; ATFI being the vendor for quotes, fundamental data, and historical data; and no vendors being identified for level 2 data and news.

Figure 19B:
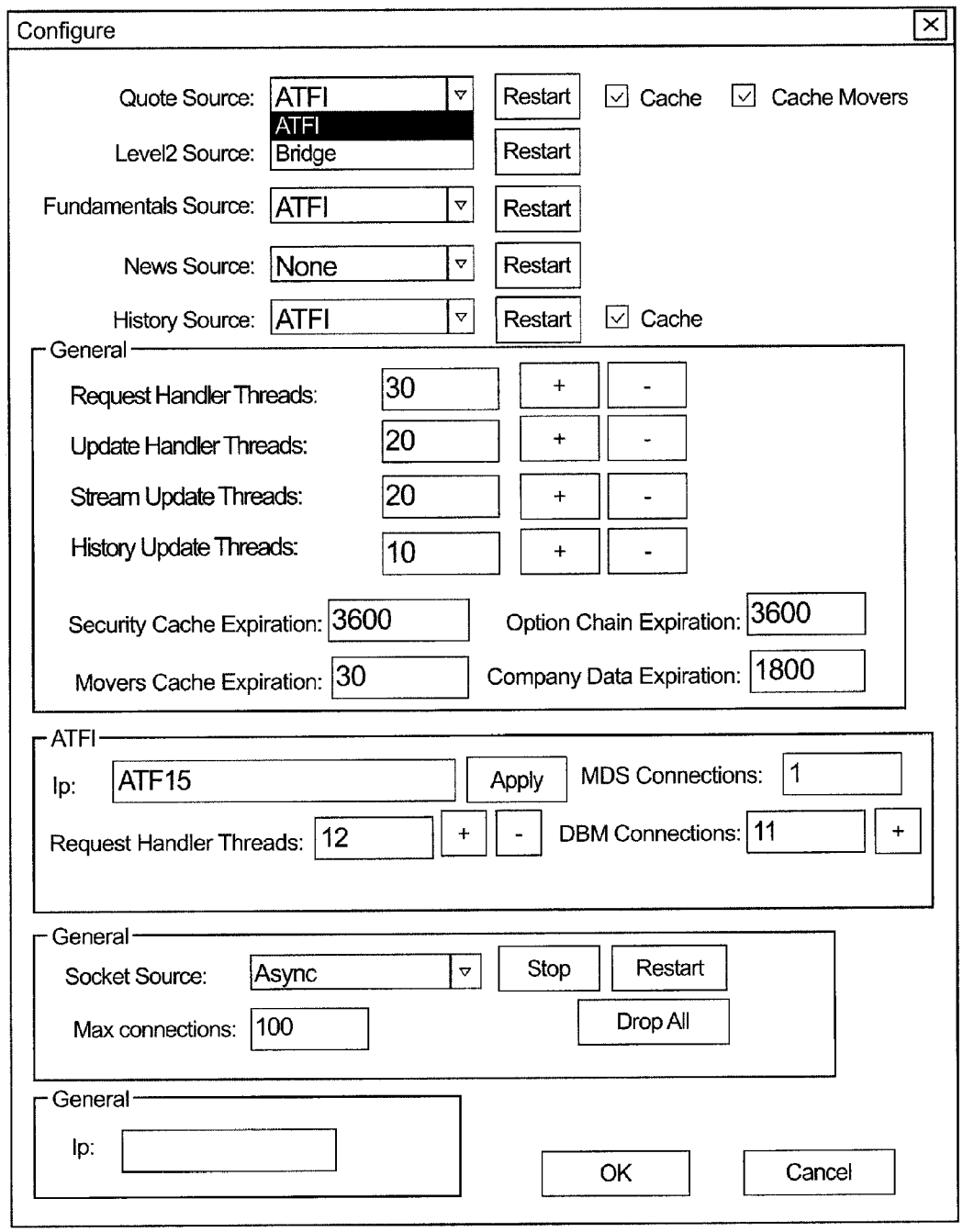
Figure 19C:
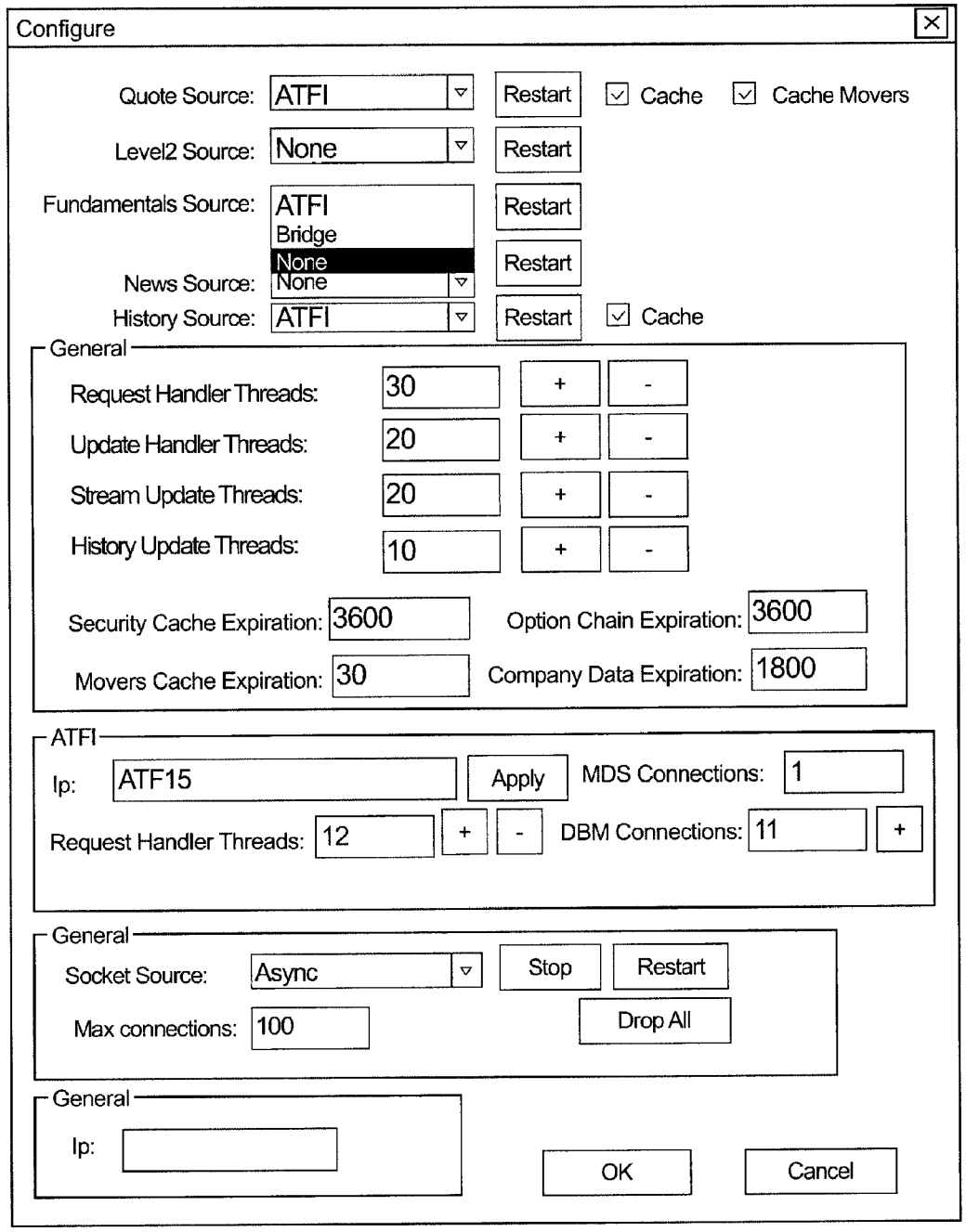
Figure 19E:
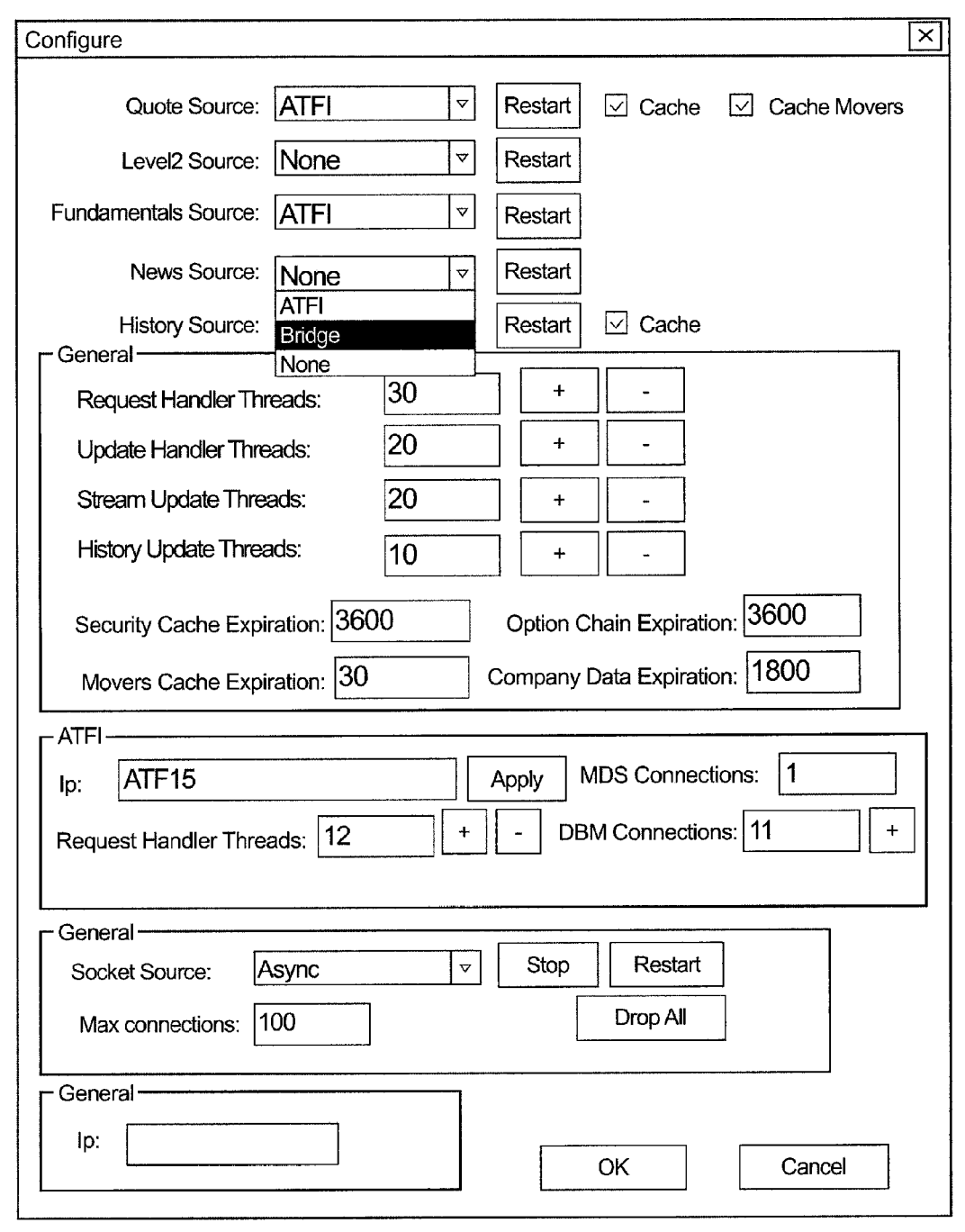
Figure 19F:
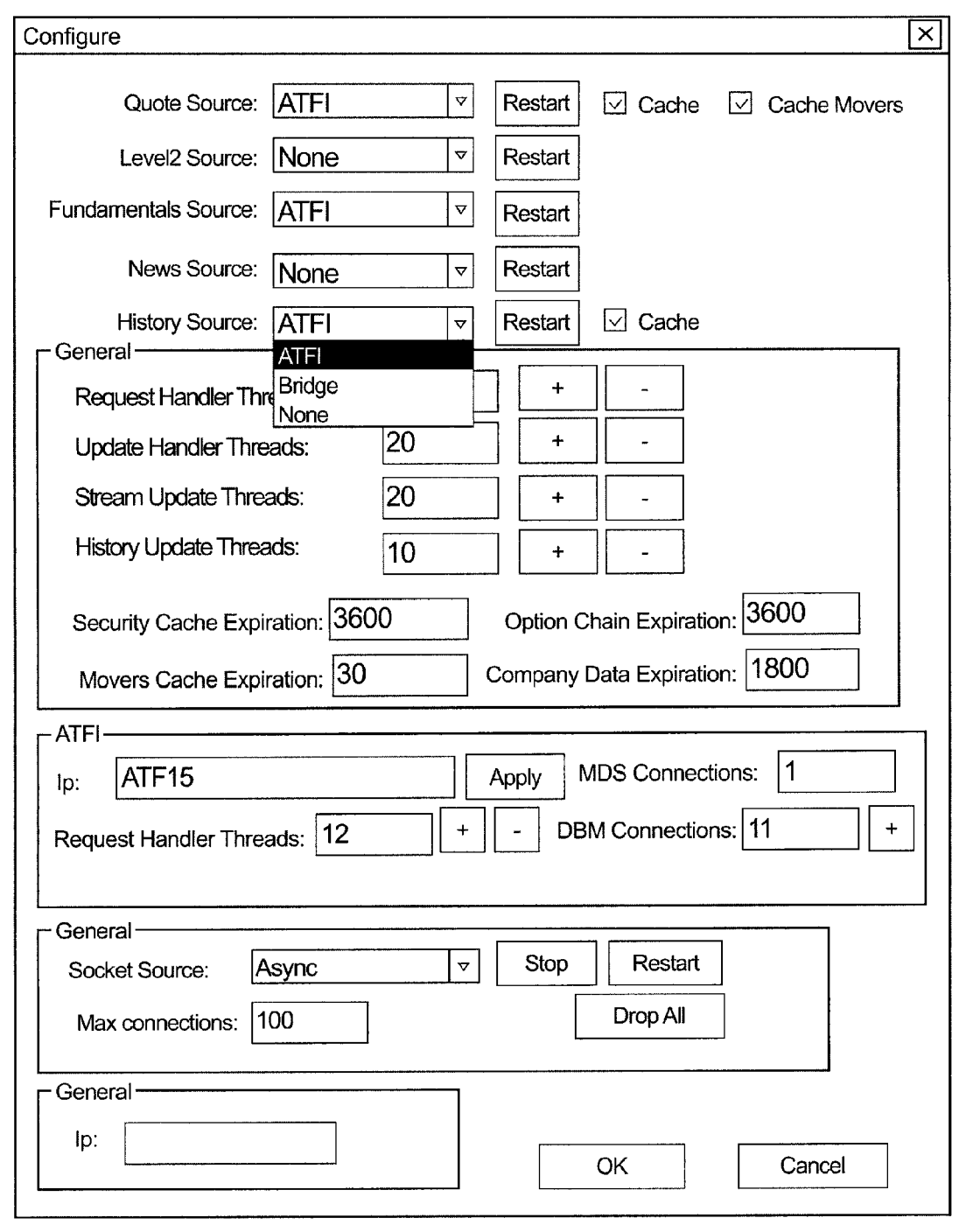

FIG. 19(b) illustrates an administrator interface for selecting a quote source. FIG. 19(c) illustrates an administrator interface for selecting a level 2 source. FIG. 19(d) illustrates an administrator interface for selecting a fundamentals source. FIG. 19(e) illustrates an administrator interface for selecting a news source. Lastly, FIG. 19(f) illustrates an administrator interface for selecting a history source.

Also, it is preferable that the quote service cache the quote data that it receives from vendors to reduce its need to interact with the quote vendors. Reduced quote vendor interaction preferably translates to prompter response times to quote activity requests. Accordingly, the quote server preferably maintains quote data obtained from a quote vendor in its resident memory, preferably its application-in-memory cache. For quote data maintained in cache to be used when processing a quote activity request, it is preferred that such usage proceed in accordance with usage rules in a similar manner described in connection with caching for the WBO service. However, with quote data, it is preferred that a different set of usage rules be used. With quote data, the most important usage rule is preferably time. After a predetermined duration of time, preferably sixty minutes if the quote service is configured to receive uninterrupted and continuous updates on cached quote data from the quote vendor, the cached quote data is deemed outdated and fresh quote data from the quote vendor will be sought. As should be understood, different lengths of time can be used for this time length. If no updates are being received by the quote server for the cached quote data or if there is an interruption in those updates, it can be expected that this freshness time duration will be considerably shorter.

Further, it is worth noting that the QuoteClient object may also be configured to retain quote data it receives for a predetermined duration of time, preferably around 1 second.

When receiving a response from the quote vendor, the quote server 164 preferably updates its own cache record for future requests. QuoteServer also receives quote/trade updates from the quote vendor to update it's own cache based on the latest quote/trade. It is preferred that QuoteServer be capable of merging general quote data (last price, bid, ask, volume, etc), date stored in other data stores such as SQL, company fundamental data, stock price history, available options, top market movers, real-time streaming time and sales and level 2 quote data into one generic quote source.

The QuoteClient COM object preferably functions take a symbol as the only parameter and return a VARIANT cast as a BSTR. Decimal values are returned to three decimal places unless otherwise noted. Values are returned as strings and, unless otherwise noted, functions return "N/A" when data is not available.

The preferred functions for QuoteClient are as follows:

AnnualHigh
   Returns a 52 week high price in fractional format, unless quoted in decimals by exchange.
AnnualLow
   Returns a 52 week low price in fractional format, unless quoted in decimals by exchange.
Ask
   Returns the 'ask' as decimal.
AskF
   Returns the ask price in fractional format, unless quoted in decimals by exchange.
AskSize
   Returns the ask size as an integer.
Bid
   Returns the bid as a decimal.
BidF
   Returns the bid price in fractional format, unless quoted in decimal by exchange.
Bid Size
   Returns the bid size as an integer.
BidTick
   Returns "+" for upticks and "−" for downticks.
Change
   Returns net change for the day in decimal format (three decimal place precision). If there is no change, return "0".
ChangeF
   Returns net change for day in a fractional format, unless quoted in decimals by exchange. If no change, returns "0".
ChangeF
   Returns net change for day in fractional format, unless quoted in decimals by exchange.
Div
   Returns annualized dividend as two decimal dollar/cents value, i.e. "$0.48".
DYield
   Returns annualized dividend yield as two decimal place value, i.e. "0.40". If dividend <=0, returns "N/A".
Exchange
   Returns exchange that the last trade occurred on as string. Values are OPRA, AMEX, THIRDMARKET, BB, PINK, BOSTON, PACIFIC, NASDAQ, NYSE, OTHER.
FastMarket
   Returns "(F)" if issue is trading in a fast market, (space), if not in a fast market or "N/A" if error or symbol is not found.

Font
   Returns <FONT COLOR="red"> if net change is negative, <FONT COLOR="green"> if change is positive, <FONT COLOR="black"> if change is 0. Note: you must close tag (</FONT>).
   Returns a " " (space), if there is an error.
GetFirst
   Returns the first equity in the database.
GetFirstIndex
   Returns the first index in database.
GetNext
   Passes an equity symbol and returns the next in the database.
GetNextIndex
   Passes an index symbol and returns the next in the database.
Halted
   Returns "(H)" if issue has been halted from trading, " " (space) if not halted or "N/A" if error or symbol is not found.
High
   Returns the high for day in decimal format.
HighF
   Returns the high for day in fractional format, unless quoted in decimals by exchange.
Low
   Returns the low for day in decimal format.
LowF
   Returns the low for day in fractional format, unless quoted in decimals by exchange.
Market
   Returns the prime exchange of this issue. Values are: CBOE, CINC, AMEX, CHX, BSE, NYSE, PCX, PHLX, NASDAQ Funds, NASDAQ NMS, NASDAQ Third Market, NASDAQ OTC BB, NASDAQ Small Cap, NASDAQ OTC.
Name
   Returns the company name as string up to 36 characters.
Open
   Returns the open in decimal format.
OpenF
   Returns the open price in fractional format, unless quoted in decimals by exchange.
OptionDeliverableDesc
   Returns a description of deliverable, i.e. "One contract of this option represents 100 shares of MSFT. The contract size is 100." or "One contract of this option represents 94 shares of CPQ plus $3014 cash. The contract size is 100." "ERROR" is returned if a description is not found.
OptionDeliverablePriced
   Returns the synthetic price of the deliverable for an option as a decimal. If complex underlying, builds the price based on weights of the underlyings and cash deliverables. This is multiplied by contract size to get the total value of deliverable.
OptionFromShort
   Returns a description of the option for a given option symbol, i.e., "MSFT JULY 1999 75.000 PUT". If the description is not found, or the symbol is invalid, "ERROR" is returned.
OptionLookup
   If found, returns the option symbol (String underlyingSymbol, int fourDigitYear, int month (1-12), float strikeprice, bool isCall, otherwise returns a blank string.
OptionStandard
   Returns "TRUE" if option is not complex, and shares per contract are equal to contract size. Otherwise returns "FALSE". ERROR" returned if option not found.
PClose
   Returns the previous close in decimal format.
PCloseF
   Returns the previous close as fraction, unless quoted in decimals by exchange.
Sale
   Returns the last trade price in decimal format.
SaleF
   Returns the last trade price in fractional format, unless quoted in decimals by exchange.
SaleSize
   Returns the size of the last sale in integer format.
Tick
   Returns "+", if the last sale tick is an uptick, and "−" if it is a downtick.
Tim
   Returns the time of the last sale in hh:mm format.
UP|C11830
   Returns "®" if issue is UPC 11830 restricted, " " (space) if not restricted and "N/A" if an error occurs or the symbol is not found.
Volume
   Returns the total daily volume as an integer.
   Also listed below is fundamental, non-real time data about a financial instrument that is typically used for research display purposes.
Standard
   Description
   IndustrySIC1
   IndustrySIC2
   IndustrySIC3
   IndustrySIC4
   SectorMarkGuide
   IndustryMarkGuide
   NumInstHoldingShares
   PercentHeldInstitutions
   SharesOutstanding
   DateSymbolChange
   PreviousSymbol
   FortuneNumber
   Shareholders
   Employees
   PrimarkNumber
   Cusip
Balance Sheet
   ReportDateIncome
   ReportDateBalance
   ReportDateCash
   RevenueSales
   GrossProfits
   NetIncome
   CurrentAssets
   LongTermInvestments
   TotalAssets
   CurrentLiabilities
   LongTermDebt
   CapitalStock
   RetainedEarnings
   TotalCashFromOperating
   TotalCashFromInvesting
   NetChangeInCash
Calculated
   AnnualHighDate
   AnnualLowDate
   MovingAverage9Day
   MovingAverage14Day
   MovingAverage21Day
   MovingAverage50Day MovingAverage100Day
MovingAverage200Day
ClosePriceWeek
ClosePriceMonth
ClosePriceQuarter
ClosePriceYear
AverageVolume22Day
AverageVolume100Day
Volatility20Day
Volatility6Month
Earnings
   EarningsFiscalYearEnd
   Last12MonthEPSFootnote
   LastFiscalYearEPSFootnote
   Last12MonthEPS
   Previous12MonthEPS
   LastFiscalYearEPS
   PreviousFiscalYearEPS
   LastQuarterEPS
   PreviousQuarterEPS
   EstimatedReportDate
   NumberReportingBrokers
   CurrentQuarterEstimatedEPS
   NextQuarterEstimatedEPS
   CurrentYearEstimatedEPS
   NextYearEstimatedEPS
Dividend
   IndicatedAnnualDiv
   IndicatedAnnualDivNotes
   PrevCashDivDate
   NextDivDate1
   NextDivDate2
   NextDivDate3
   NextDivDate4
   SpecialDivDate
   NextDivAmount1
   NextDivAmount2
   NextDivAmount3
   NextDivAmount4
   SpecialDivAmount
   SpecialDivNotes
   CashDivPayDate
   CashDivRecordDate
   CashDivDeclareDate
   DividendComment
Calculated Historical
   Volatility1Month
   Volatility2Month
   Volatility3Month
   Volatility4Month
   Volatility5Month
   Volatility6Month
   Volatility7Month
   Volatility8Month
   Volatility9Month
   Volatility10Month
   Volatility11Month
   Volatility12Month
Split
   SplitRatio
   SplitExDate
   SplitSharesAfter
   SplitSharesBefore
   SplitDeclareDate
   SplitRecordDate
   SplitPaymentDate
   SplitComment
MISC
   ForwardPERatio
   TrailingPERatio
   MarketCap III. Back End Layer:

The backend layer 156 of the preferred embodiment of the present invention includes a data repository such as a backoffice accounting database system 170, a quote data source 172, and an order management system (OMS) 168 that provides access to any trading market that will accept automated orders related to financial instruments. Examples of acceptable trading markets include the NYSE, Nasdaq, AMEX, and others.

Design and use of such systems is well-known in the art. As such, they will not be greatly elaborated on herein. A preferred backoffice accounting database system 170 is a CRI system that is known in the art. Further, numerous quote vendors exist in the field from which quote data is available.

The Order Management System (OMS) 168, is the 'traffic police' between the system's order service, the backoffice accounting database system 170, and the various stock exchanges and execution points (market centers) to which financial institution sends orders. The OMS 168 accepts orders from the various customer front end delivery channels via the order service as well as 'green screen' orders that are manually entered by a financial institution's brokers from the backoffice accounting database system 170.

As is known in the art, and not part of the invention herein, the OMS performs various functions on the order before sending it the exchange. While various order management systems can be used in connection with the present invention, the OMS used in the preferred embodiment herein is an Integrate and Intelliroute manufactured by IBSN, Inc. of Denver, Colo.

Orders from the order servers are copied by the OMS 168, and the copy is sent to the backoffice accounting database 170. Since a copy of orders that originate from the backoffice accounting database 170 are already stored in the backoffice accounting database 170, a copy of those order from the OMS 168 is not required.

During market hours, an order being processed by the OMS 168 is passed through various routing functions that determine the market center to which the order is to be delivered. This routing depends on a number of parameters such as: NASDAQ or NYSE stock, size of the order, destination of the original order if this order is a change or cancellation of an earlier order, status of the execution point, etc. As noted above, the OMS 168 performs these tasks using known techniques.

The OMS 168 sends this order to the appropriate market 174 using a financial industry standard protocol known as "FIX", which is an order message format enclosed in TCP/IP communications protocol for transmission via data lines to the market centers.

If the financial markets are not open, the order is queued by the OMS 168 in a local data store where it awaits transmission to the financial markets once those markets are open to accept orders.

The OMS 168 also receives notifications of order execution, cancellation and reject messages from the market centers in response to orders sent thereto. These messages are passed to both the backoffice accounting database 170 and the Orders service. The backoffice accounting database 170 uses this information to update the customer's accounts. The Orders service provides this information to interested applications (such as the front end client application that initiated the order) via the NotificationSwitch multicast.

Figure 17:
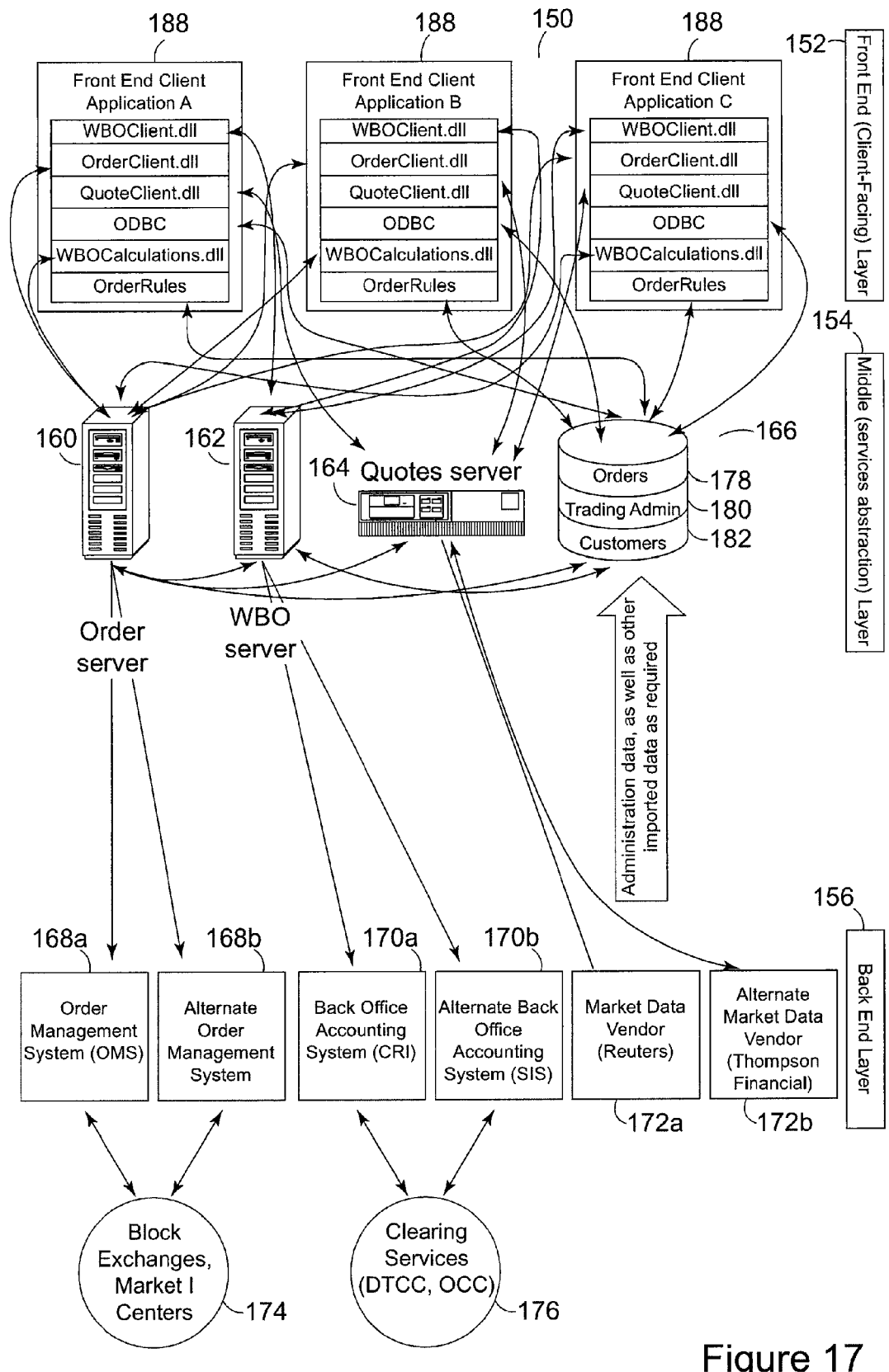
FIG. 17 illustrates the flexibility of the preferred system of the present invention for handling backend changes.

FIG. 17 illustrates the flexibility of the system 150 to accommodate changes in the back end layer 156. For example, multiple order management systems 168a and 168b can be used transparently by the intermediate layer 154. Also, as noted above, multiple quote vendors 172a and 172b can be transparently used. A particular advantage of the system 150 is that it lends itself to efficient changes in the backoffice accounting database system 170.

In the past, changes in a backoffice accounting database system 170, while keeping the trading system online, have created major difficulties because of the traditional 3 day delay between an order's trade data and settlement date, and because of option trades. That is, during the first three days of a migration from an old database system 170a to a new database system 170b, the new database system 170b would not have an accurate picture of the customer's account due to the settlement dates still pending. In previous efforts known to the inventors herein, efforts to migrate from one backoffice system 170a to another 170b have entailed data entry personnel manually keying orders during the first three days of transition into both the old and new system.

However, with the intermediate layer 152 of system 150, efficient migration can be achieved using a "three day system" as described herein. When implementing the "three day" system, the timeline for operations is based on the settlement period of equity trades. At the current time, the standard settlement period for equity trades is three days. The standard settlement period for option trades is one day. It should be noted that these settlement periods may change in the future. However, the principles of the "three day" system are equally applicable for database migrations when the settlement periods are longer or shorter so long as corresponding changes are made in the pertinent time intervals which will be discussed below.

Prior to the database migration, the new backoffice system is preferably minimally populated with only customer name and address information. The old backoffice system, as would be expected, is populated with full customer account information.

During a first time interval that commences when the new backoffice system goes live and concludes two days thereafter, data relating to option trades that are transacted by the automated brokerage system during this time interval are stored in the old backoffice system. Further, during this time interval, data relating to equity trades that are transacted by the automated brokerage system during this time interval are stored in the new backoffice system. For activity requests received during this time interval that require customer account data, the WBO servers preferably retrieve customer account data from both the old and new backoffice systems and aggregate this retrieved data to obtain a full and accurate picture of a customer's account. Option trades that arise during this interval are stored in the old backoffice system because their settlements will occur within the three day window. However, because the settlement of new equity trades will fall after the three day window, that data is stored in the new backoffice system that will remain live at the conclusion of the three days.

Upon the conclusion of the first time interval, the second time interval begins. The duration of the second time interval is preferably one day given the three day settlement period for equity trades. During this second time interval, data relating to both option trades and equity trades that have been transacted by the automated brokerage system during the second time interval are stored in the new backoffice system. Further, for activity requests received during this second time interval that require customer account data, the WBO servers preferably continue to retrieve customer account data from both the old and new backoffice systems aggregate this retrieved data to obtain a full and accurate picture of a customer's account.

At the conclusion of the second time interval (which, as noted, is preferably three days after the new backoffice system has gone live), the old backoffice system will no longer have active settlement dates pending for either equities or options. The content of the old backoffice system can then be copied into the new backoffice system.

It is preferred that the three day system commence on a Wednesday such that it will conclude at close of business on a Friday, thereby allowing the copying of the old backoffice system into the new backoffice system to occur during a time period where the markets are not open. Even more preferably, the three day window of the "three day" system will expire at the close of business Friday prior to a three day weekend or holiday weekend. However, other days of the week may also be chosen as would be understood by those of ordinary skill in the art.

Figure 18A:
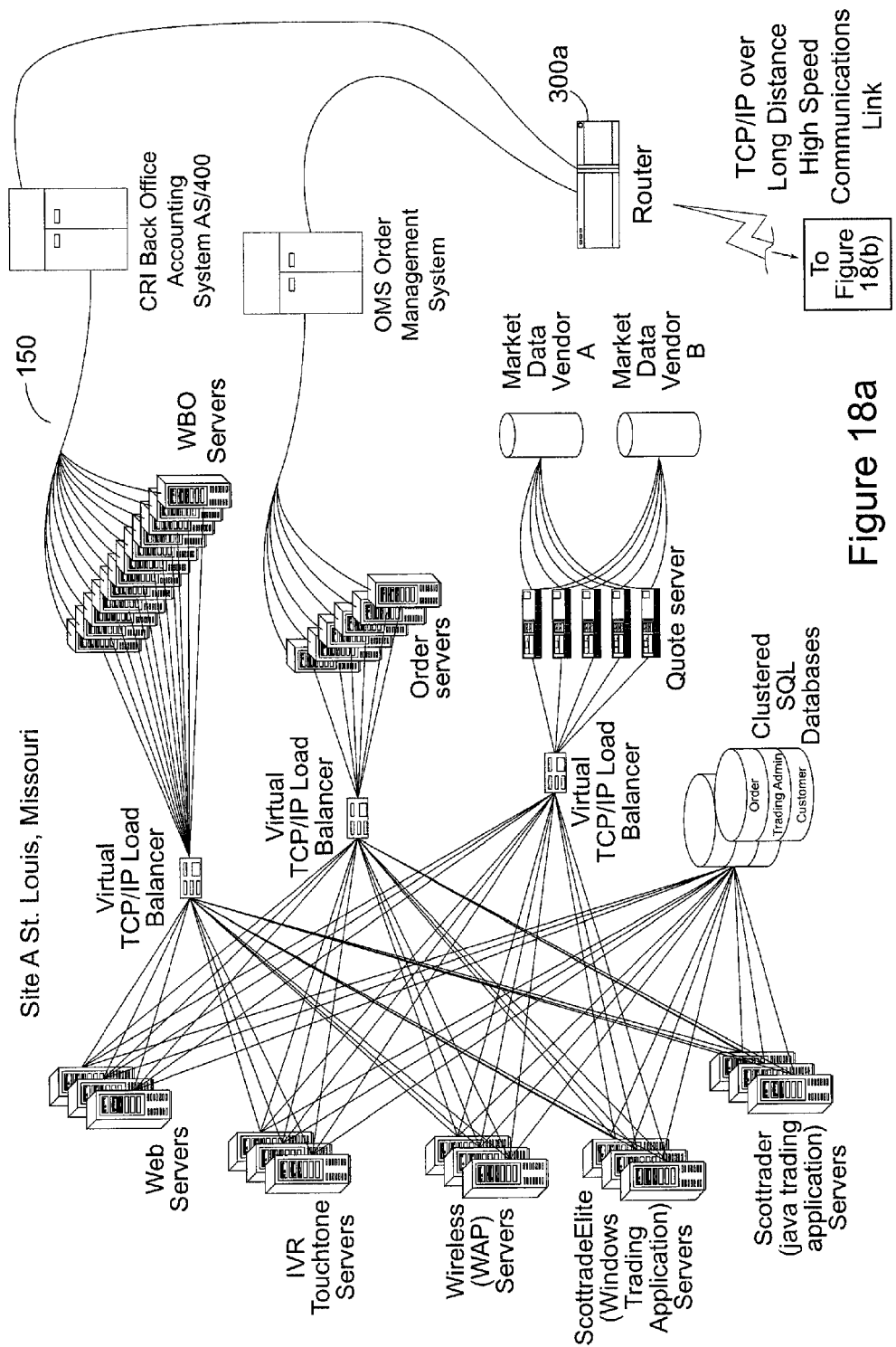
FIGS. 18(a) and (b) illustrate an embodiment of the invention wherein geographical site redundancy is provided.
Figure 18B:
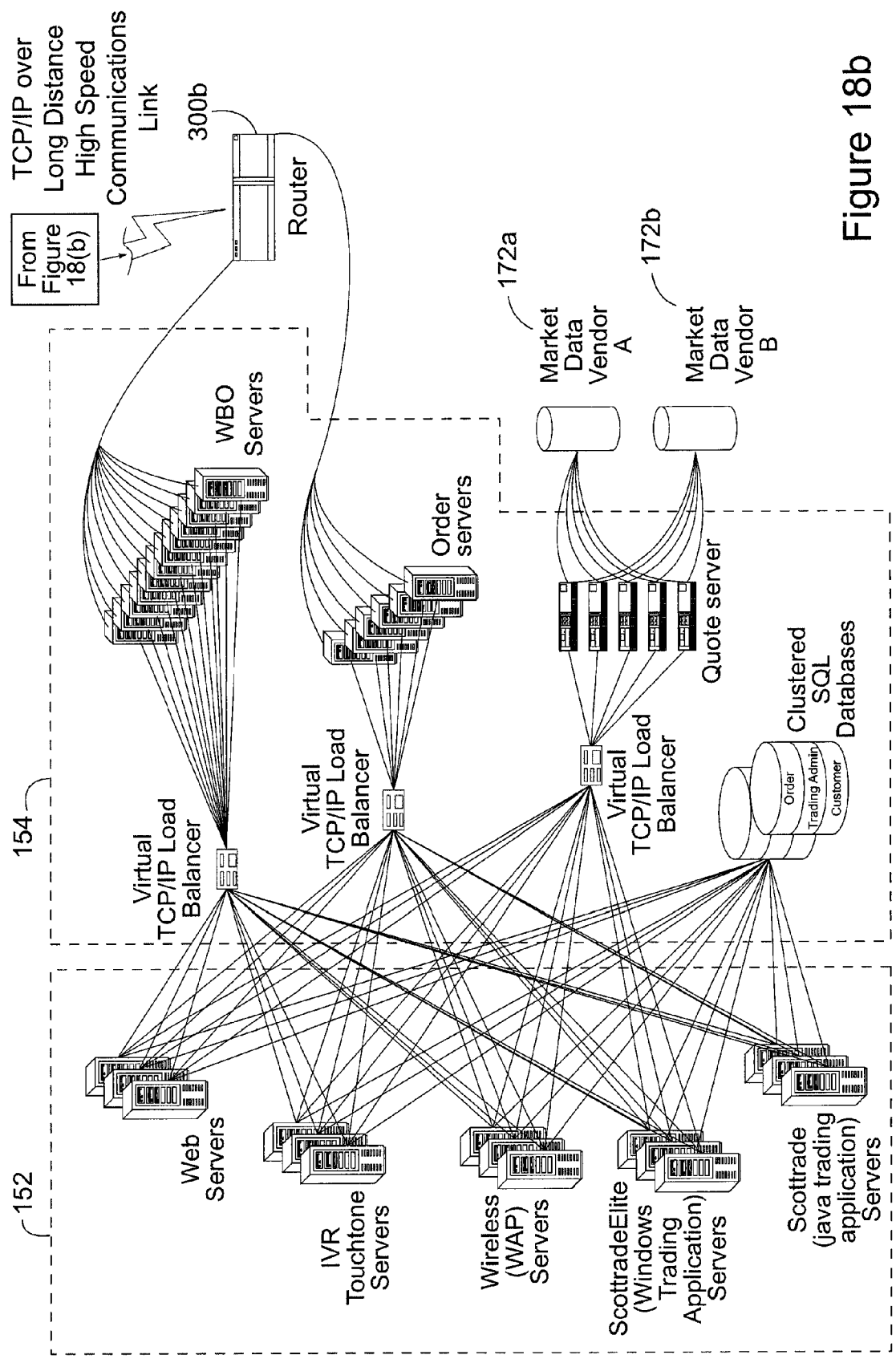

While the present invention has been described above in relation to its preferred embodiment, various modifications may be made thereto that still fall within the invention's scope, as would be recognized by those of ordinary skill in the art. Such modifications to the invention will be recognizable upon review of the teachings herein. For example, it should be readily understood that the various services can be geographically remote from each other. Further, the system 150 can be duplicated at multiple geographic locations, such as shown in FIGS. 18(a) and (b) wherein routers 300a and 300b are used to provide a connection to the backoffice from a site remote from the backoffice. As such, the full scope of the present invention is to be defined solely by the appended claims and their legal equivalents.

What is claimed is:

1. An automated financial instrument brokerage system for providing administrative control over financial instrument orders allowed by the system, the system comprising:
   a computer-implemented database in which order restrictions are stored;
   a computer-implemented interface configured to allow an administrator to control the restrictions that are stored in the database; and
   a processor configured to (1): process an order activity request received by an application in response to user input against the restrictions stored in the database to determine whether the order activity request is valid, and (2): reject the order activity request if it is determined to be invalid;
   wherein the interface is configured to provide the administrator with selective control of the stored restrictions on a trading symbol-specific basis, the selective control over the trading symbol-specific restrictions including a plurality of controls for controlling a plurality of conditions under which orders can be placed for a financial instrument corresponding to an administrator-defined trading symbol, the plurality of controls comprising at least two selected from the group consisting of a routing control, an order type control, an extended hours trading control, an option chaining control, a minimum lot size control, a margin requirement control, and an add disallowed option root or symbol control;
   wherein the brokerage system comprises:
      a front end layer comprising at least one front end server, the at least one front end server comprising the processor, the at least one front end server configured to receive, via an application, a plurality of activity requests related to one or more financial instruments from a plurality of remote users;

an intermediate layer in communication with the front end layer, the intermediate layer comprising a plurality of intermediate layer servers for simultaneously processing a plurality of the activity requests, the intermediate layer servers being configured to provide a plurality of services in connection with the processing of the activity requests;

a back end layer in communication with the intermediate layer, the back end layer comprising a data source configured to provide financial instrument quote data, a data repository configured to store customer account data, and an order placement system configured to place one or more orders on a financial instrument trading market, the one or more orders being derived from at least one received activity request;

wherein the processor is further configured to execute an interface between the application and the intermediate layer, the interface including a plurality of trading rules corresponding to the stored restrictions such that received order activity requests are processed against the stored restrictions to determine whether to reject a received order activity request;

wherein the at least one front end server is further configured to distribute activity requests including order activity requests that were not rejected based on the stored restrictions to the plurality of intermediate layer servers based on activity request type;

wherein the intermediate layer servers are configured to interact with the back end layer data source, the back end layer data repository, and the back end layer order placement system as necessary to process the received activity requests; and wherein the intermediate layer servers comprise a plurality of dedicated servers, the dedicated servers comprising:

a plurality of order servers, each order server configured to receive and process order activity requests from the front end layer that were not rejected based on the stored restrictions;

a plurality of customer account servers, each customer account server configured to receive and process customer account activity requests from the front end layer, wherein the processing of customer account activity requests includes interacting with the back end layer data repository to retrieve customer account data therefrom and providing the retrieved customer account data to the front end applications for display to the users; and a plurality of quote servers, each quote server configured to receive and process quote activity requests from the front end layer, wherein the processing of quote activity requests includes interacting with the back end layer data source to retrieve the financial instrument quote data therefrom and providing the retrieved financial instrument quote data to the front layer applications for display to the users.

2. The system of claim 1 wherein the database resides in the intermediate layer.

3. The system of claim 1 wherein the order type control comprises at least one selected from the group consisting of a buy order control, a sell order control, a sell short order control, a buy to cover order control, a buy to open order control, a buy to close order control, a sell to open order control, and a sell to close order control.

4. The system of claim 1 wherein the interface is further configured to provide the administrator with selective control over the stored restrictions on a trading market-specific basis.

5. The system of claim 4 wherein the interface is further configured to provide the administrator with selective control over the stored restrictions on an option-specific basis.

6. The system of claim 1 wherein the interface is further configured to provide the administrator with selective control over the stored restrictions on an option-specific basis.

7. An automated financial instrument brokerage system for providing administrative control over financial instrument orders allowed by the system, the system comprising:

a computer-implemented database in which order restrictions are stored;

a computer-implemented interface configured to allow an administrator to control the restrictions that are stored in the database; and a processor configured to (1): process an order activity request received by an application in response to user input against the restrictions stored in the database to determine whether the order activity request is valid, and (2): reject the order activity request if it is determined to be invalid;

wherein the interface is configured to provide the administrator with selective control of the stored restrictions on a trading market-specific basis;

wherein the trading market-specific control comprises a control for governing orders on the NYSE, a control for governing orders on the NASDAQ, and a control for governing orders on the AMEX;

wherein the brokerage system comprises:

a front end layer comprising at least one front end server, the at least one front end server comprising the processor, the at least one front end server configured to receive, via an application, a plurality of activity requests related to one or more financial instruments from a plurality of remote users;

an intermediate layer in communication with the front end layer, the intermediate layer comprising a plurality of intermediate layer servers for simultaneously processing a plurality of the activity requests, the intermediate layer servers being configured to provide a plurality of services in connection with the processing of the activity requests;

a back end layer in communication with the intermediate layer, the back end layer comprising a data source configured to provide financial instrument quote data, a data repository configured to store customer account data, and an order placement system configured to place one or more orders on a financial instrument trading market, the one or more orders being derived from at least one received activity request;

wherein the processor is further configured to execute an interface between the application and the intermediate layer, the interface including a plurality of trading rules corresponding to the stored restrictions such that received order activity requests are processed against the stored restrictions to determine whether to reject a received order activity request;

wherein the at least one front end server is further configured to distribute activity requests including order activity requests that were not rejected based on the stored restrictions to the plurality of intermediate layer servers based on activity request type;

wherein the intermediate layer servers are configured to interact with the back end layer data source, the back end layer data repository, and the back end layer order placement system as necessary to process the received activity requests; and wherein the intermediate layer servers comprise a plurality of dedicated servers, the dedicated servers comprising:
  a plurality of order servers, each order server configured to receive and process order activity requests from the front end layer that were not rejected based on the stored restrictions;
  a plurality of customer account servers, each customer account server configured to receive and process customer account activity requests from the front end layer, wherein the processing of customer account activity requests includes interacting with the back end layer data repository to retrieve customer account data therefrom and providing the retrieved customer account data to the front end applications for display to the users; and
  a plurality of quote servers, each quote server configured to receive and process quote activity requests from the front end layer, wherein the processing of quote activity requests includes interacting with the back end layer data source to retrieve the financial instrument quote data therefrom and providing the retrieved financial instrument quote data to the front layer applications for display to the users.

8. The system of claim 7 wherein the database resides in the intermediate layer.

9. An automated financial instrument brokerage system for providing administrative control over financial instrument orders allowed by the system, the system comprising:
  a computer-implemented database in which order restrictions are stored;
  a computer-implemented interface configured to allow an administrator to control the restrictions that are stored in the database; and
  a processor configured to (1): process an order activity request received by an application in response to user input against the restrictions stored in the database to determine whether the order activity request is valid, and (2): reject the order activity request if it is determined to be invalid;
  wherein the interface is configured to provide the administrator with selective control of the stored restrictions on an option-specific basis;
  wherein the brokerage system comprises:
    a front end layer comprising at least one front end server, the at least one front end server comprising the processor, the at least one front end server configured to receive, via an application, a plurality of activity requests related to one or more financial instruments from a plurality of remote users;
    an intermediate layer in communication with the front end layer, the intermediate layer comprising a plurality of intermediate layer servers for simultaneously processing a plurality of the activity requests, the intermediate layer servers being configured to provide a plurality of services in connection with the processing of the activity requests;
    a back end layer in communication with the intermediate layer, the back end layer comprising a data source configured to provide financial instrument quote data, a data repository configured to store customer account data, and an order placement system configured to place one or more orders on a financial instrument trading market, the one or more orders being derived from at least one received activity request;
  wherein the processor is further configured to execute an interface between the application and the intermediate layer, the interface including a plurality of trading rules corresponding to the stored restrictions such that received order activity requests are processed against the stored restrictions to determine whether to reject a received order activity request;
  wherein the at least one front end server is further configured to distribute activity requests including order activity requests that were not rejected based on the stored restrictions to the plurality of intermediate layer servers based on activity request type;
  wherein the intermediate layer servers are configured to interact with the back end layer data source, the back end layer data repository, and the back end layer order placement system as necessary to process the received activity requests; and
  wherein the intermediate layer servers comprise a plurality of dedicated servers, the dedicated servers comprising:
    a plurality of order servers, each order server configured to receive and process order activity requests from the front end layer that were not rejected based on the stored restrictions;
    a plurality of customer account servers, each customer account server configured to receive and process customer account activity requests from the front end layer, wherein the processing of customer account activity requests includes interacting with the back end layer data repository to retrieve customer account data therefrom and providing the retrieved customer account data to the front end applications for display to the users; and
    a plurality of quote servers, each quote server configured to receive and process quote activity requests from the front end layer, wherein the processing of quote activity requests includes interacting with the back end layer data source to retrieve the financial instrument quote data therefrom and providing the retrieved financial instrument quote data to the front layer applications for display to the users.

10. The system of claim 9 wherein the database resides in the intermediate layer.

* * * * *